United States Patent
Shibata et al.

(10) Patent No.: US 9,550,175 B2
(45) Date of Patent: *Jan. 24, 2017

(54) HONEYCOMB FILTER

(71) Applicant: IBIDEN CO., LTD., Ogaki-shi (JP)

(72) Inventors: Toshiaki Shibata, Ibi-gun (JP); Yuki Miwa, Ibi-gun (JP)

(73) Assignee: IBIDEN CO., LTD., Ogaki-shi (JP)

(*) Notice: Subject to any disclaimer, the term of this patent is extended or adjusted under 35 U.S.C. 154(b) by 199 days.

This patent is subject to a terminal disclaimer.

(21) Appl. No.: 14/448,989

(22) Filed: Jul. 31, 2014

(65) Prior Publication Data
US 2015/0037532 A1 Feb. 5, 2015

(30) Foreign Application Priority Data
Jul. 31, 2013 (JP) ................. 2013-159936

(51) Int. Cl.
*B01D 46/24* (2006.01)
*F01N 3/022* (2006.01)
(Continued)

(52) U.S. Cl.
CPC ............ *B01J 27/224* (2013.01); *B01D 46/247* (2013.01); *B01J 35/04* (2013.01); *F01N 3/0222* (2013.01); *B01D 2046/2496* (2013.01); *F01N 3/103* (2013.01); *F01N 2330/34* (2013.01); *F01N 2330/48* (2013.01); *Y02T 10/20* (2013.01); *Y10T 428/24157* (2015.01)

(58) Field of Classification Search
None
See application file for complete search history.

(56) References Cited

U.S. PATENT DOCUMENTS

| 4,417,908 A | 11/1983 | Pitcher, Jr. |
| 4,420,316 A * | 12/1983 | Frost ................. B01D 46/2407 428/116 |

(Continued)

FOREIGN PATENT DOCUMENTS

| DE | 102008042372 | 4/2009 |
| EP | 1495791 | 1/2005 |

(Continued)

OTHER PUBLICATIONS

Office Action with Form PTO-892 Notice of References Cited issued by the United States Patent and Trademark Office for the co-pending U.S. Appl. No. 14/448,882, Sep. 21, 2016.

(Continued)

*Primary Examiner* — David Sample
*Assistant Examiner* — Nicholas W Jordan
(74) *Attorney, Agent, or Firm* — Mori & Ward, LLP

(57) ABSTRACT

A honeycomb filter includes a plurality of cells, porous cell walls, and an oxidation catalyst. The plurality of cells include exhaust gas introduction cells and exhaust gas emission cells. The oxidation catalyst is supported inside the porous cell walls in an amount of 5 to 60 g/L. The exhaust gas emission cells have an average cross sectional area larger than an average cross sectional area of the exhaust gas introduction cells in the cross section perpendicular to the longitudinal direction. A total volume of the exhaust gas introduction cells is larger than a total volume of the exhaust gas emission cells.

33 Claims, 21 Drawing Sheets

(51) Int. Cl.
*B01J 35/04* (2006.01)
*B01J 27/224* (2006.01)
*F01N 3/10* (2006.01)

(56) References Cited

U.S. PATENT DOCUMENTS

| | | | |
|---|---|---|---|
| 4,519,820 A * | 5/1985 | Oyobe | B01D 46/2407 428/117 |
| 5,962,103 A | 10/1999 | Luthra et al. | |
| 6,395,370 B1 | 5/2002 | Noda et al. | |
| 6,669,751 B1 | 12/2003 | Ohno et al. | |
| 7,208,214 B2 * | 4/2007 | Ichikawa | B01D 46/2459 422/180 |
| 7,247,184 B2 * | 7/2007 | Frost | B01D 46/247 428/116 |
| 7,452,591 B2 | 11/2008 | Tabuchi et al. | |
| 7,556,782 B2 * | 7/2009 | Ohno | B01D 46/247 422/180 |
| 7,585,471 B2 * | 9/2009 | Oshimi | B01D 46/247 422/177 |
| 7,601,194 B2 * | 10/2009 | Beall | B01D 46/247 428/116 |
| 7,892,308 B2 * | 2/2011 | Mizutani | B01D 46/2459 55/523 |
| 8,062,603 B2 * | 11/2011 | Komori | B01D 46/247 422/180 |
| 8,283,019 B2 | 10/2012 | Ohno et al. | |
| 9,080,479 B2 | 7/2015 | Sakashita et al. | |
| 9,080,484 B2 | 7/2015 | Miyairi | |
| 9,289,711 B2 | 3/2016 | Hirakawa et al. | |
| 2003/0021949 A1 | 1/2003 | Tomita et al. | |
| 2003/0041574 A1 | 3/2003 | Noguchi et al. | |
| 2004/0161373 A1 * | 8/2004 | Ichikawa | B01D 46/2459 422/180 |
| 2004/0170803 A1 | 9/2004 | Ichikawa | |
| 2004/0261384 A1 | 12/2004 | Merkel et al. | |
| 2005/0076627 A1 | 4/2005 | Itou et al. | |
| 2005/0102987 A1 | 5/2005 | Kudo | |
| 2006/0029768 A1 | 2/2006 | Furukawa et al. | |
| 2006/0159602 A1 | 7/2006 | Ohno et al. | |
| 2007/0184240 A1 * | 8/2007 | Ichikawa | B01D 46/2418 428/116 |
| 2007/0231535 A1 * | 10/2007 | Mizutani | F01N 3/0222 428/116 |
| 2008/0190083 A1 * | 8/2008 | Oshimi | B01D 46/247 55/521 |
| 2008/0311340 A1 * | 12/2008 | Kasai | B01D 46/247 428/116 |
| 2009/0205301 A1 | 8/2009 | Komori et al. | |
| 2009/0246453 A1 | 10/2009 | Yamaguchi | |
| 2010/0058725 A1 | 3/2010 | Konomi et al. | |
| 2010/0216634 A1 | 8/2010 | Ohno et al. | |
| 2010/0218473 A1 | 9/2010 | Kikuchi et al. | |
| 2010/0300291 A1 | 12/2010 | Vincent et al. | |
| 2011/0085953 A1 | 4/2011 | Ogyu et al. | |
| 2011/0224069 A1 * | 9/2011 | Goto | B01D 46/247 502/100 |
| 2012/0093697 A1 | 4/2012 | Iwakura et al. | |
| 2012/0251402 A1 | 10/2012 | Goto et al. | |
| 2013/0316129 A1 | 11/2013 | Yabuki et al. | |
| 2015/0013284 A1 | 1/2015 | Ota et al. | |
| 2015/0072104 A1 | 3/2015 | Iwasaki et al. | |

FOREIGN PATENT DOCUMENTS

| | | |
|---|---|---|
| EP | 2312133 | 4/2011 |
| JP | 2008-284542 | 11/2008 |
| JP | 2011-078899 | 4/2011 |
| JP | 2011-218295 | 11/2011 |
| WO | WO 2004/024294 | 3/2004 |
| WO | WO 2007/134697 | 11/2007 |
| WO | WO 2013/150970 | 10/2013 |

OTHER PUBLICATIONS

Office Action with Form PTO-892 Notice of References Cited issued by the United States Patent and Trademark Office for the co-pending U.S. Appl. No. 14/448,951, Oct. 18, 2016.

Office Action with Form PTO-892 Notice of References Cited issued by the United States Patent and Trademark Office for the co-pending U.S. Appl. No. 14/449,008, Sep. 22, 2016.

Office Action with Form PTO-892 Notice of References Cited issued by the United States Patent and Trademark Office for the co-pending U.S. Appl. No. 14/449,023, Oct. 18, 2016.

* cited by examiner

A-A line cross-sectional view

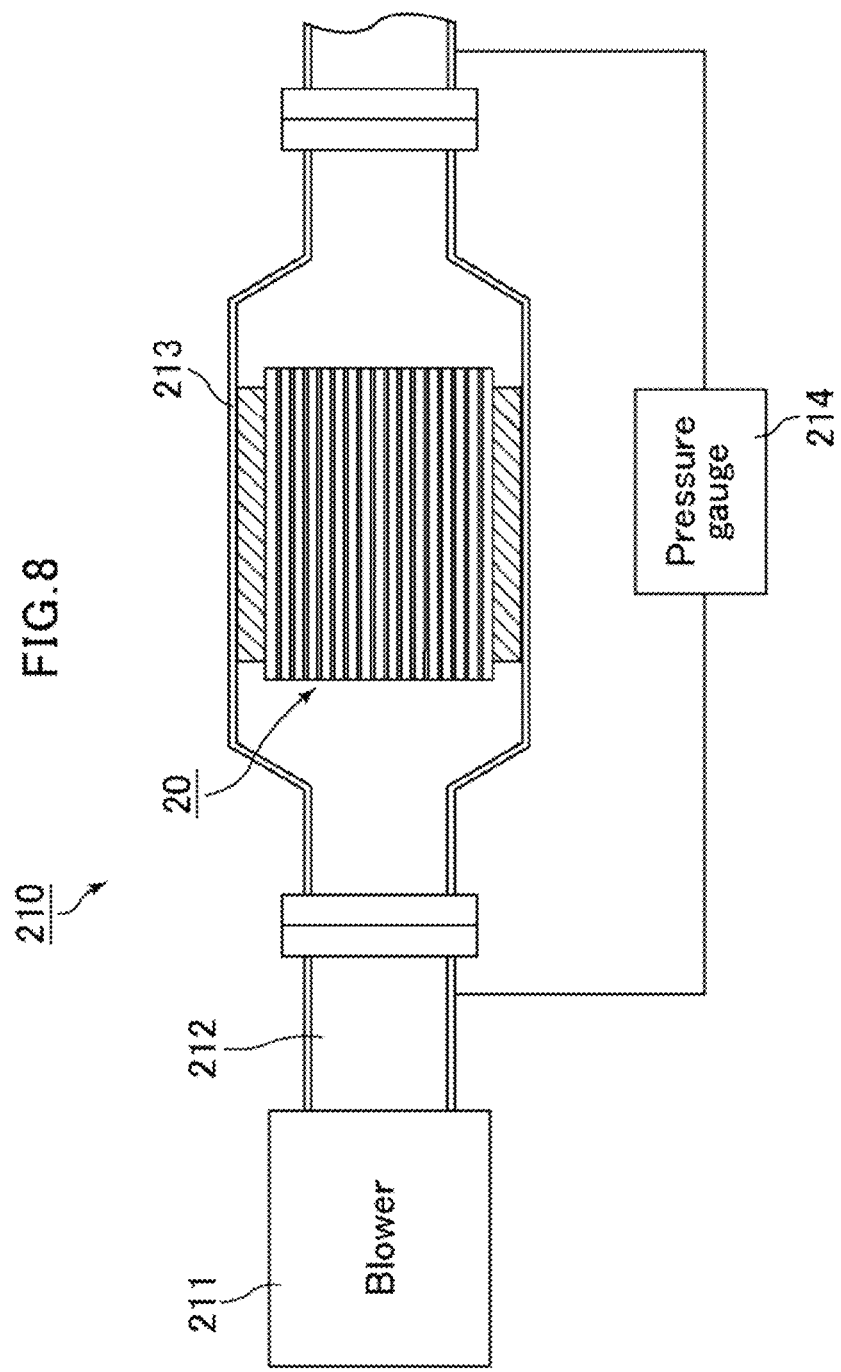

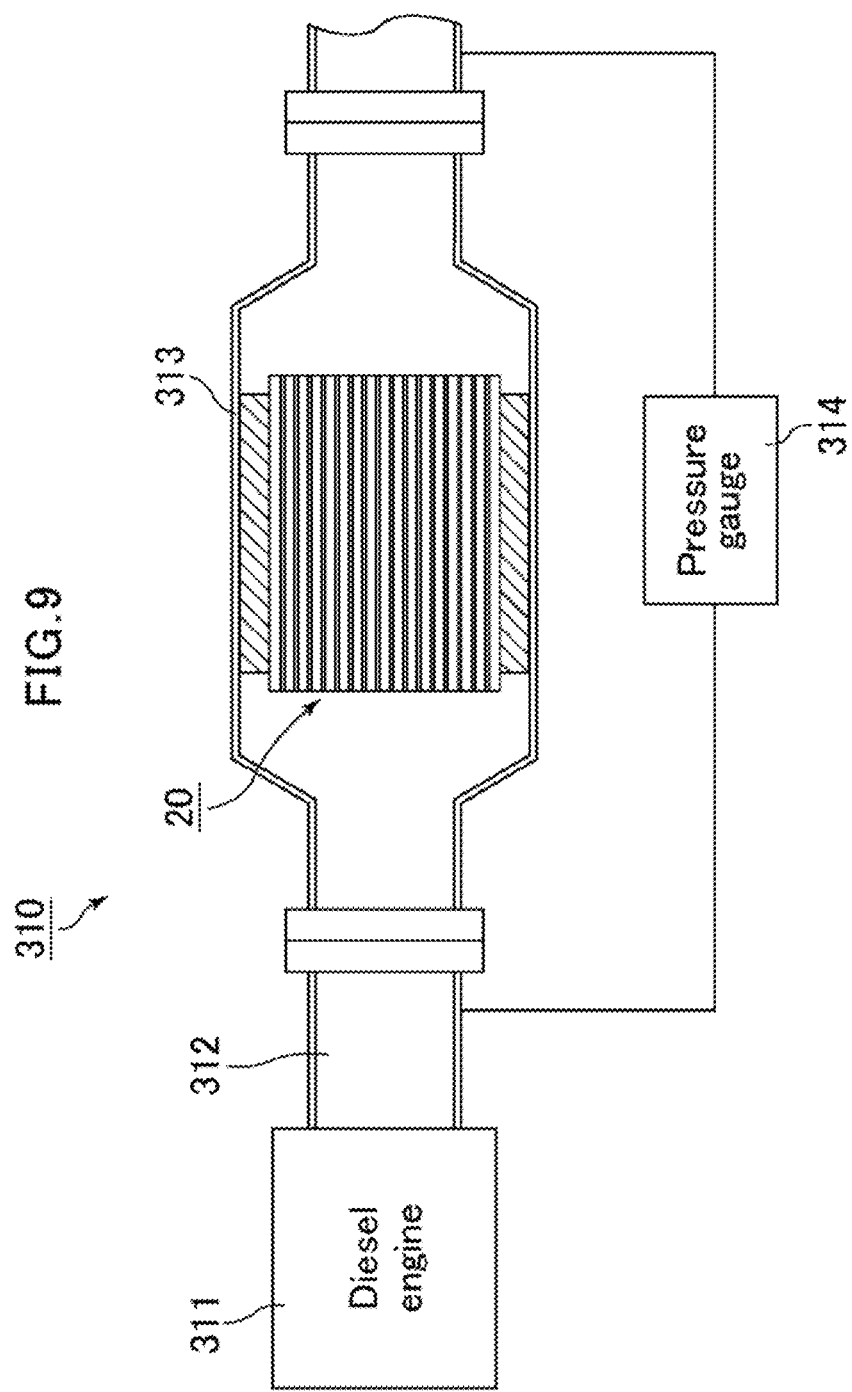

B-B line cross-sectional view

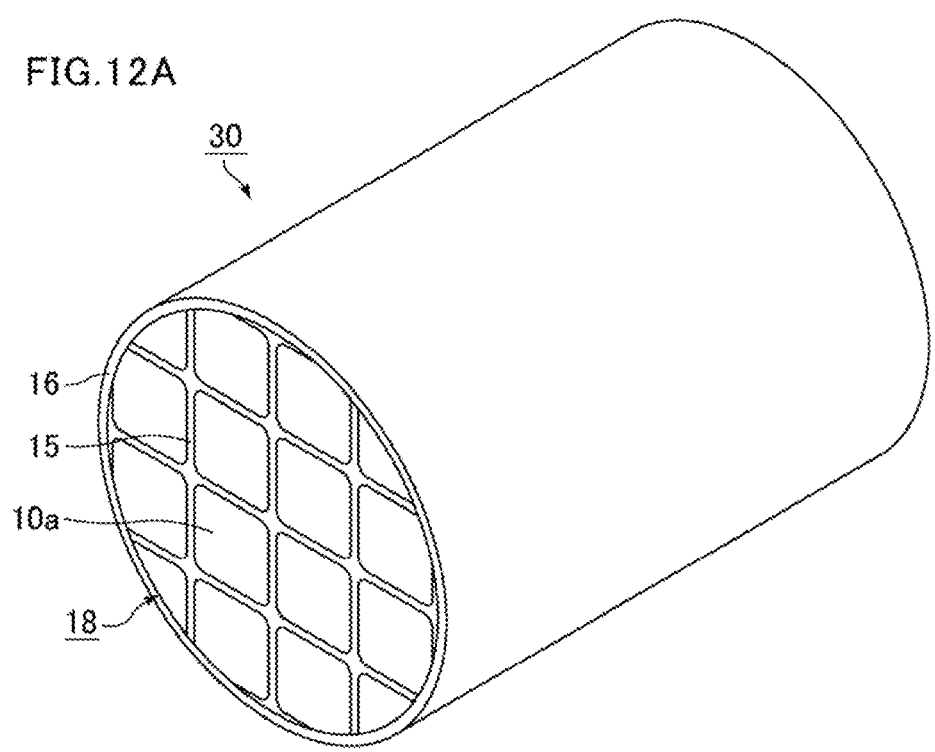
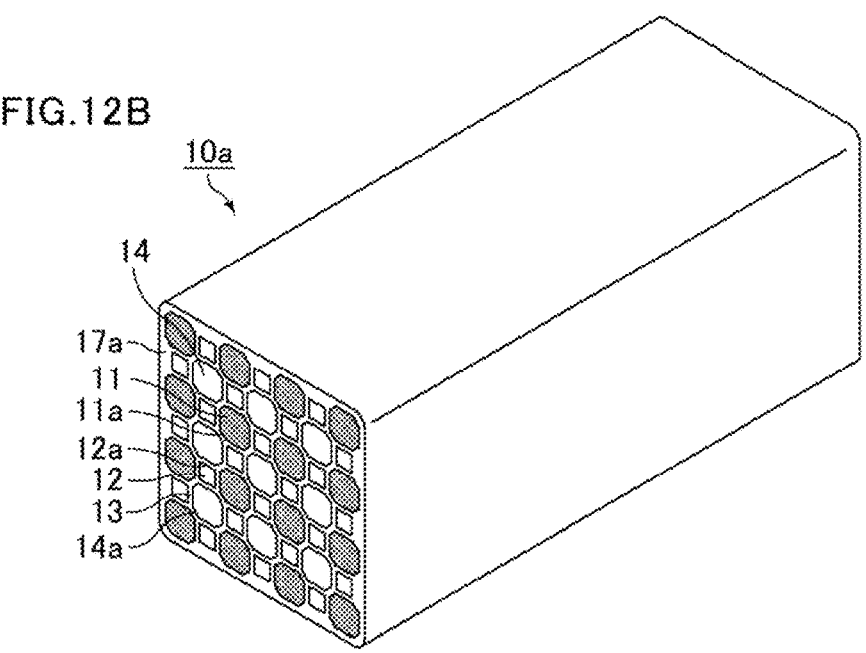

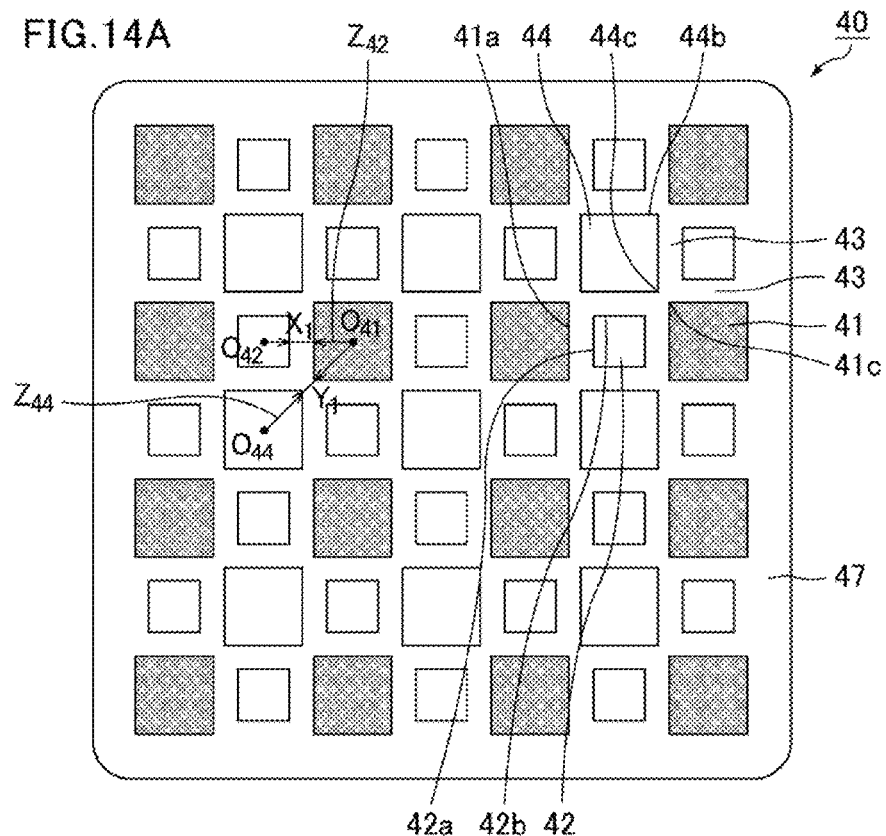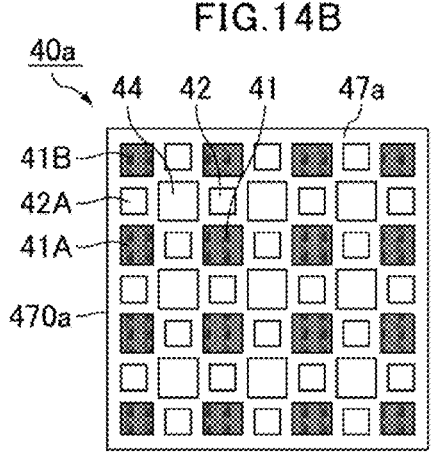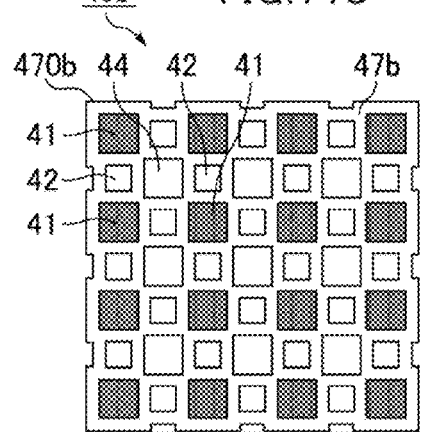

BACKGROUND ART

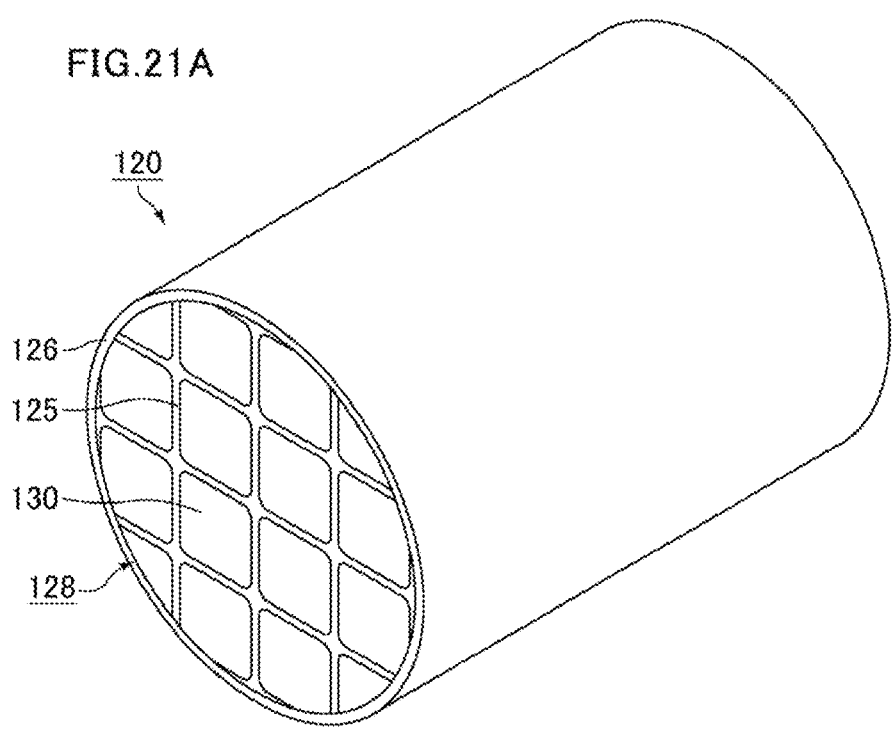
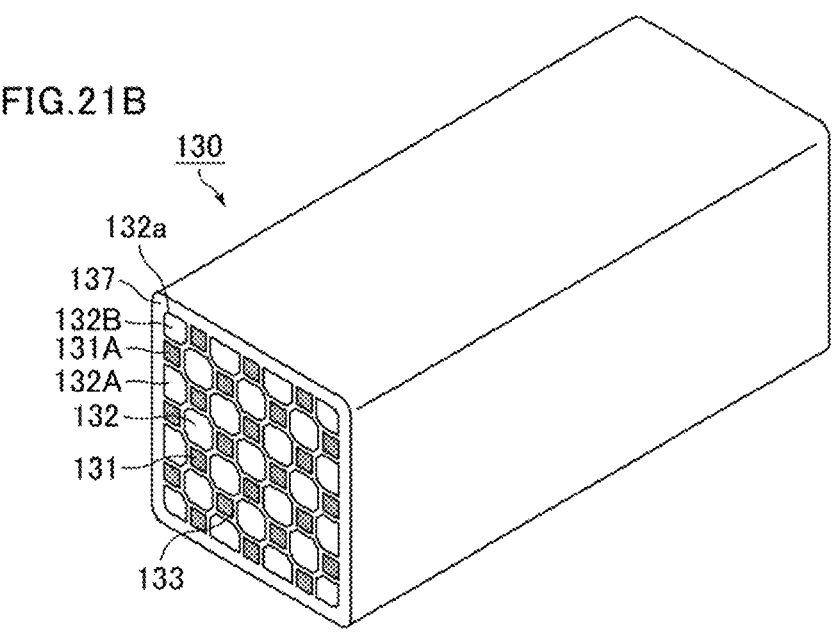

HONEYCOMB FILTER

CROSS-REFERENCE TO RELATED APPLICATIONS

The present application claims priority under 35 U.S.C. §119 to Japanese Patent Application No. 2013-159936, filed Jul. 31, 2013. The contents of this application are incorporated herein by reference in their entirety.

BACKGROUND OF THE INVENTION

Technical Field

The present invention relates to a honeycomb filter.

Background Art

Particulates (hereinafter also referred to as PMs or soot) such as soot in exhaust gas discharged from internal combustion engines including diesel engines cause damage to environment and human bodies, and these days people have paid attention to this problem. Since exhaust gas contains toxic gas components such as CO, HC, and NOx, people also worry about the influences of the toxic gas components on the environment and human bodies.

To overcome this problem, various filters having honeycomb structures (honeycomb filters) formed of porous ceramics such as cordierite and silicon carbide have been proposed as exhaust gas purifying apparatus. Such honeycomb filters are connected to internal combustion engines to capture PMs in exhaust gas, or to convert the toxic gas components such as CO, HC, and NOx in the exhaust gas into nontoxic gas.

In addition to CO in the exhaust gas, it is also necessary to purify CO generated during combustion of PMs captured in the honeycomb filter. JP 2008-284542 A discloses a honeycomb filter which supports an oxidation catalyst on a predetermined area for efficiently converting CO.

For enhancing the fuel economy of internal combustion engines and avoiding troubles derived from an increase in the pressure loss during operation, various honeycomb filters have been proposed including those in which the initial pressure loss is lowered by improvement of the cell structure and those in which the rate of increase in the pressure loss is low when a certain amount of PM is accumulated.

JP 2003-284542 A, WO 2004/024294, U.S. Pat. No. 4,417,908, and WO 2007/134897 disclose such filters.

JP 2008-284542 A discloses a honeycomb filter including: an outlet-side catalyst supporting area formed from an end face on a gas outlet side toward an end face on a gas inlet side; an inlet-side catalyst supporting area formed from an end face on the gas inlet side toward an end face on the gas outlet side; and a catalyst unsupporting area with no catalyst supporting layer, the catalyst unsupporting area being between the outlet-side catalyst supporting area and the inlet-side catalyst supporting area. The catalyst unsupporting area has a higher thermal conductivity than the outlet-side catalyst supporting area and the inlet-side catalyst supporting area. Ratios or the length of the outlet-side catalyst supporting area, the length of the inlet-side catalyst supporting area, and the length of the catalyst unsupporting area, relative to the entire length or the honeycomb filter in the longitudinal direction satisfy a predetermined relationship.

FIG. 19A is a perspective view schematically illustrating a honeycomb filter disclosed in WO 2004/024294. FIG. 19B is a perspective view schematically illustrating a honeycomb fired body forming the honeycomb filter.

As shown in FIGS. 19A and 19B, WO 2004/024294 discloses a honeycomb filter 90 that includes a plurality of honeycomb fired bodies 100 combined with one another with adhesive layers 105 residing therebetween, and an periphery coat layer 106 formed on the periphery of the combined honeycomb fired bodies, wherein the honeycomb fired bodies 100 each include exhaust gas introduction cells 102 each having an open end at an exhaust gas introduction side and a plugged end at an exhaust gas emission side, and exhaust gas emission cells 101 each having an open end at the exhaust gas emission side and a plugged end at the exhaust gas introduction side; the exhaust gas emission cells 101 each have a square cross section perpendicular to the longitudinal direction of the cells; the exhaust gas introduction cells 102 each have an octagonal cross section perpendicular to the longitudinal direction of the cells; and the exhaust gas emission cells 101 and the exhaust gas introduction cells 102 are alternately (in a grid-like pattern) arranged.

Hereinafter, in the explanation of the embodiments of the present invention and background arts, a cell having an open end at an exhaust gas emission side and a plugged end at an exhaust gas introduction side is simply described as an exhaust gas emission cell. Moreover, a cell having an open end at an exhaust gas introduction side and a plugged end at an exhaust gas emission side is simply described as an exhaust gas introduction cell, a first exhaust gas introduction cell, or a second exhaust gas introduction cell.

The term just described as "cell" means both of an exhaust gas emission cell and an exhaust gas introduction cell.

Moreover, cross sections perpendicular to the longitudinal direction of cells including exhaust gas introduction cells, exhaust gas emission cells, or the like are simply described as cross sections of the exhaust gas introduction cells, exhaust gas emission cells, or the like.

FIG. 20A is a perspective view schematically illustrating a honeycomb filter disclosed in U.S. Pat. No. 4,417,908. FIG. 20B is a view schematically illustrating an end face of the honeycomb filter.

U.S. Pat. No. 4,417,908 discloses a honeycomb filter 110 in which all cells have the same square cross-sectional shape as shown in FIGS. 20A and 20B. In the honeycomb filter 110, exhaust gas emission cells 111 each having an open end at an exhaust gas emission side and a plugged end at an exhaust gas introduction side are adjacently surrounded fully by exhaust gas introduction cells 112 and 114 each having an open end at the exhaust gas introduction side and a plugged end at the exhaust gas emission side across cell walls 113. In the cross section, a side of the exhaust gas introduction cell 112 faces the exhaust gas emission cell ill across the cell wall 113, whereas the corners of the exhaust gas introduction cells 114 respectively face the corners of the exhaust gas emission cells 111. Thus, none of the sides forming the cross sections of the exhaust, gas introduction cells 114 faces the exhaust gas emission cells 111.

WO 2007/134897 discloses a honeycomb filter including exhaust gas introduction cells and exhaust gas emission cells, wherein, an exhaust gas emission cell having a hexagonal cross section is surrounded by six exhaust gas introduction cells each having a hexagonal cross section, and the cross-sectional areas of all the exhaust gas introduction cells are larger than the cross-sectional areas of all the exhaust gas emission cells.

SUMMARY OF THE INVENTION

According to one aspect of the present invention, a honeycomb filter includes a plurality of cells, porous cell walls, and an oxidation catalyst. Exhaust gas is to flow through the plurality of cells. The plurality of cells include exhaust gas introduction cells and exhaust gas emission cells. The exhaust gas introduction cells each have an open end at an exhaust gas introduction side and a plugged end at an exhaust gas emission side. The exhaust gas emission cells each have an open end at the exhaust gas emission side and a plugged end at the exhaust gas introduction side. The porous cell walls define rims of the plurality of cells. The oxidation catalyst is supported inside the porous cell walls in an amount of 5 to 60 g/L. The exhaust gas introduction cells and the exhaust gas emission cells each have a uniform cross sectional shape except for a plugged portion in a cross section perpendicular to a longitudinal direction of the plurality of cells thoroughly from the exhaust gas introduction side to the exhaust gas emission side. The exhaust gas emission cells have an average cross sectional area larger than an average cross sectional area of the exhaust gas introduction cells in the cross section perpendicular to the longitudinal direction. A total volume of the exhaust gas introduction cells is larger than a total volume of the exhaust gas emission cells.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7 illustrates how each cell unit (cell structure) is two-dimensionally, i.e. in X and Y directions, repeated in the case where the second exhaust gas introduction cells and the exhaust gas emission cells are octagonal and the first exhaust gas introduction cells are square in the cross section of the cells, and also illustrates how the first exhaust gas introduction cells and the second exhaust gas introduction cells are shared between the cell units (cell structure).

FIG. 8 is an explanatory diagram schematically illustrating a method for measuring the initial pressure loss.

FIG. 9 is an explanatory diagram schematically illustrating a method for measuring the pressure loss.

FIG. 12A is a perspective view schematically illustrating one example of a honeycomb filter according to a third embodiment of the present invention. FIG. 12B is a perspective view illustrating a honeycomb fired body forming the honeycomb filter.

FIG. 14A is an end face view schematically illustrating one example of the cell arrangement at an end face of a honeycomb fired body forming the honeycomb filter according to a fourth embodiment of the present invention. FIG. 14B is an end face view illustrating one modified example of the honeycomb fired body forming the honeycomb filter according to the fourth embodiment of the present invention. FIG. 14C is an end face view illustrating another modified example of the honeycomb fired body forming the honeycomb filter according to the fourth embodiment of the present invention.

FIG. 15 illustrates how each cell unit (cell structure) is two-dimensionally, i.e. in X and Y directions, repeated in the case where the first exhaust gas introduction cells, the second exhaust gas introduction cells, and the exhaust gas emission cells are square in the cross section of the cells, and also illustrates now the first exhaust gas introduction cells and the second exhaust gas introduction cells are shared between the cell units (cell structure).

FIG. 21A is a perspective view schematically illustrating a honeycomb filter according to comparative examples. FIG. 21B is a perspective view schematically illustrating a honeycomb fired body forming the honeycomb filter shown in FIG. 21A.

DESCRIPTION OF THE EMBODIMENTS

Figure 1:
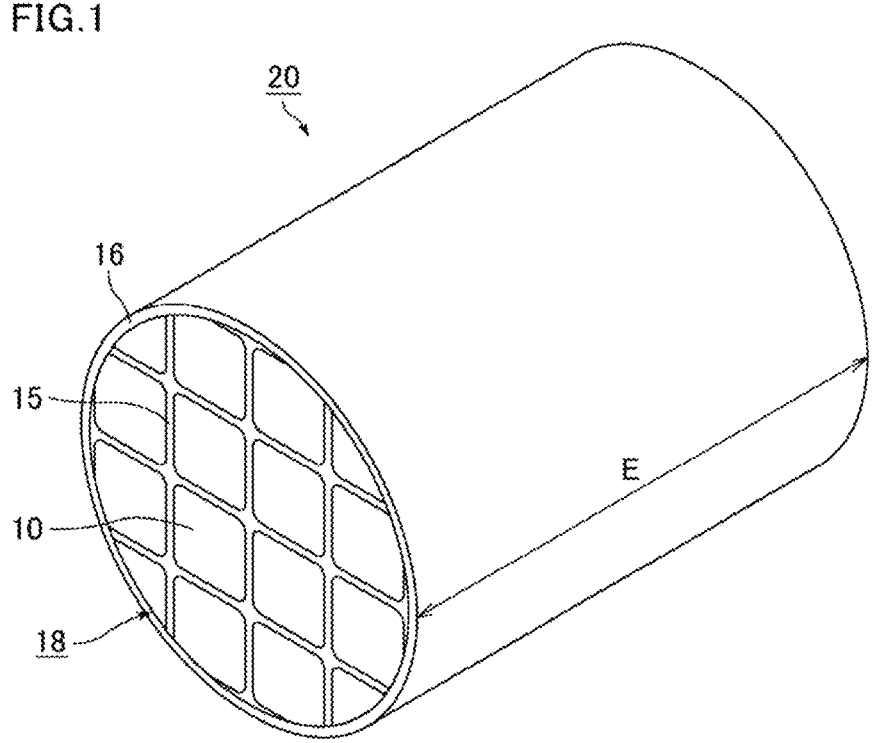
FIG. 1 is a perspective view schematically illustrating one example of a honeycomb filter according to a first embodiment of the present invention.

The embodiments of the present invention include a plurality of cells for allowing exhaust gas to flow therethrough, the cells including exhaust gas introduction cells and exhaust gas emission cells, and porous cell walls defining rims of the plurality of cells, the exhaust gas introduction cells each having an open end at an exhaust gas introduction side and a plugged end at an exhaust gas emission side, the exhaust gas emission cells each having an open end at the exhaust gas emission side and a plugged end at the exhaust gas introduction side, wherein an oxidation catalyst is supported inside the cell walls in an amount of 5 to 60 g/L; the exhaust gas introduction cells and the exhaust gas emission cells each have a uniform cross sectional shape except for the plugged portion in a direction perpendicular to the longitudinal direction of the cells thoroughly from the end at the exhaust gas introduction side to the end at the exhaust gas emission side; the exhaust gas emission cells have a larger average cross sectional area in a direction perpendicular to the longitudinal direction than the exhaust gas introduction cells in a direction perpendicular to the longitudinal direction; and the total volume of the exhaust gas introduction cells is larger than the total volume of the exhaust gas emission cells.

In the honeycomb filter of the embodiments of the present invention, the exhaust gas emission cells have a larger average cross sectional area in a direction perpendicular to the longitudinal direction than the exhaust gas introduction cells in a direction perpendicular to the longitudinal direction. Thus, before accumulation of a certain amount of PMs in the honeycomb filter, exhaust gas having flowed into the exhaust gas introduction cells easily passes through the cell walls to flow into the exhaust emission cells. Moreover, the total volume of the exhaust gas introduction cells is larger than the total volume of the exhaust gas emission cells, which increases the area of the inner walls of the exhaust gas introduction cells where exhaust gas can flow through. Thus, exhaust gas does not locally pass through the cell walls at a high rate, and easily contacts with the catalyst supported on the cell walls. Hence, the honeycomb filter highly efficiently purifies HC and CO in exhaust gas. Furthermore, even immediately after regeneration treatment, the honeycomb filter allows exhaust gas to easily pass inside the cell walls in a direction parallel with the inner walls in the vicinity of the end at the exhaust gas introduction side where PMs are first burned. Exhaust gas easily contacts with the catalyst supported on the cell walls. Hence, the honeycomb filter highly efficiently purifies CO generated by combustion of PMs.

The expression "an oxidation catalyst is supported inside the cell walls" herein means that an oxidation catalyst is supported on the cell walls in a manner that, in an observation of a cross section of the cell walls forming the honeycomb filter with a microscope (e.g., scanning electron microscope (SEM)), the supported catalyst exists inside the outlines of the cell walls. Although, the oxidation catalyst may be supported on the surface (outside or on the outlines of the cell walls) of the cell walls, the oxidation catalyst supported on the surface of the cell walls should not be considered the oxidation catalyst supported inside the cell walls. For not supporting an excessive amount of an oxidation catalyst, the amount of the oxidation catalyst supported on the surface of the cell walls is preferably as small as possible. Desirably, no oxidation catalyst is supported on the surface of the cell walls.

The present inventors see that the pressure loss occurs due to (a) inflow resistance caused by exhaust gas flowing into the honeycomb filter, (b) flow-through resistance in the exhaust gas introduction cells, (c) passage resistance in the cell walls, (d) passage resistance caused by exhaust gas upon passing through a layer of accumulated PMs, (e) flow-through resistance in the exhaust gas emission cells, and (f) outflow resistance caused by exhaust gas flowing out of the honeycomb filter. The inventors found out that, before accumulation of a certain amount of PMs in the honeycomb filter, exhaust gas having flowed into exhaust gas introduction cells is likely to flow long inside the exhaust gas introduction cells toward the end of the honeycomb filter and pass through a local part of the cell walls relatively near the end of the honeycomb filter to flow into exhaust gas emission cells. In each cell of the honeycomb filter of the embodiments of the present invention, (b) passage resistance in the exhaust gas introduction cells is greater than (e) passage resistance in the exhaust gas emission cells, and also (f) outflow resistance caused by exhaust gas flowing out of the honeycomb filter is reduced. Thus, exhaust gas having flowed into the exhaust gas introduction, cells is easily allowed to pass through the entire cell walls in the longitudinal direction to flow into the exhaust gas emission cells.

Immediately after regeneration treatment, (d) passage resistance caused by exhaust gas upon passing through a layer of accumulated PMs is smaller in the vicinity of the end at the exhaust gas introduction side where PMs are first burned, and thus exhaust gas preferentially passes from the exhaust gas introduction cells into the exhaust gas emission cells at the vicinity. The exhaust gas introduction cells, which have a larger total volume, have a large filtration area. Thus, after accumulation of PMs, exhaust gas is allowed to pass inside the cell walls also in a direction parallel with the inner walls of the exhaust gas introduction cells, and can efficiently contacts with the catalyst supported on the cell walls. Hence, the honeycomb filter can have a higher ability of purifying CO caused by combustion of PMs as well as HC and CO in exhaust gas.

The honeycomb filter of the embodiments of the present invention supports an oxidation catalyst in an amount of 5 to 60 g per liter of an apparent volume of the honeycomb filter.

The expression "supports an oxidation catalyst" herein means that an oxide having a high specific surface area of more than 50 $m^2$/g, such as alumina, silica, ceria, or zirconia, is supported as a catalyst support, and further a noble metal, snob as platinum (Pt), Rhodium (Rh), or Palladium (Pd), is supported on the catalyst support in the honeycomb filter. The amount of 5 to 60 g/L means the total amount of the oxide and the noble metal supported. The amount of the noble metal supported is preferably 0.5 to 5 g per liter of an apparent volume of the honeycomb filter.

If an oxidation catalyst is supported inside the cell walls in an amount of 5 to 60 g/L, a sufficient CO and HC purification ratio can be achieved. Also an increase in the pressure loss of the honeycomb filter due to supporting of the catalyst can be minimized.

An amount of an oxidation catalyst supported of less than 5 g/L is too small, which makes it difficult to sufficiently purify HC and CO in exhaust gas and CO generated by combustion of PMs. An amount of an oxidation catalyst supported of more than 60 g/L is too large. Thus, exhaust gas hardly passes through pores so that the pressure loss increases.

Preferably, in the honeycomb filter of the embodiments of the present invention, in addition to the above structure, each exhaust gas emission cell is adjacently surrounded fully by the exhaust gas introduction cells across the porous cell walls;

the exhaust gas introduction cells include first exhaust gas introduction cells and second exhaust gas introduction cells each having a larger cross sectional area than each first exhaust gas introduction cell in a direction perpendicular to the longitudinal direction of the cells;

each exhaust gas emission cell has an equal or larger cross sectional area than, each second exhaust gas introduction cell in a direction perpendicular to the longitudinal direction of the cells;

in the cross section perpendicular to the longitudinal direction of the cells, the exhaust gas introduction cells and the exhaust gas emission cells are each polygonal; and a side forming the cross sectional shape of each first exhaust gas introduction cell faces one of the exhaust gas emission cells, a side forming the cross sectional shape of each second exhaust gas introduction cell faces one of the exhaust gas emission cells, and the side of the first exhaust gas introduction cell is longer than the side of the second exhaust gas introduction cell, or a side forming the cross sectional shape of each first exhaust gas introduction cell faces one of the exhaust gas emission cells, and none of the sides forming the cross sectional shape of each second exhaust gas introduction cell faces the exhaust gas emission cells.

The honeycomb filter having the above configuration can have a smaller initial pressure loss compared to conventional honeycomb filters. Even after accumulation of a large amount of PMs on the cell walls, the rate of increase in the pressure loss is small. As a result, the pressure loss is improved over the entire period from the initial stage to after accumulation of PMs in close to the limit amount.

With regard to the resistances (a) to (f) which are factors of pressure loss, the study of the inventors has revealed that the factors (c), (e), and (f) are controlling factors of the initial, pressure loss that occurs before accumulation of PMs, and that the factors (a), (b), and (d) are controlling factors of the transitional pressure loss that occurs after accumulation of a certain amount of PMs. One of the controlling factors of the initial pressure loss is not the factor (b) flow-through resistance in the exhaust gas introduction cells but the factor (e) flow-through resistance in the exhaust gas emission cells because the aperture ratio of the honeycomb filter based on the exhaust gas emission cells is smaller than the aperture ratio of the honeycomb filter based on the exhaust gas introduction cells. Similarly, the inventors consider the factor (f) outflow resistance caused by exhaust gas flowing out of the honeycomb filter, not the factor (a) inflow resistance caused by exhaust gas flowing into the honeycomb filter, as one of the controlling factors of the initial pressure loss because they suppose that the resistance due to compression of the gas is smaller than the resistance due to disturbance of emission of the exhaust gas caused by eddying flow of the gas that occurs near the end of the cells when the gas rapidly expands upon emission from the cells.

Since the honeycomb filter of the embodiments of the present invention has the exhaust gas introduction cells arranged to fully surround the exhaust gas emission cells across porous cell walls, there are no other openings from which exhaust gas can flow out around each exhaust gas emission cell on the exhaust gas emission side. This structure is less likely to cause large eddying flow or tire like upon emission of exhaust gas. This lowers the outflow resistance of the factor (f). Moreover, since the entire area of the cell walls can be used for filtration, PMs are likely to be thinly and uniformly accumulated on the inner walls of the exhaust gas introduction cells, lowering the (d) passage resistance through a layer of accumulated PMs. Thus, in the provided honeycomb filter, the pressure loss is small at the initial stage and is less likely to increase even after accumulation of PMs.

The phrase "cross sectional shape of a cell" herein refers to a shape formed by an inner cell wall of the exhaust gas emission cell, first exhaust gas introduction cell, or second exhaust gas introduction cell in the direction perpendicular to the longitudinal direction of the cell.

The phrase "cross sectional area of a cell" herein refers to an area of a cross sectional shape formed by an inner cell wall of the exhaust gas emission cell, first exhaust, gas introduction cell, or second exhaust gas introduction cell in a cross section perpendicular to the longitudinal direction of the cell. The term "inner cell wall" refers to a surface on the inner side of a cell among surfaces of cell walls.

Moreover, the term "side" herein refers to a segment between vertices of a polygon in the case where cross sectional shapes formed by inner cell walls of the exhaust gas emission cells, the first exhaust gas introduction cells, or the second exhaust gas introduction cells are polygons in a direction perpendicular to the longitudinal direction of the cells.

The phrase "volume of a cell" refers to a volume of a part surrounded by inner walls except for the plugged portion of the cell. The term "total volume" refers to the total sum of the volumes. The volume of the cell is calculated by multiplying the cross sectional area of the cell and the length of the cell excluding the length of the plugged portion.

Furthermore, the term "length of a side" means the length of the segment. In the case of roundly-cornered shapes with the vertex portions formed by curved lines (so-called chamfered shape), the length of a side means the length of a straight line excluding the curved line portions for the following reasons.

In the case where the vertex portions are formed by curved lines, the cell walls separating the cells are thick in the curve portions, and thus the curve portions have high passage resistance. This causes exhaust gas to preferentially flow into straight line portions, and thus the length of the straight portions needs to be controlled. Hence, it is reasonable to exclude the curve portions from consideration.

Provided that the straight portions of a polygon are hypothetically extended, and intersections of the hypothetical straight lines are given as hypothetical vertices, the length of the straight portion of the side excluding the curve portion is preferably not less than 80% the length of a hypothetical side given by connecting the hypothetical vertices. In the case of the cell having a polygonal cross sectional shape in which the sides have not less than 80% the length of the hypothetical sides, a main-channel-switching effect, which is a functional effect of the embodiments of the present invention, can be achieved by adjusting the length of the sides.

In the honeycomb filter according to the embodiments of the present invention, a side forming the cross sectional shape of a first exhaust gas introduction cell or a second exhaust gas introduction cell is considered to face an exhaust gas emission cell when the following condition is satisfied. Provided that, in the cross section perpendicular to the longitudinal direction of cells, a hypothetical perpendicular line (hereinafter referred to as a perpendicular bisector) which bisects a side of a polygon formed by the inner cell wall of a first exhaust gas introduction cell or a second exhaust gas introduction cell is given from the side to outside the first exhaust gas introduction cell or the second exhaust gas introduction cell, the perpendicular bisector crosses a shape region defined by the inner cell wall of an exhaust gas emission cell which is adjacent to the first exhaust gas introduction cell or a second exhaust gas introduction cell across a cell wall.

In such a case, a first exhaust gas introduction cell or second exhaust gas introduction cell having a side facing an exhaust gas emission cell is considered to face the exhaust gas emission cell.

In the honeycomb filter according to the embodiments of the present invention, a side forming the cross sectional shape of an exhaust gas emission cell is considered to face a first exhaust gas introduction cell or a second exhaust gas introduction cell when the following condition is satisfied. Provided that, in the cross section perpendicular to the longitudinal direction of cells, a hypothetical perpendicular line (hereinafter referred to as a perpendicular bisector) which bisects a side of a polygon formed by the inner cell wall of an exhaust gas emission cell is given from the side to outside the exhaust gas emission cell, the perpendicular bisector crosses a shape region defined by the inner cell wall of a first exhaust gas introduction cell or a second exhaust gas introduction cell which is adjacent to the exhaust gas emission cell across a cell wall.

In such a case, an exhaust gas emission cell having a side facing a first exhaust gas introduction cell or a second exhaust gas introduction cell is considered to face the first exhaust gas introduction cell or the second exhaust gas introduction cell.

Moreover, in the honeycomb filter according to the embodiments of the present invention, a side forming a first exhaust gas introduction cell is considered to face a second exhaust gas introduction cell when the following condition is satisfied. Provided that, in the cross section perpendicular to the longitudinal, direction of cells, a hypothetical perpendicular line (hereinafter referred to as a perpendicular bisector) which bisects a side of a polygon formed by the inner cell wall of a first exhaust gas introduction cell is given from the side to outside the first exhaust gas introduction cell, the perpendicular bisector crosses a shape region defined by the inner cell, well of a second exhaust gas introduction cell which is adjacent to the first exhaust gas introduction cell across a cell wall.

In such a case, a first exhaust gas introduction cell having a side facing a second exhaust gas introduction cell, is considered to face the second exhaust gas introduction cell.

Furthermore, in the honeycomb filter according to the embodiments of the present invention, a side forming a second exhaust gas introduction cell is considered to face a first exhaust gas introduction cell when the following condition is satisfied. Provided that, in the cross section perpendicular to the longitudinal direction of cells, a hypothetical perpendicular line (hereinafter referred to as a perpendicular bisector) which bisects a side of a polygon teamed by the inner cell wall of a second exhaust gas introduction cell is given from the side to outside the second exhaust gas introduction cell, the perpendicular bisector crosses a shape region defined by the inner cell wall of a first exhaust gas introduction cell which is adjacent to the second exhaust gas introduction cell across a cell wall.

In such a case, the second exhaust gas introduction cell having a side facing a first exhaust gas introduction cell is considered to face the first exhaust gas introduction cell.

In the honeycomb filter of the embodiments of the present invention, the thickness of a cell wall separating two cells is defined as follows.

Namely, in the cross section perpendicular to the longitudinal direction of cells, provided that a hypothetical straight line is given which connects geometric centers of gravity of cross sectional figures defined by the inner cell walls of two cells, the length of a segment of the straight line overlapping the cell wall area is defined as the thickness of the cell wall. Although cells are void, the centers of gravity herein refer to geometric centers of gravity of cross sectional figures defined by inner cell walls. Thus, the center of gravity can be defined even for cross sectional figures of void such as cells.

The word "adjacent" herein is equivalent to the word "adjacent" in Japanese. The word "adjacent" is used not only for a case where exhaust gas introduction cells are arranged to face exhaust gas emission cells across porous cell walls, but also for a case where exhaust gas introduction cells are not facing but arranged diagonally to exhaust gas emission cells across porous cell walls. In Japanese, the expression "Lattices are diagonally adjacent to each other" is accepted as an exemplary expression using "adjacent".

Figure 2A:
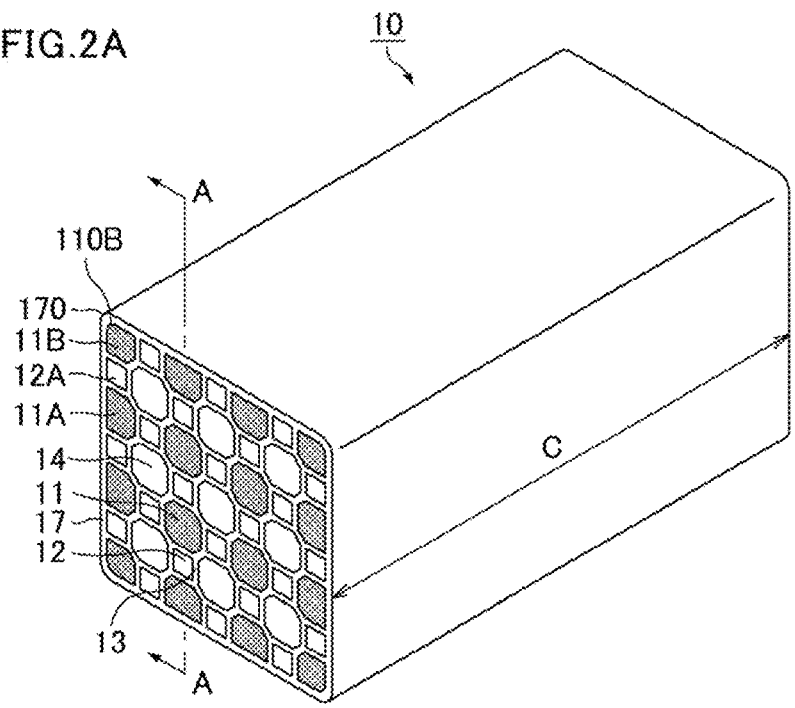
FIG. 2A is a perspective view schematically illustrating one example of a honeycomb fired body forming the honeycomb filter in FIG. 1.
Figure 2B:
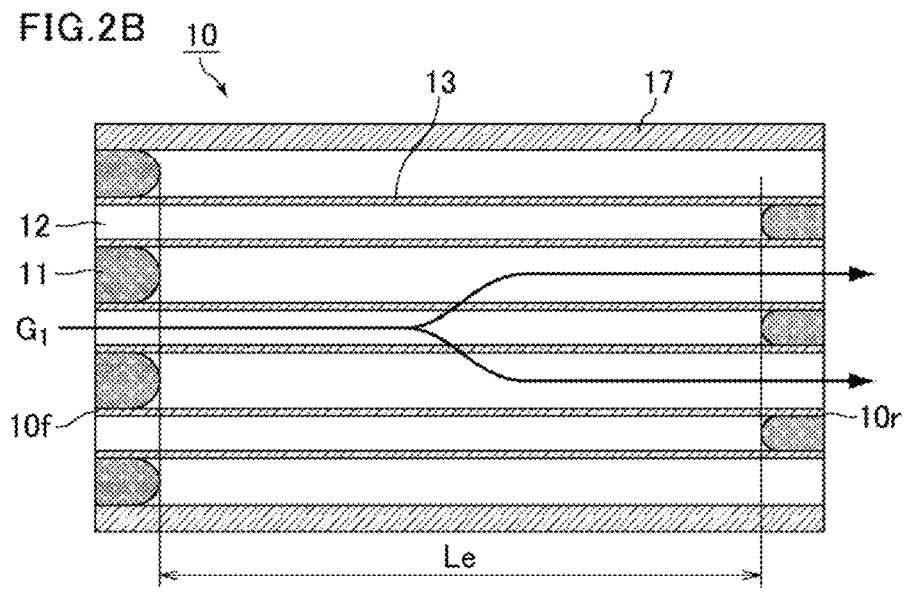
FIG. 2B is an A-A line cross sectional view of the honeycomb fired body in FIG. 2A.
Figure 3A:
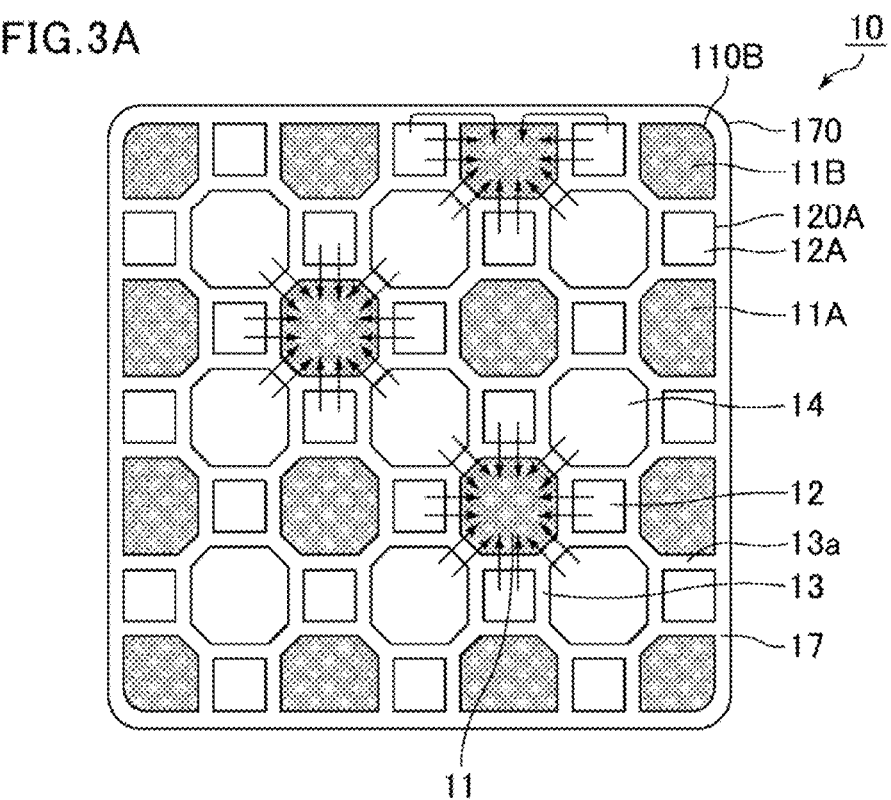
FIG. 3A is an end face view illustrating an end of a honeycomb filter according to one embodiment of the present invention.
Figure 3B:
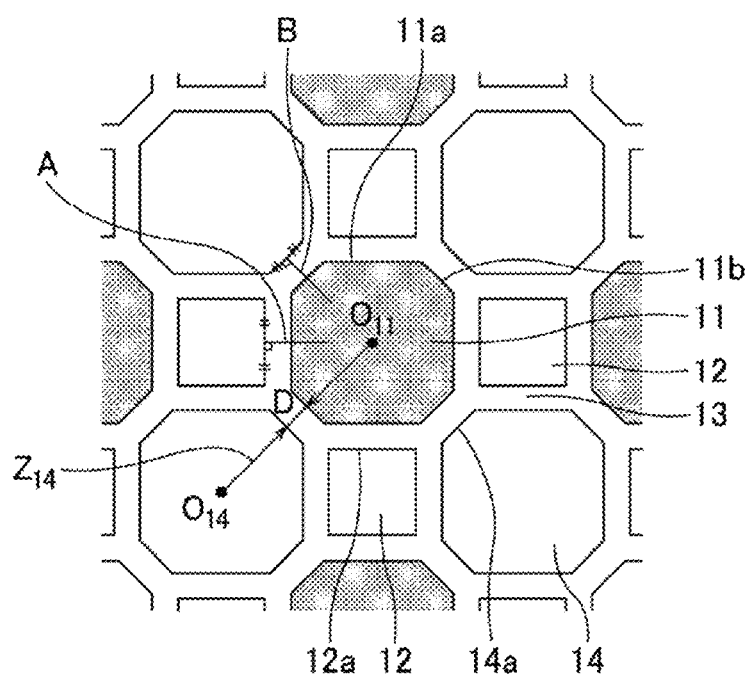
FIG. 3B is an enlarged end face view illustrating an enlarged image of a part of an end face of a honeycomb filter according to one embodiment of the present invention.

FIG. 1 is a perspective view schematically illustrating one example of a honeycomb filter according to a first embodiment of the present invention. FIG. 2A is a perspective view schematically illustrating one example of a honeycomb fired body forming the honeycomb filter in FIG. 1. FIG. 2B is an A-A line cross sectional view of the honeycomb fired body in FIG. 2A. FIG. 3A is an end face view illustrating an end of a honeycomb filter according to one embodiment of the present invention. FIG. 3B is an enlarged end face view illustrating an enlarged image of a part of an end face of a honeycomb filter according to one embodiment of the present invention.

Figure 16:
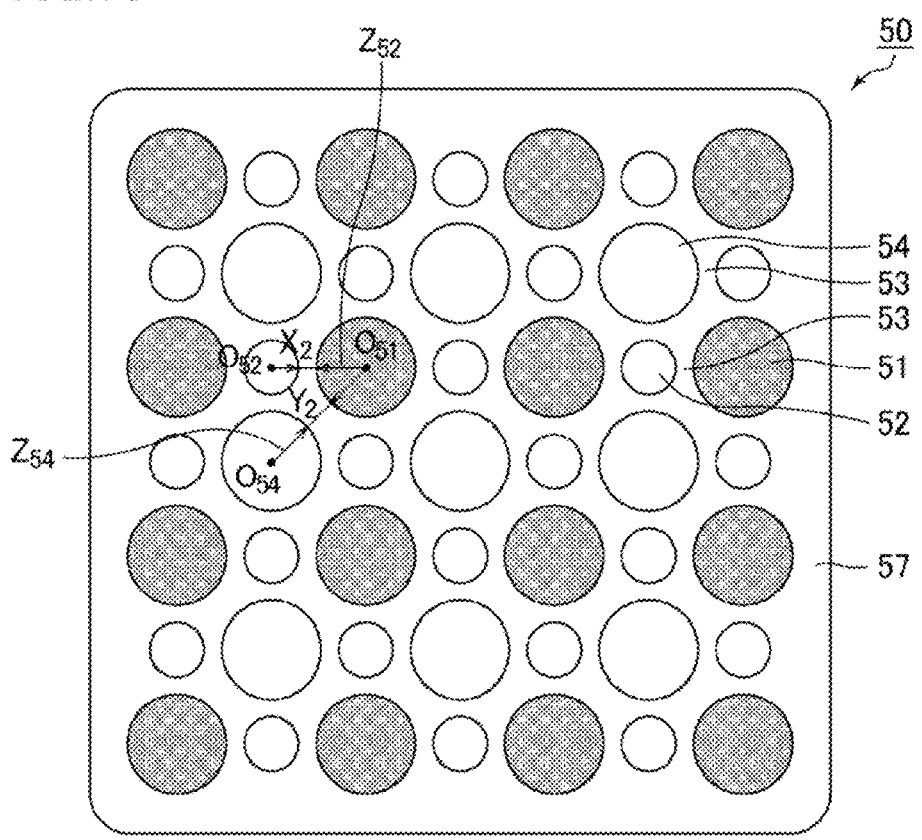
FIG. 16 is an end face view schematically illustrating one example of the cell arrangement in an end face of a honeycomb fired body forming the honeycomb filter according to a fifth embodiment of the present invention.

The case where exhaust gas introduction cells and exhaust gas emission cells each have a polygonal cross sectional shape and are arranged to face each other across porous cell walls is specifically illustrated in FIGS. 2A to 3B. In FIGS. 2A to 3B, second exhaust gas introduction cells 14 face exhaust gas emission cells 11 across porous cell walls 13. In a case where exhaust gas introduction cells and exhaust gas emission cells each have a round or elliptical cross sectional shape and a single porous cell wall is formed by curves of the cross sectional shapes of an exhaust gas introduction cell and an exhaust gas emission cell (a case where a curve of the inner wall of an exhaust gas emission cell and a curve of the inner wall of an exhaust gas introduction cell form the front side and the rear side of a single cell wall in a three-dimensional view), the exhaust gas introduction cell and the exhaust gas emission cell are considered to be arranged to face each other across a porous cell wall according to the case where exhaust gas introduction cells and exhaust gas emission cells each have a polygonal cross sectional shape. Specifically, such a case is illustrated in FIG. 16. In FIG. 16, second exhaust gas introduction cells 54 are considered to face exhaust gas emission cells 51 across porous cell walls 53.

The case where exhaust gas introduction cells and exhaust gas emission cells each have a polygonal cross sectional shape and are not arranged to face each other but arranged diagonally across porous cell walls is specifically illustrated in FIGS. 14A to 14C. In FIGS. 14A to 14C, second exhaust gas introduction cells 44 and exhaust gas emission cells 41 do not face each other and are arranged diagonally across porous cell walls 43.

In a case where exhaust gas introduction cells and exhaust gas emission cells each have a shape formed by curved lines, except for round or elliptical shape, an intersection of two curved lines is considered to be a vortex and a curved line between two vertices is considered to be a side. Here, a side (curved line) of an exhaust gas emission cell or exhaust gas introduction cell is considered to face an exhaust gas introduction cell or exhaust gas emission cell when the following condition is satisfied. Provided that a hypothetical perpendicular line which bisects a segment between vertices at the both ends of a side (curved line) forming the cross sectional shape of an exhaust gas emission cell or an exhaust gas introduction cell (A) is given from the side toward the outside the exhaust gas emission cell or the exhaust gas introduction cell (A), the perpendicular bisector crosses a shape region defined by the inner cell wall of an exhaust gas introduction cell or an exhaust gas emission cell (B) that is closest to the cell (A) across a cell wall. Moreover, the exhaust gas emission cell or the exhaust gas introduction cell (A) is described to face the exhaust gas introduction cell or the exhaust gas emission cell (B). In the case of the vertex portions formed by curved lines (so-called chamfered shape), the curved lines are extended, and the hypothetical intersection of the extended lines is considered to be a vertex.

Figure 17:
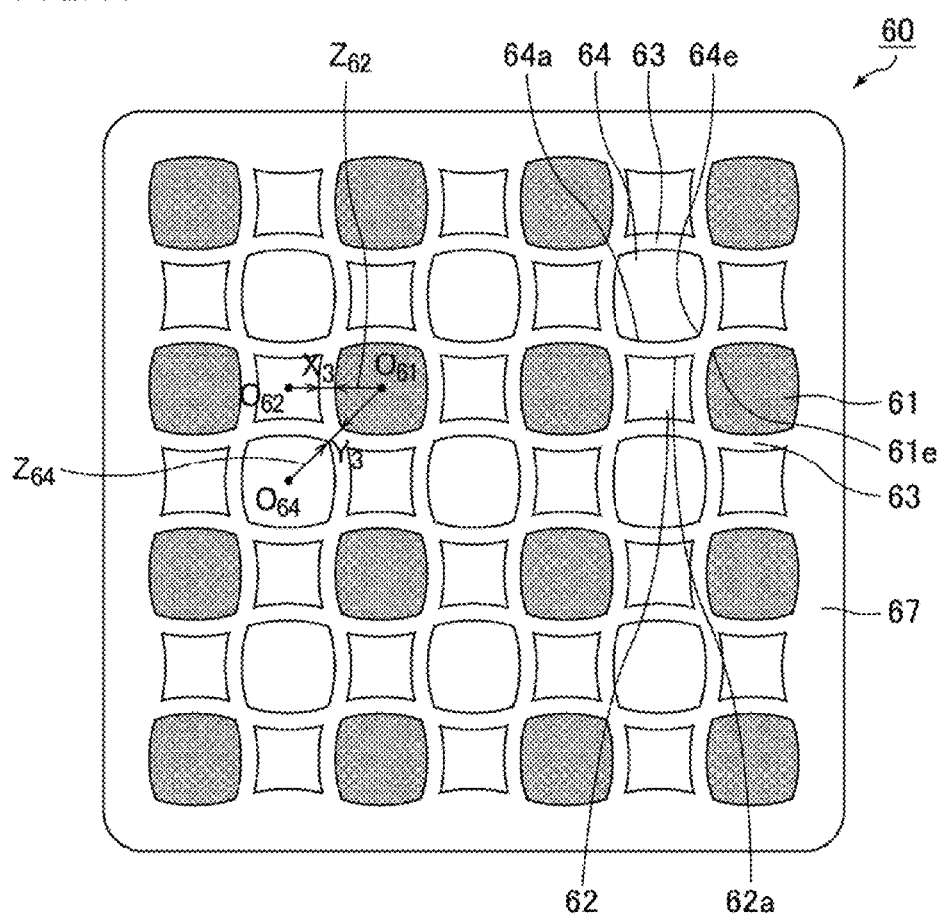
FIG. 17 is an end face view schematically illustrating one example of a honeycomb fired body forming a honeycomb filter according to a sixth embodiment of the present invention.

In a case where exhaust gas introduction cells and exhaust gas emission cells each have a shape formed by curved lines, except for round or elliptical shape, a case where exhaust gas introduction cells end exhaust gas emission cells do not face each other and are arranged diagonally across porous cell walls is specifically illustrated in FIG. 17. In FIG. 17, exhaust gas introduction cells 64 and exhaust gas emission cells 61 do not face each other and are arranged diagonally across porous cell walls 63.

The sentence "each of the exhaust gas emission cells is adjacently surrounded fully by the exhaust gas introduction cells across the porous cell walls" can encompass "each exhaust gas emission cell is enclosed all around by the adjacent exhaust gas introduction cells across the porous cell walls" in the present application.

Here, the phrase "arranges diagonally" refers to the arrangement in which exhaust gas introduction cells and exhaust gas emission cells do not face each other and satisfy the following condition. In a cross section perpendicular to the longitudinal direction of an exhaust gas emission cell, a hypothetical segment between the geometrical center of gravity and a vertex (in the case of chamfered vertex portions, sides (straight or curved lines) forming the cross sectional figure are hypothetically extended and an intersection of the extended lines is considered to be a vertex) of a cross sectional figure formed by the inner cell wall of the exhaust gas emission cell is provided. In a cross section perpendicular to the longitudinal direction of an exhaust gas introduction cell, a hypothetical segment between the geometrical center of gravity and a vertex (in the case of chamfered vertex portions, sides (straight or curved lines) forming the cross sectional figure are hypothetically extended and an intersection of the extended lines is considered to be a vertex) of a cross sectional figure formed by the inner cell wall of the exhaust gas introduction cell is provided. Here, the provided hypothetical segments are parallel with each other or overlapped with each other. It is to be noted that, if a pair of hypothetical lines among plural hypothetical lines is parallel or overlapped with each other, the other hypothetical lines may be across with each other at a predetermined angle (e.g., 90°).

In the description of the term "adjacent", the term "exhaust gas introduction cell" refers to both the first exhaust gas introduction cell and the second exhaust gas introduction cell.

Next, a side which faces a cell and the thickness of a cell wall separating two cells are explained below based on figures.

FIG. 3B is an enlarged end face view illustrating an enlarged image of a part of an end face of the honeycomb filter according to one embodiment of the present invention. FIG. 3B illustrates exhaust gas emission cells 11, and first exhaust gas introduction cells 12 and second exhaust gas introduction cells 14 surrounding the exhaust gas emission cells 11.

A side forming the cross sectional shape of a first exhaust gas introduction cell 12 or a second exhaust gas introduction cell 14 is considered to face an exhaust gas emission cell 11 when the following condition is satisfied. Provided that, in the cross section perpendicular to the longitudinal direction of the cells shown in FIGS. 3A and 3B, a hypothetical perpendicular line (hereinafter referred to as a perpendicular bisector) which bisects a side 12a of a polygon formed by the inner cell wall of a first exhaust gas introduction cell 12 or a side 14a of a polygon formed by the inner cell wall of a second exhaust gas introduction cell 14 is given from the side to outside the first exhaust gas introduction cell 12 or the second exhaust gas introduction cell 14, the perpendicular bisector A or the perpendicular bisector B crosses a shape region (side 11a, side 11b) defined by the inner cell wall of an exhaust gas emission cell 11 which is adjacent to the side 12a of the first exhaust gas introduction cell 12 or the side 14a of the second exhaust gas introduction cell 14 across a cell wall as shown in FIGS. 3A and 3B.

The reason why the crossing of the bisector is set as a condition for the facing in the embodiments of the present invention is that the passage resistance caused upon allowing exhaust gas to pass through at or around the center of the side in the length direction, i.e. at or around the center of the cell wall separating the exhaust gas introduction cell and the exhaust gas emission cell, represents a pressure loss caused upon allowing exhaust gas to pass through the entire wall.

According to the embodiments of the present invention, in the case where the cross sectional shape defined by the inner cell wall of each exhaust gas emission cell, first exhaust gas introduction cell, or second exhaust gas introduction cell is a polygon, and the vertex portions of the polygon are chamfered, i.e. formed by curved lines in the cross section perpendicular to the longitudinal direction of the cells, the bisectors of respective sides are bisectors of segments excluding the curved lines.

Moreover, in the case where the vertex portions are roundly-cornered, i.e. formed by curved lines, the curved lines are not included in the sides. In the case where the vertex portions are chamfered in the cross sectional shape, the sides forming the cross sectional shape are hypothetically extended, and intersections of the extended sides are considered as hypothetical vertices. Hence, the cross sectional shape is treated as a polygon.

This is based on the following intention. For manufacturing a honeycomb filter including cells having polygonal cross sectional shapes in the cross section perpendicular to the longitudinal direction of the cells by extrusion molding, the vertex portions of the polygonal cross sectional shapes may be formed by curved lines to prevent concentration of stress at the vertex portions. Such cross sections in which the vertex portions are formed by curved lines are considered as polygons.

The thickness of a cell wall separating two cells is defined as follows.

Namely, in the cross section perpendicular to the longitudinal direction of the cells shown in FIGS. 3A and 3B, provided that a hypothetical line $Z_{14}$ is given which connects geometric centers of gravity of the cross sectional figures defined by the inner cell walls of the two cells (the center of gravity of the exhaust gas emission cell 11 is $O_{11}$, and the center of gravity of the second exhaust gas introduction cells is $O_{14}$ in FIGS. 3A and 3B), the length D of the segment of the line $Z_{14}$ overlapping the cell wall area is defined as the thickness of the cell wall. Although cells are voids, the centers of gravity herein refer to geometric centers of gravity of cross sectional figures defined by inner cell walls. Thus, the center of gravity can be defined even for cross sectional figures of voids such as cells.

The thickness of the cell wall is defined as above for the following reasons. The passage resistance caused upon allowing gas to pass through the cell walls is the highest at a portion of the cell wall where the gas passes through at the highest flow rate, and the passage resistance at the portion may represent the passage resistance of the cell wall. The flow rate of gas in the longitudinal direction of the honeycomb filter is the highest at positions corresponding to the geometric centers of gravity of the cross sectional shapes defined by the inner cell walls. The flow rate concentrically decreases from the center of gravity toward the circumference of the cross sectional shape of the cells. Thus, the flow rate of gas passing through a cell wall is the highest at as intersection of the cell wall and a line connecting the center of gravity of an exhaust gas introduction cell and the center of gravity of an exhaust gas emission cell. In view of the pressure loss as described above, it is reasonable to define a length D of the segment of a portion where a straight line connecting the centers of gravity overlaps the cell wall area as the thickness of a cell wall.

According to the embodiments of the present invention, electron microscope pictures are used for measurement of the length of sides and the thickness of cell walls, and identification of the cross sectional shapes of cells. The electron microscope pictures are taken with an electron microscope (FE-SEM: High resolution field emission scanning electron microscope S-4800, manufactured by Hitachi High-Technologies Corporation).

The electron microscope pictures are preferably those taken by the electron microscope at a magnification of 30×. This is because, at a magnification of 30×, irregularities due to particles or pores on the surface (inner wall) of cell walls defining the rims of cells do not disturb identification of the cross sectional shapes of the cells, measurement of the lengths of sides, thicknesses of cell walls, and cross sectional area of the cells. Also, at a magnification of 30×, the cross sectional shapes of the cells can be identified, and the lengths of sides, thicknesses of cell walls, and cross sectional area of the cells can be measured.

In other words, the lengths of the respective sides of the cell are measured using the scale of the electron microscope photographs based on the above definitions of the length of the cells and the thickness of the cell walls. The cross sectional area is arithmetically determined based on the obtained values including the length of the cells. If arithmetic calculation of the cross sectional area is complicated, the cross sectional area can also be determined by cutting a square piece (a square with a side having a scale length) corresponding to a unit area out of the electron microscope photograph, and weighing the cut-out piece, while separately cutting the cross section of the cell out along the cross sectional shape of the cell (along curved lines in the case of a polygonal cross section with the vertex portions formed by curved lines), and weighing the cut-out piece, and then calculating the cross sectional area of the cell based on the weight ratio.

Figure 4A:
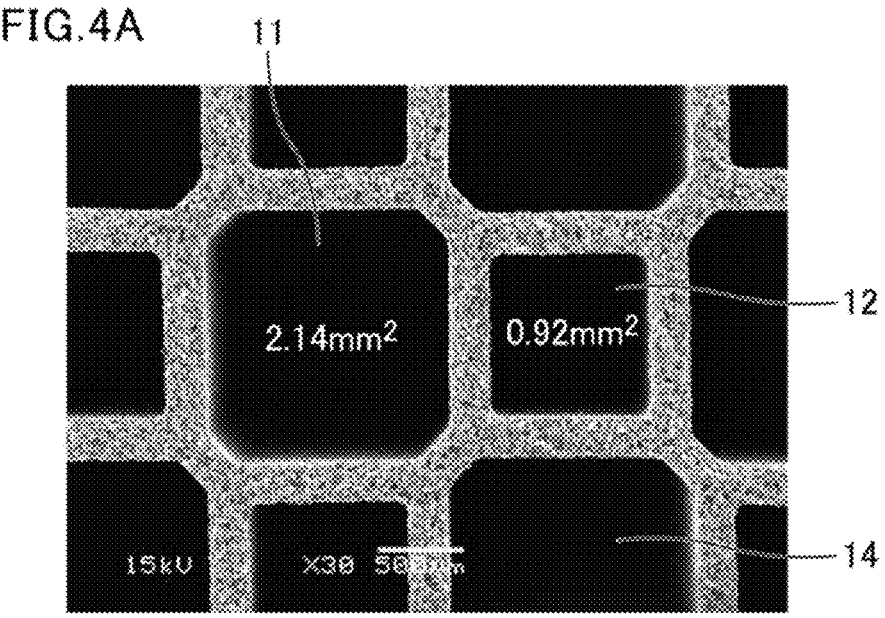
FIGS. 4A and 4B are each a scanning electron microscope photograph (SEM photograph) showing one example of the cross sections of cells.

For example, in FIG. 4A, the cross sectional shapes defined by the inner walls of the exhaust gas emission cells and the second exhaust gas introduction cells are octagons having the same cross sectional area from one another, and the cross sectional shapes defined by the respective inner walls of the first exhaust gas introduction cells are square (although the vertex portions have so-called roundly-cornered shape (i.e. formed by curved lines), the cross sectional shapes are each considered as a square having four sides and four vertices at four intersections of straight lines extended from the four sides forming the cross sectional shape in the embodiments of the present invention). In the photograph, a 500 µm scale is displayed. A square (corresponding to a unit area) having each side in a length corresponding to 500 µm in the photograph is cut out of the photograph, and the cut-out piece is weighed. Next, the octagon and the square are cut out of the photograph (the four vertex portions formed by curved lines in the square are cut along the curved lines), and the cut-out pieces are weighed. The cross sectional area is calculated based on the weight ratio between the cut-out piece and the 500 µm scale square. In the case of measuring only the cross sectional area ratio of the cells, the area ratio can be obtained directly from the weight ratio between the octagon and the square.

According to the embodiments of the present invention, the measurement of the lengths of the cells, the thicknesses of the cell walls, and the cross sectional areas can be changed from the above manual measurement to an electronic measurement by scanning the electron microscope photograph as image data, or using the image data directly output from the electron microscope and entering the scale of the photograph. The manual measurement and the electronic measurement are both based on the scale of the electron microscope image, and are in accordance with the same principle. Thus, surely no discrepancies are found between the measurement results of the respective measurements.

For example, the electronic measurement may be performed by using an image analysis and grain size distribution measurement software (Mac-View (Version 3.5), produced by Mountech Co. Ltd.). This software measures a cross sectional area by scanning an electron microscope photograph as image data, or using the image data directly output from the electron microscope, entering the scale of the photograph, and specifying the area along the inner wall of the cell. Moreover, the distance between any two points in the image can be measured based on the scale of the electron microscope photograph.

A photograph of the cross section of the cells is taken with the electron microscope by cutting a filter in a direction perpendicular to the longitudinal direction of the cells in prepare a 1 cm×1 cm×1 cm sample including the cut face and ultrasonic cleaning the cut section of the sample, or coating a filter with resin and cutting the coated filter in a direction perpendicular to the longitudinal direction of the cells, and then taking an electron microscope photograph of the sample. The resin coating does not affect measurement of the lengths of she sides of the cells and the thicknesses of the cell walls.

Figure 4B:
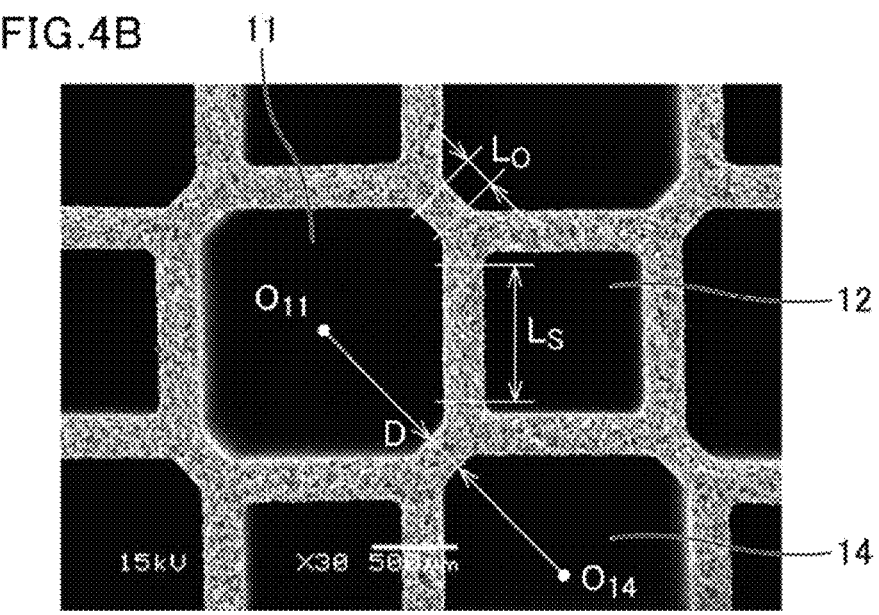

FIGS. 4A and 4B are each a photograph showing one example of the shape of the cross section of cells taken with a measuring microscope.

FIG. 4A reveals that the cross sectional shapes of the exhaust gas emission cells 11 and the second exhaust gas introduction cells 14 are each octagonal. The cross sectional shape of the first exhaust gas introduction cells 12 is square. The vertex portions of each first exhaust gas introduction cell are formed by slightly curved lines; however, extension of the four sides, which are straight lines, of the first exhaust gas introduction cell 12 intersect at four intersections to form a square having the intersections as vertices. Thus, the cross section of the cell is considered square according to the definition of the embodiments of the present invention.

Moreover, calculation with MAC-View (Version 3.5) reveals that the area of the cross sectional shape (cross sectional area) of the exhaust gas emission cell 11 and the second exhaust gas introduction cell 14 is 2.14 mm$^2$, and the area of the cross sectional shape (cross sectional area) of the first exhaust gas introduction cell 12 is 0.92 mm$^2$.

Furthermore, as shown in FIG. 4B, since the four vertex portions of the first exhaust gas introduction cell 12 are formed by curved lines, the length of a side Ls facing the exhaust gas emission cell 11 among the sides forming the cross sectional shape of the first exhaust gas introduction cell 12 is the length excluding the curved portions. Additionally, the length Lo of a side facing the exhaust gas emission cell among the sides forming the cross sectional shape of the second exhaust gas introduction cell 14 corresponds to the distance between the vertices of the octagon.

As described above, the lengths of the sides Ls and Lo, and the cross sectional area can be measured using the electron microscope photograph.

Figure 5A:
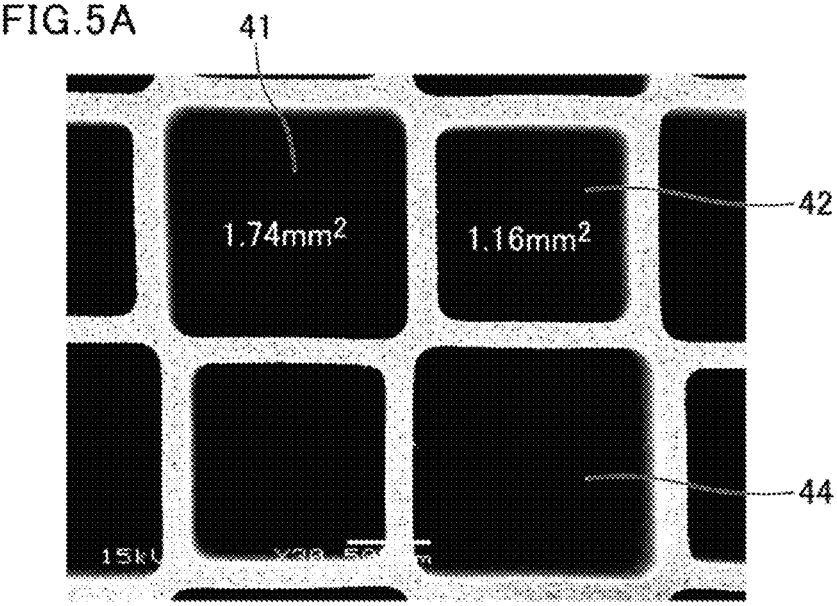
FIGS. 5A and 5B are each a scanning electron microscope photograph (SEM photograph) showing one example of the cross sectional shapes of cells that are different from the cells shown in FIGS. 4A and 4B.
Figure 5B:
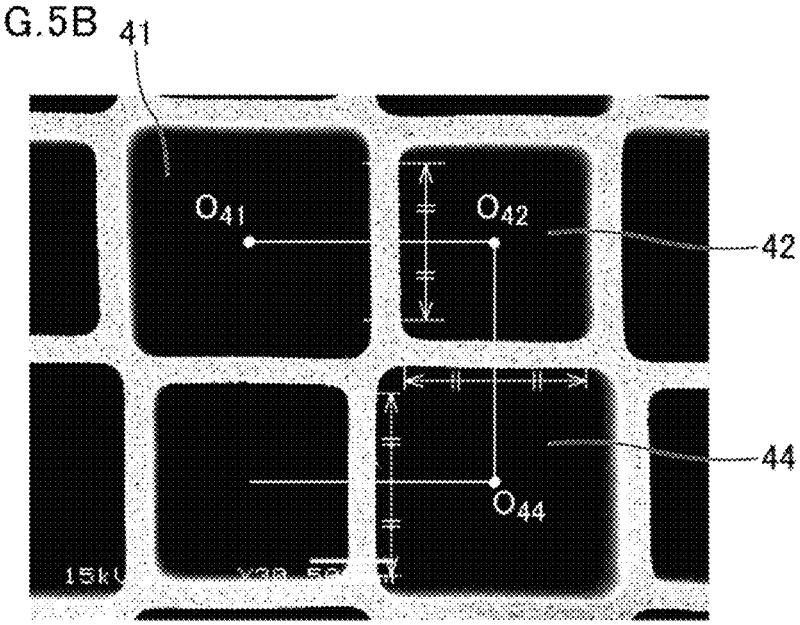

FIGS. 5A and 5B are each a scanning electron microscope photograph (SEM photograph) showing one example of the cross sectional shapes of cells that are different from the cells shown in FIGS. 4A and 4B.

FIG. 5A shows that the cross sectional areas of the respective exhaust gas emission cell 41, the second exhaust gas introduction cell 44, and the first exhaust gas introduction cells 42 are each in a shape in which straight lines hypothetically extended from the four sides having equal length perpendicularly intersect one another at intersections (vertices), and the vertex portions are formed by curved lines. Although the vertex portions of the cross sectional shape of the cell are formed by curved lines, lines extended from the four straight lines forming each cell intersect at four intersections. Supposing that the intersections are hypothetical vertices, the four distances between the vertices are the same from one another to form a square. Thus, the cross sectional shapes of the respective cells are considered square according to the definition of the embodiments of the present invention.

Moreover, as is understood from FIG. 5B, a perpendicular bisector of a side forming the first exhaust gas introduction cell 42 crosses the exhaust gas emission cell 41. Thus, the side forming the first exhaust gas introduction cell 42 faces the exhaust gas emission cell 41. In contrast, a perpendicular bisector of a side forming the second exhaust gas introduction cell 44 does not intersect with the exhaust gas emission cell 41. Thus, the side forming the second exhaust gas introduction cell 44 does not face the exhaust gas emission cell 41. As described above, whether a side forming the second exhaust gas introduction cell 44 or the first exhaust gas introduction cell 42 faces the exhaust gas emission cell 41 can be determined from the electron microscope photograph.

A convex square according to the embodiments of the present invention is a shape formed by four outwardly curved lines of the same length. The square looks as if its sides bulge from the geometric center of gravity to the outside. A concave square is a shape formed by four inwardly curved lines of the same length. The square looks as if its sides concave toward the geometric center of gravity.

In the cross section perpendicular to the longitudinal direction of the cells forming the honeycomb filter according to the embodiments of the present invention, the first exhaust gas introduction cells, the second exhaust gas introduction cells, and the exhaust gas emission cells each have a uniform cross sectional shape thoroughly from the exhaust gas introduction end to the exhaust gas emission end except for the plugged portion. Namely, taking the first exhaust gas introduction cell as an example, in a cross sectional view perpendicular to the longitudinal direction, the cross sectional shape defined by the inner wall thereof has the same shape at any part from the exhaust gas introduction end to the exhaust gas emission end except for the plugged portion. The same shape means a congruent shape, and excludes similar shapes. Namely, a similar shape means a different shape. The explanation for the first exhaust gas introduction cell also applies to the second exhaust gas introduction cell and the exhaust gas emission cell. The plugged portions are excluded because the cross sectional shape defined by the inner cell wall does not physically exist at the plugged portions due to the presence of the plugs.

The honeycomb filter of the embodiments of the present invention can comprehensively reduce the pressure loss thoroughly from the initial stage to the stage after accumulation of PMs in close to the limit amount, as compared to conventional honeycomb filters.

In consideration of the above-described pressure loss broken down to respective resistance components, the flow-through resistance and the outflow resistance need to be reduced for reducing the initial pressure loss. Thus, the cross sectional area of the exhaust gas emission cells needs to be equal to or relatively larger than the cross sectional area of the exhaust gas introduction cells for suppressing the rapid expansion. Wide and thin accumulation of PMs is necessary for reducing the transitional pressure loss. Thus, the cross sectional area of the exhaust gas introduction cells needs to be relatively larger than the cross sectional area of the exhaust gas emission cells.

It has been considered impossible to reduce both of the transitional pressure loss and the initial pressure loss. The inventors of the present invention further studied and completed the present invention described below.

That is, exhaust gas is preferentially introduced firstly into the first exhaust gas introduction cells when the honeycomb filter has the following structures: two kinds of the exhaust gas introduction cells including the exhaust gas introduction cells each having a larger cross sectional area (second exhaust gas introduction cells) and the exhaust gas introduction cells each having a smaller cross sectional area (first exhaust gas introduction cells) are employed as the exhaust gas introduction cells; each exhaust gas emission cell has an equal or larger cross sectional area than each second exhaust gas introduction cell; each exhaust gas emission cell is fully surrounded by the two kinds of the exhaust gas introduction cells; and the length of the inner wall separating the first exhaust gas introduction cell and the exhaust gas emission cell is relatively longer than the length of the inner wall separating the second exhaust gas introduction cell and the exhaust gas emission cell, or the thickness of the wall separating the first exhaust gas introduction cell and the exhaust gas emission cell is relatively smaller than the thickness of the wall separating the second exhaust gas introduction cell and the exhaust gas emission cell.

The wall separating the first exhaust gas introduction cell and the exhaust gas emission cell has a larger passage area (in the case of polygonal cells, sides are long in the cross sectional shape) or the thickness of the wall is smaller. Exhaust gas can thus pass through each an advantageous wall so that the passage resistance of the factor (c) can be reduced. Also, the flow-through resistance of the factor (e) can be reduced as the cross sectional area of the exhaust gas emission cells is relatively larger than the cross sectional area of the first exhaust gas introduction cells. Namely, both of the passage resistance of the factor (c) and the flow-through resistance of the factor (e) can be reduced, and thereby the initial pressure loss can be reduced. After accumulation of a certain amount of PMs, since the cross sectional area of the first exhaust gas introduction cells is smaller than the cross sectional area of the second exhaust gas introduction cells, an increase in the passage resistance occurs earlier in a layer of the accumulated PMs in the first exhaust gas introduction cells. This leads to "switching" of the main flow channel of exhaust gas in a manner that a larger amount of the exhaust gas is naturally (i.e. autonomously) introduced to the second exhaust gas introduction cells. Consequently, PMs are widely and thinly accumulated in the second exhaust gas introduction cells each having a large cross sectional area. Hence, both of the flow-through, resistance of the factor (b) and the passage resistance of the factor (d) can be reduced so that the transitional pressure loss can be reduced even after accumulation of PMs.

As described above, the embodiments of the present invention have achieved a surprising effect, which has been considered impossible, of reducing both of the transitional pressure loss and the initial pressure loss by the autonomous snitching of the main flow channel.

The aforementioned effect of reducing both of the initial pressure loss and the transitional pressure loss by "switching" of the main flow channel to which a larger amount of exhaust gas is introduced is exerted only when all the aforementioned features work integrally. Such structures or effects are not disclosed in any publicly known document.

Figure 19A:
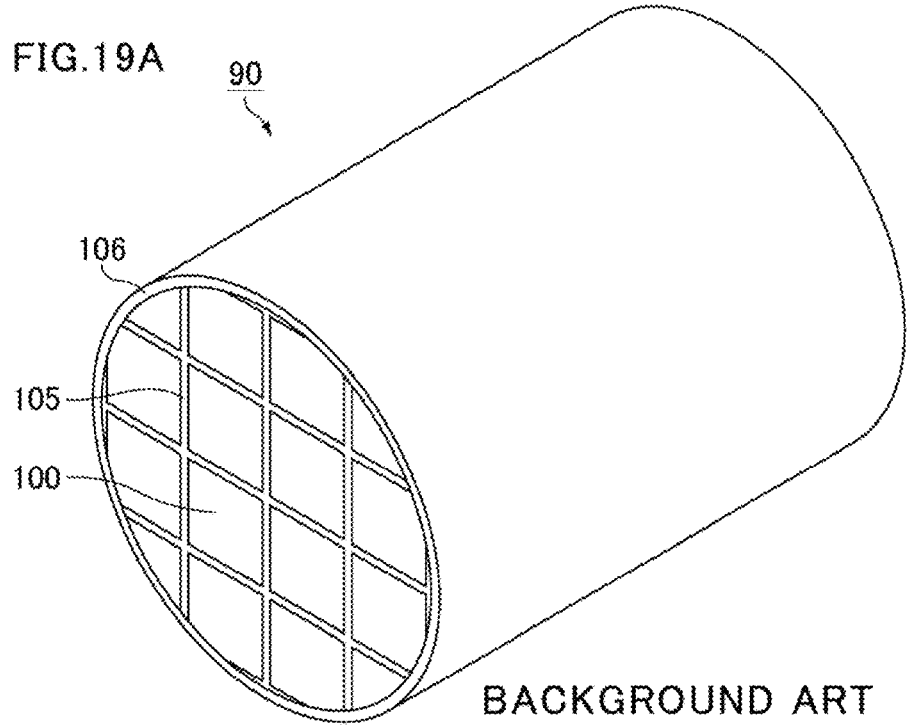
FIG. 19A is a perspective view schematically illustrating a honeycomb filter disclosed in WO 2004/024294.
Figure 19B:
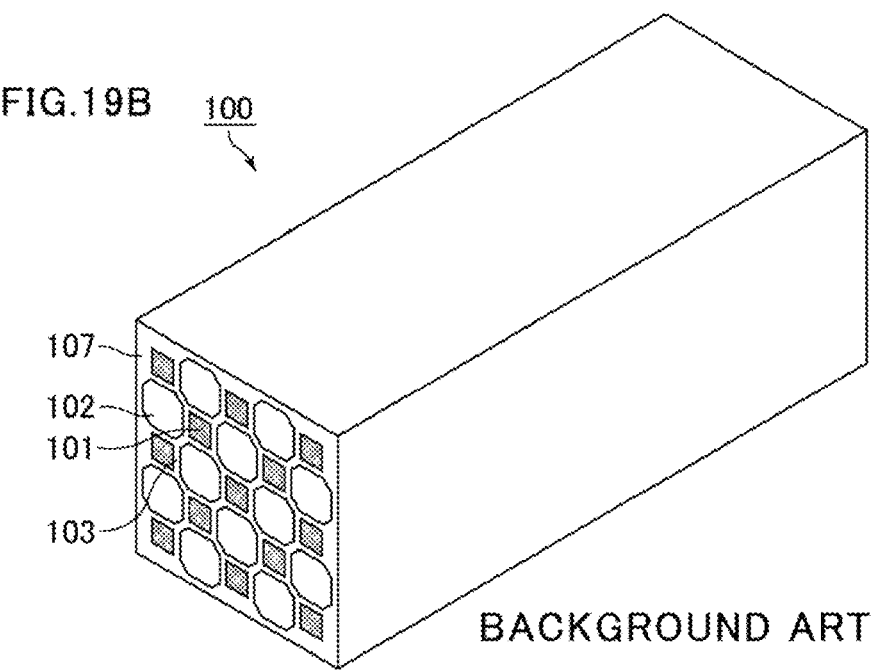
FIG. 19B is a perspective view schematically illustrating a honeycomb fired body forming the honeycomb filter.

The aforementioned international application: WO 2004/024204 discloses a honeycomb filter including exhaust gas introduction cells 102 each having an octagonal cross sectional shape and exhaust gas emission cells 101 each having a rectangular cross sectional shape as shown in FIG. 19B. WO 2004/024294 describes that an increase in the cross sectional area of the exhaust gas introduction cells 102 enables wide and thin accumulation of PMs, and thus the transitional pressure loss can be reduced. However, for achieving the present invention in view of WO 2004/024294, some of the exhaust gas emission cells 101 each having a smaller cross sectional area need to be changed to the exhaust gas introduction cells 102, and some of the exhaust gas introduction cells 102 each having a larger cross sectional area need to be changed to the exhaust gas emission cells 101. Such changes deny the inventive concept of the invention of WO 2004/024294, i.e. increasing the cross sectional area of the exhaust gas introduction cells 102. Thus, the present invention cannot be achieved in view of WO 2004/024294 as the closest background art document.

Figure 20A:
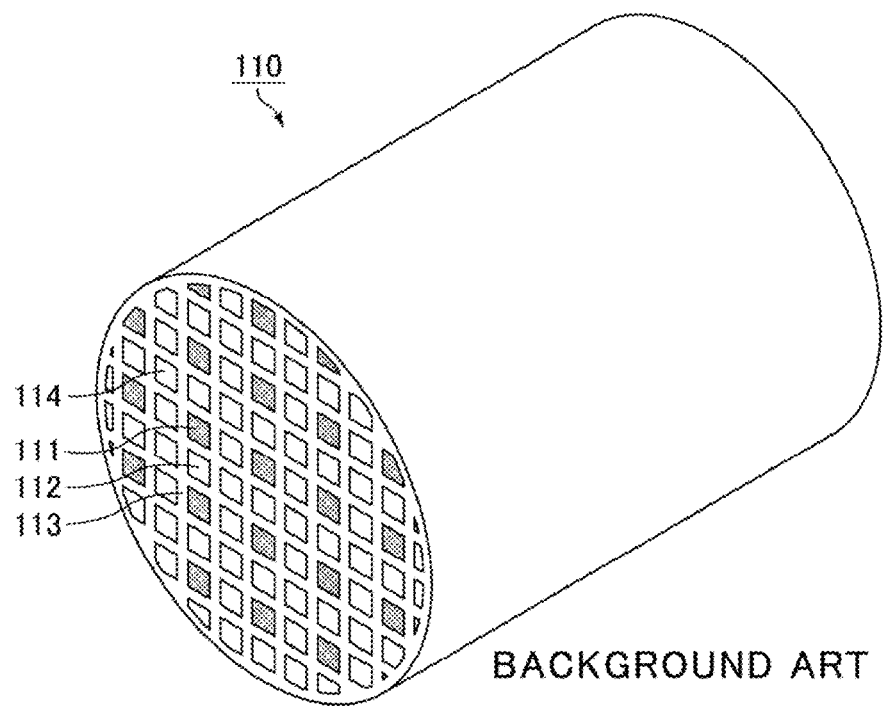
FIG. 20A is a perspective view schematically illustrating a honeycomb filter disclosed in U.S. Pat. No. 4,417,908.
Figure 20B:
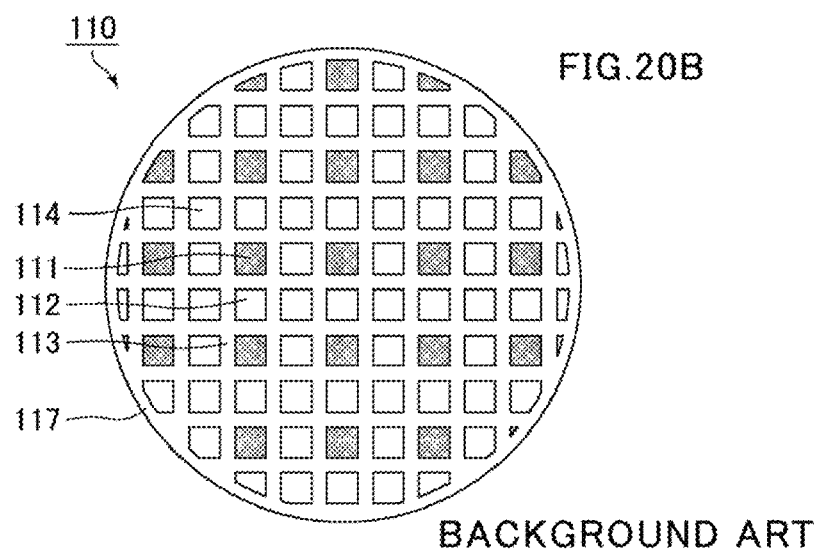
FIG. 20B is an end face view schematically illustrating an end face of the honeycomb filter.

Also, as explained earlier based on FIGS. 20A and 20B, U.S. Pat. No. 4,417,908 discloses a honeycomb filter which can reduce the transitional pressure loss by increasing the number of exhaust gas introduction cells having the same cross sectional area to increase the total area of the exhaust gas introduction cells so that PMs are allowed to widely and thinly accumulate.

However, for achieving the present invention in view of U.S. Pat. No. 4,417,908, sore of the exhaust gas introduction cells need to be changed to cells having a smaller cross sectional area. Such a change reduces the cross sectional area of the exhaust gas introduction cells, and thus denies the inventive concept of U.S. Pat. No. 4,417,908. Hence, the present invention is not achieved in view of U.S. Pat. No. 4,417,908 as the closest background art document.

Those background art documents deny the present invention, and thus the present invention cannot be achieved in view of the background arts.

The following will explain the details of the effects of the embodiments of the present invention by exemplifying an embodiment.

Figure 6A:
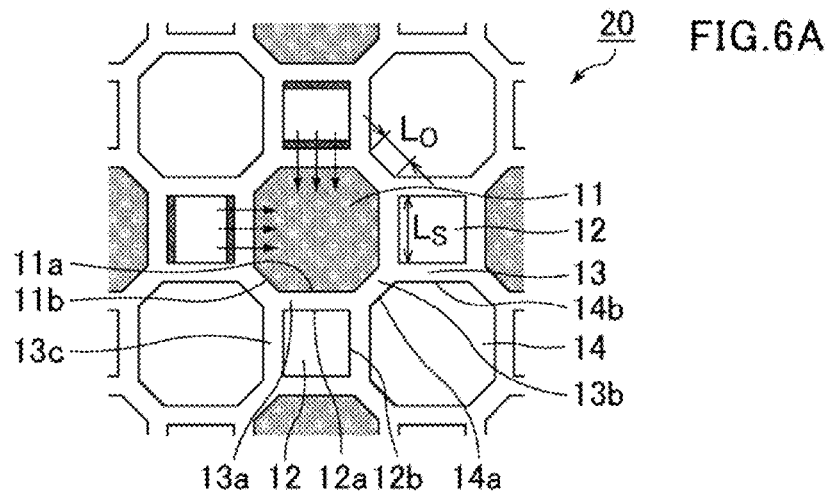
FIGS. 6A to 6C are each an enlarged end face view illustrating an enlarged image of a part of an end face of a honeycomb filter according to one embodiment of the present invention.
Figure 6B:
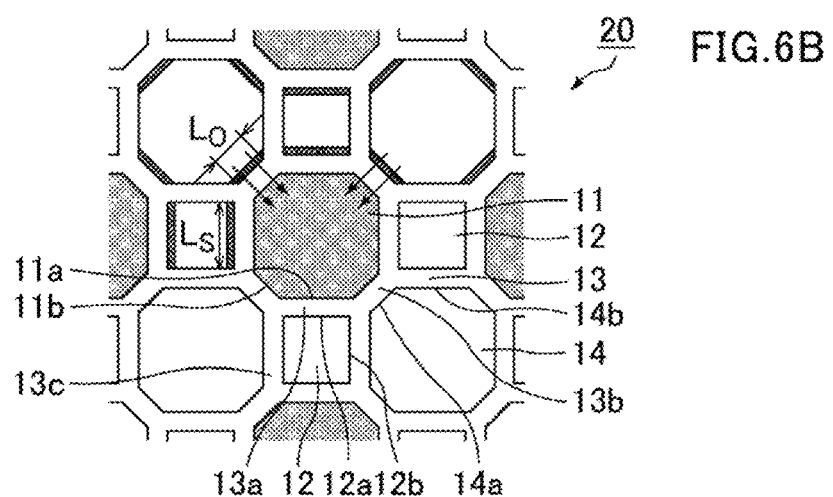
Figure 6C:
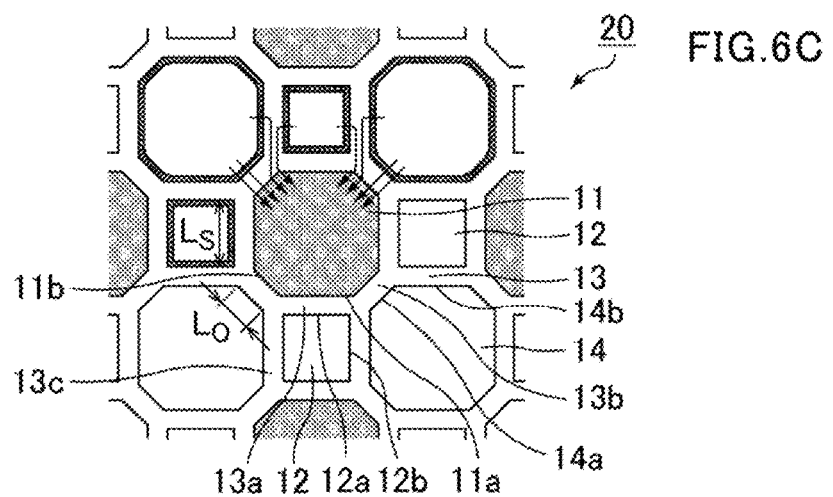

FIGS. 6A to 6C are each an enlarged end face view illustrating an enlarged image of a part of an end face of the honeycomb filter according to one embodiment of the present invention.

As shown in FIG. 6A, in a honeycomb filter 20, each exhaust gas emission cell 11 having an open end at an exhaust gas emission side and a plugged end at an exhaust gas introduction side is adjacently surrounded fully by first exhaust gas introduction cells 12 and second exhaust gas introduction cells 14 each having an open end at the exhaust gas introduction side and a plugged end at the exhaust gas emission side across porous cell walls 13.

In the cross section perpendicular to the longitudinal direction of the cells, the exhaust gas emission cell 11 has an octagonal cross section that is the same as or similar to that of the exhaust gas introduction cell 102 shown in FIG. 19B, the first exhaust gas introduction cell 12 has a square cross section, and the second exhaust gas introduction cell 14 has an octagonal square section that is the same as that of the exhaust gas emission cell 11. The second exhaust gas introduction cell 14 has a larger cross sectional area than the first exhaust gas introduction cell 12, and the cross sectional area is the same as the exhaust gas emission cell 11. That is, the second exhaust gas introduction cell 14 has the same cross sectional area as the exhaust gas emission cell 11, and the exhaust gas emission cell 11 has a larger cross sectional area than the first exhaust gas introduction cell 12. Thus, the resistance caused by flowing of exhaust gas through the exhaust gas emission cells 11 and the resistance caused by outflow of exhaust gas to outside the filter are reduced to low levels, and thereby the pressure loss can be reduced to a low level.

Moreover, a side 12a facing the exhaust gas emission cell 11 among the sides forming the cross sectional shape of the first exhaust gas introduction cell 12 is longer than a side 14a facing the exhaust gas emission cell 11 among the sides forming the cross sectional shape of the second exhaust gas introduction cell 14.

Exhaust gas flowing toward the honeycomb filter 20 flows into the first exhaust gas introduction cells 12 each having an open end at the exhaust gas introduction side and the second exhaust gas introduction cells 14 each having an open end at the exhaust gas introduction side. The exhaust gas flows in the filter in order from a part allowing easier flow and then evenly flows in the entire filter. In the honeycomb filter according to the embodiments of the present invention, the length (Ls) of the side 12a of the first exhaust gas introduction cell 12 is larger than the length (Lo) of the side 14a of the second exhaust gas introduction cell 14. Thus, the surface area of a cell wall 13a separating the exhaust gas emission cell 11 and the first exhaust gas introduction cell 12 is larger than the surface area of a cell wall 13b separating the exhaust gas emission cell 11 and the second exhaust gas introduction cell 14, leading to easier exhaust gas passage through the cell wall 13a. Consequently, PMs accumulate on the cell walls 13a at an initial stage.

As described above, both of the flow-through resistance of the exhaust gas emission cells and the outflow resistance upon emission of exhaust gas from the honeycomb filter can be reduced. Thus, the initial pressure loss before accumulation of PMs can be reduced.

The relation between the length of a side forming a cell and the surface area mentioned above is attributed to the following reasons.

The surface area of the cell wall 13a separating the exhaust gas emission cell 11 and the first exhaust gas introduction cell 12 corresponds to the surface area of the inner wall of the first exhaust gas introduction cell 12. The surface area of the inner wall of the first exhaust gas introduction cell 12 is expressed as Ls×Le, where Le represents an effective length of the filter excluding the length of the plugged portions at the introduction side from the exhaust gas introduction end and at the emission side from the exhaust gas emission end (see FIG. 2B). Similarly, the surface area of the cell wall 13b separating the exhaust gas emission cell 11 and the second exhaust gas introduction cell 14 corresponds to the surface area of the inner wall of the second exhaust gas introduction cell 14. The surface area of the inner wall of the second exhaust gas introduction cell 14 is expressed as Lo×Le, where Le represents an effective length of the filter excluding the length of the plugged portions at the introduction side from the exhaust gas introduction end and at the emission side from the exhaust gas emission end. The effective length of the filter is defined as a length measured from the tip of the plugged portion in FIG. 2B.

Thus, if the length (Ls) of the side 12a is larger than the length (Lo) of the side 14a, the surface area value of Ls×Le is relatively larger than the surface area value of Lo×Le. Namely, the length of the side is equivalent to the surface area. Thus, if the length (Ls) of the side 12a of the first exhaust gas introduction cell 12 is larger than the length (Lo) of the side 14a of the second exhaust gas introduction cell 14, the surface area of the cell wall 13a separating the exhaust gas emission cell 11 and the first exhaust gas introduction cell 12 is larger than the surface area of the cell wall 13b separating the exhaust gas emission cell 11 and the second exhaust gas introduction cell 14.

In FIGS. 6A to 6C, insertions relating to the effects are only partially illustrated.

Next, as shown in FIG. 6B, when a certain amount of PMs are accumulated on the cell walls 13a corresponding to the inner walls of the first exhaust gas introduction cells 12, an accumulated layer of the PMs gets thick due to the small cross sectional area of the first exhaust gas introduction cells 12. Consequently, resistance due to the accumulation of PMs increases to make the passage of exhaust gas through the cell walls 13a difficult. Under such conditions, exhaust gas turns to pass through the cell walls 13b separating the exhaust gas emission cells 11 and the second exhaust gas introduction cells 14 (switching of the main channel). Then, PMs are also accumulated on the surfaces of the cell walls 13 corresponding to the surfaces of the inner walls of the second exhaust gas introduction cells 14.

Subsequently, since exhaust gas can considerably freely pass through the cell walls, exhaust gas passes through inside the cell walls 13c separating the first exhaust gas introduction cells 12 and the second exhaust gas introduction cells 14 to flow into the exhaust gas emission cells 11 as shown in FIG. 6C. In this situation, exhaust gas enters the cell walls 13c from the first exhaust gas introduction cells 12 as well as from the second exhaust gas introduction cells 14.

As described above, PMs accumulate on the entire surfaces of the cell walls 13a and 13c around the first exhaust gas introduction cells 12 corresponding the inner walls of the first exhaust gas introduction cells 12, and gradually accumulate rather more widely and thinly in a larger amount on the entire surfaces of the cell walls 13b and 13c around the second exhaust gas introduction cells 14 corresponding to the inner walls of the second exhaust gas introduction cells 14. The first exhaust gas introduction cells 12 each have a smaller cross sectional area than each second exhaust gas introduction cell 14. Thus, in the first exhaust gas introduction cells 12, PMs accumulate in a thick layer where the passage resistance is high. For this reason, the introduced exhaust gas flows more easily into the second exhaust gas introduction cells 14 than into the first exhaust gas introduction cells 12 at an early stage (aforementioned switching of the main channel of exhaust gas), causing the aforementioned shift of the PM accumulation. Consequently, PMs accumulate more on the entire surfaces of the cell walls 13b and 13c around the second exhaust gas introduction cells 14 corresponding to the inner walls of the second exhaust gas introduction cells 14 rather than the surfaces of the cell walls 13a and 13c around the first exhaust gas introduction cells 12 corresponding to the inner walls of the first exhaust gas introduction cells 12. It is thus possible to make use of the entire surfaces of the cell walls 13b and 13c around the second exhaust gas introduction cells 14 corresponding to the inner walls of the second exhaust gas introduction cells 14 for accumulation of PMs earlier. Since the surface area of the cell walls 13b and 13c around the second exhaust gas introduction cells 14 corresponding to the inner walls of the second exhaust gas introduction cells 14 is larger than the surface area of the cell walls 13a and 13c around the first exhaust gas introduction cells 12 corresponding to the inner walls of the first exhaust gas introduction cells 12, when PMs accumulate on the entire peripheries of the cell walls 13b and 13c surrounding the second exhaust gas introduction cells 14, the accumulated layer is thin. Thus, the pressure loss due to exhaust gas increases at a low rate even after accumulation of PMs. Hence, a surprisingly excellent effect of maintaining the pressure loss at a low level can be achieved even though the amount of accumulated PMs increases.

As a result, vehicles carrying the honeycomb filter according to the embodiments of the present invention do not cause a disadvantageous phenomenon for driving that are derived from an increase in the pressure loss throughout the use area, and also have good fuel economy.

The honeycomb filter of the embodiments of the present invention preferably has the following structure. In the cross section perpendicular to the longitudinal direction of an exhaust gas emission cell and a first exhaust gas introduction cell which have polygonal cross sectional shapes and are adjacent to each other, a side, among the sides forming the cross sectional shape of the exhaust gas emission cell, which is adjacent to the first exhaust gas introduction cell across the cell wall in a manner facing the first exhaust gas introduction cell is parallel to a side, among the sides forming the cross sectional shape of the first exhaust gas introduction cell, which is adjacent to the exhaust gas emission cell across the cell wall in a manner facing the exhaust gas emission cell.

This indicates that the thickness is uniform at any part of the walls separating the exhaust gas emission cells and the first exhaust gas introduction cells. Thus, if is possible to achieve high fracture strength of the filter, easy passage of exhaust gas, and uniform accumulation of PMs, so that the pressure loss is reduced.

In the case where the vertex portions of the polygonal cross section are formed by curved lines, the curve portions are not considered as sides because naturally such portions do not form parallel lines.

Provided that, in the cross section perpendicular to the longitudinal direction of the cells, straight portions considered as sides are hypothetically extended, and intersections of the hypothetical straight lines are given as hypothetical vertices, the length of each side of the cross sectional shape excluding the curve portion is preferably not less than 80% the length of a hypothetical side of a polygon that is formed by connecting the hypothetical vertices. To put it the other way around, the length of the portion not considered as a side is preferably less than 20% the length of the hypothetical side.

In the case of the cell having a polygonal cross sectional shape, if the lengths of the sides are not less than 80% the respective lengths of the hypothetical sides, the main-channel-switching effect, which is an effect of the embodiments of the present invention, can be achieved by controlling the length of the sides.

The honeycomb filter of the embodiments of the present invention preferably has the following structure. In the cross section perpendicular to the longitudinal direction of an exhaust gas emission cell and a second exhaust gas introduction cell which is adjacent to the exhaust gas emission cell across a cell wall, in the case where the cells nave polygonal cross sections, a side, among the sides forming the cross sectional shape of the exhaust gas emission cell, which is adjacent to the second exhaust gas introduction cell across the cell wall in a manner facing the second exhaust gas introduction cell is parallel to a side, among the sides forming the cross sectional shape of the second exhaust gas introduction cell, which is adjacent to the exhaust gas emission cell across the cell wall in a manner facing the exhaust gas emission cell.

This indicates that the thickness is uniform at any part of the walls separating the exhaust gas emission cells and the respective second exhaust gas introduction cells. Thus, it is possible to achieve high fracture strength of the filter, easy passage of exhaust gas, and uniform accumulation of PMs so that the pressure loss is reduced.

Meanwhile, in the case where the vertex portions of the polygonal cross sectional shape are formed by curved lines, the curve portions are not considered as sides because naturally such portions do not form parallel lines.

Provided that, in the cross section perpendicular to the longitudinal direction of the cells, straight portions considered as sides are hypothetically extended, and intersections of the hypothetical straight lines are given as hypothetical vertices, the length of each side of the cross sectional shape excluding the curve portion is preferably not less than 80% the length of a hypothetical side of a polygon that is formed by connecting the hypothetical vertices. To put it the other way around, the length of the portion not considered as a side is preferably less than 20% the length of the hypothetical side.

In the case of the cell having a polygonal cross sectional shape, if the lengths of the sides are not less than 80% the respective lengths of the hypothetical sides, the main-channel-switching effect, which is an effect of the embodiments of the present invention, can be achieved by controlling the length of the sides.

The honeycomb filter of the embodiments of the present invention preferably has the following structure. In the cross section perpendicular to the longitudinal direction of a first exhaust gas introduction cell and a second exhaust gas introduction cell which is adjacent to the first exhaust gas introduction cell across a cell wall, in the case where the cells have polygonal cross sectional shapes, a side, among the sides forming the cross sectional shape of the first exhaust gas introduction cell, which is adjacent to the second exhaust gas introduction cell across the cell wall in a manner facing the second exhaust gas introduction cell, is parallel to a side, among the sides forming, the cross sectional shape of the second exhaust gas introduction cell, which is adjacent to the first exhaust gas introduction cell across the cell wall in a manner facing the first exhaust gas introduction cell.

This indicates that the thickness is uniform at any part of the walls separating the first exhaust gas introduction cells and the second exhaust gas introduction cells. Thus, it is possible to achieve high fracture strength of the honeycomb filter, easy exhaust gas passage through the walls from the second exhaust gas introduction cells to the exhaust gas emission cells, and wide, thin and uniform accumulation of PMs on the inner cell walls of the second exhaust gas introduction cells, so that low pressure loss can be achieved after accumulation of PMs.

Meanwhile, in the case where the vertex portions of the polygonal cross section are formed by curved lines, the curve portions are not considered as sides because naturally such portions do not form parallel lines.

Provided that, in the cross section perpendicular to the longitudinal direction, of the cells, straight portions considered as sides are hypothetically extended, and intersections of the hypothetical straight lines are given as hypothetical vertices, the length of each side of the cross sectional shape excluding the curve portion is preferably not less than 80% the length of a hypothetical side of a polygon that is formed by connecting the hypothetical vertices. To put if the other way around, the length of the portion not considered as a side is preferably less than 20% the length of the hypothetical side.

In the case of the cell having a polygonal cross sectional shape, if the lengths of the sides are not less than 80% the respective lengths of the hypothetical sides, the main-channel-switching effect, which is an effect of the embodiments of the present invention, can be achieved by controlling the length of the sides.

The honeycomb filter according to the embodiments of the present invention preferably has the following structure. In the case where the exhaust gas emission cell, the first exhaust gas introduction cell, and the second exhaust gas introduction cell, which are adjacent to one another across cell walls, each have a polygonal cross sectional shape in the cross section perpendicular to the longitudinal direction of the cells, (a) a side, among the sides forming the cross sectional shape of the exhaust gas emission cell, which is adjacent to the first exhaust gas introduction cell across the cell wall in a manner facing the first exhaust gas introduction cell, is parallel to a side, among the sides forming the cross sectional shape of the first exhaust gas introduction cell, which is adjacent to the exhaust gas emission cell across the cell wall in a manner facing the exhaust gas emission cell, (b) a side, among the sides forming the cross sectional shape of the exhaust gas emission cell, which is adjacent to the second exhaust gas introduction cell across the cell wall in a manner facing the second exhaust gas introduction cell, is parallel to a side, among the sides forming the cross sectional shape of the second exhaust gas introduction cell, which is adjacent to the exhaust gas emission cell across the cell wall in a manner facing the exhaust gas emission cell, and (c) a side, among the sides forming the cross sectional shape of the first exhaust gas introduction cell, which is adjacent to the second exhaust gas introduction cell across the cell wall in a manner facing the second exhaust gas introduction cell, is parallel to a side, among the sides forming the cross sectional shape of the second exhaust gas introduction cell, which is adjacent to the first exhaust gas introduction cell across the cell wall in a manner facing the first exhaust gas introduction cell.

Moreover, in the case where the first exhaust gas introduction cell, the second exhaust gas introduction cell, and the exhaust gas emission cell each have a polygonal cross sectional shape in the honeycomb filter according to the embodiments of the present invention, the distance between the parallel sides in the above condition (a), the distance between the parallel sides in the above condition (b), and the distance between the parallel sides in the above condition (c) are preferably the same in the structure simultaneously satisfying the conditions (a), (b), and (c). Here, the distance between the sides is defined as follows: a hypothetical perpendicular line is given from an arbitrary point P in one side to a point Q in the other side, and the distance between the point P and the point Q is defined as the distance between the parallel sides.

The honeycomb filter having the above structure has the highest fracture strength, has excellent thermal shock resistance upon regeneration, can best reduce the pressure loss regardless of the presence or absence of accumulated PMs, and can avoid thermal shock damage that occurs upon regeneration of PMs.

Meanwhile, in the case where the vertex portions of the polygonal cross section are formed by curved lines, the curve portions are not considered as sides because naturally such portions do not form parallel lines.

Provided that, in the cross section perpendicular to the longitudinal direction of the cells, straight portions considered as sides are hypothetically extended, and intersections of the hypothetical straight lines are given as hypothetical vertices, the length of each side of the cross sectional shape excluding the curve portion is preferably not less than 80% the length of a hypothetical side of a polygon that is formed by connecting the hypothetical vertices. To put it the other way around, the length of the portion not considered as a side is preferably less than 20% the length of the hypothetical side.

In the case of the cell having a polygonal cross sectional shape, if the lengths of the sides are not less than 80% the respective lengths of the hypothetical sides, the main-channel-switching effect, which is an effect of the embodiments of the present invention, can be achieved by controlling the length of the sides.

The honeycomb filter of the embodiments of the present invention is preferably need to purify PMs an exhaust gas discharged from internal combustion engines of automobiles. The honeycomb filter can reduce both of the initial pressure loss before accumulation of PMs and the transitional pressure loss caused by accumulation of PMs in the filter, and thereby the fuel economy of the engine can be enhanced.

The honeycomb filter of the embodiments of the present invention is most suitably used in automobiles whose internal combustion engines are diesel engines. The amount of PMs (soot) discharged from a diesel engine is larger than that from a gasoline engine. Thus, a demand for reducing the transitional pressure loss caused by accumulation of PMs (soot) in the filter is higher for diesel engines than for gasoline engines.

In the case of using the honeycomb each filter of the embodiments of the present invention to purify PMs in exhaust gas discharged from internal combustion engines of automobiles, the honeycomb filter of the embodiments of the present invention is fixed inside an exhaust tube via a holding material.

In the honeycomb filter according to the embodiments of the present invention, in the cross section perpendicular to the longitudinal direction of the cells, each exhaust gas emission cell and each exhaust gas introduction cell preferably have a polygonal cross section, and a side forming the cross sectional shape of each first exhaust gas introduction cell faces one of the exhaust gas emission cells, a side forming the cross sectional shape of each second exhaust gas introduction cell faces one of the exhaust gas emission cells, and the length of the side forming the cross sectional shape of the second exhaust gas introduction cell is not more than 0.8 times the length of the side forming the cross sectional shape of the first exhaust gas introduction cell.

The honeycomb filter having the above structure enables easier passage of exhaust gas through the cell walls separating the exhaust gas emission cells and the first exhaust gas introduction cells, effective suppression of the initial pressure loss, and prevention of an increase in the rate of increase of the pressure loss after accumulation of PMs.

If the ratio of the length of the side of the second exhaust gas introduction cell to the length of the side of the first exhaust gas introduction cell exceeds 0.8, the two sides do not have a big difference in length. Consequently, the initial pressure loss is hardly suppressed.

In the honeycomb filter according to the embodiments of the present invention, in the direction perpendicular to the longitudinal direction of the cells, preferably, the exhaust gas emission cells are each octagonal, the first exhaust gas introduction cells are each square, and the second exhaust gas introduction cells are each octagonal.

The honeycomb filter having the above structure has the same shape as the honeycomb filter in FIGS. 6A to 6C that is described concerning the effects thereof. Thus, the honeycomb filter can effectively suppress the initial pressure loss, have a large surface area for allowing PMs to accumulate thereon, and can maintain the pressure loss at a low level.

In the honeycomb filter according to the embodiments of the present invention, in the cross section perpendicular to the longitudinal direction of the cells, preferably, the cross sectional area of each second exhaust gas introduction cell is equal in size to the cross sectional area of each exhaust gas emission cell, and the cross sectional area of each first exhaust gas introduction cell is 20 to 50% the size of the cross sectional area of each second exhaust gas introduction cell.

The honeycomb structure having the above structure can provide difference between the resistance caused upon flowing of exhaust gas through the first exhaust gas introduction cells and the resistance caused upon flowing of exhaust gas through the second exhaust gas introduction cells, thereby enabling effective suppression of the pressure loss.

If the cross sectional area of the first exhaust gas introduction cells is less than 20% the size of the cross sectional area of the second exhaust gas introduction cells, the cross sectional area of the first exhaust gas introduction cells is too small. Consequently, high flow-through resistance occurs upon flowing of exhaust gas through the first exhaust gas introduction cells so that the pressure loss tends to be high. If the cross sectional area of the first exhaust gas introduction cells is more than 50% the size of the cross sectional area of the second exhaust gas introduction cells, the difference in the flow-through resistance of the first exhaust gas introduction cells and the flow-through resistance of the second exhaust gas introduction cells is small. Thus, the pressure loss is hardly reduced.

In the honeycomb filter according to the embodiments of the present invention, the cell walls defining rims of the cells preferably have a uniform this tress in any part of the honeycomb filter.

The honeycomb filter having this structure can exert the aforementioned effects through its entire body.

In the honeycomb filter according to the embodiments of the present invention, in the direction perpendicular to the longitudinal direction of the cells, preferably the exhaust gas emission cells have octagonal cross sections, the first exhaust gas introduction cells nave square cross sections, and the second exhaust gas introduction cells have octagonal cross sections, the cross sectional shape of each second exhaust gas introduction cell is congruent with the cross sectional shape of each exhaust gas emission cell, and the exhaust gas emission cells, the first exhaust gas introduction cells, and the second exhaust gas introduction cells are arranged in the following manner:

the exhaust gas emission cells are each surrounded by alternately arranged four pieces of the first exhaust gas introduction cells and four pieces of the second exhaust gas introduction cells across the porous cell walls;

provided that hypothetical segments connecting geometric centers of gravity of the octagonal cross sections of the four second exhaust gas introduction cells surrounding the exhaust gas emission cell are given, an intersection of the two segments crossing a shape region including the cross sectional shape of the exhaust gas emission cell is identical with a geometric center of gravity of the octagonal cross section of the exhaust gas emission cell; and the four segments not crossing the shape region including the cross sectional shape of the exhaust gas emission cell form a square, and midpoints of the respective sides of the square are identical with geometric centers of gravity of the square cross sections of the four first exhaust gas introduction cells surrounding the exhaust gas emission cell, and a side facing the first exhaust gas introduction cell across a cell wall among the sides forming the cross sectional shape of the exhaust gas emission cell is parallel to a side facing the exhaust gas emission cell across the cell wall among the sides forming the cross sectional shape of the first exhaust gas introduction cell, a side facing the second exhaust gas introduction cell across a cell wall among the sides forming the cross sectional shape of the exhaust gas emission cell is parallel to a side facing the exhaust gas emission cell across the cell wall among the sides forming the cross sectional shape of the second exhaust gas introduction cell, a side facing the second exhaust gas introduction cell across a cell wall among the sides forming the cross sectional shape of the first exhaust gas introduction cell is parallel to a side facing the first exhaust gas introduction cell across the cell wall among the sides forming the cross sectional shape of the second exhaust gas introduction cell, and distances between the parallel sides are the same.

In the honeycomb filter according to the embodiments of the present invention, in the direction perpendicular to the longitudinal direction of the cells, the exhaust gas emission cells, the first exhaust gas introduction cells, and the second exhaust gas introduction cells all preferably have a square cross section.

Even in the case where the first exhaust gas introduction cells and the second exhaust gas introduction cells all have a square cross section, relations concerning the size, position, or the like of the exhaust gas emission cells, the first exhaust gas introduction cells, and the second exhaust gas introduction cells are different. For example, since the cross sectional area of each first exhaust gas introduction cell is smaller than the cross sectional area of each exhaust gas emission cell, the honeycomb filter of the embodiments of the present invention is different from the honeycomb filter 110 (see FIGS. 20A and 20B) in the aforementioned background art, and can exert the aforementioned effects of the embodiments of the present invention.

In the honeycomb filter according to the embodiments of the present invention, in the direction perpendicular to the longitudinal direction of the cells, preferably the cross sectional area of each second exhaust gas introduction cell is equal in size to the cross sectional area of each exhaust gas emission cell, and the cross sectional area of each first exhaust gas introduction cell is 20 to 50% the size of the cross sectional area of each second exhaust gas introduction cell.

The honeycomb filter having the above structure can provide difference between the resistance caused upon flowing of exhaust gas through the first exhaust gas introduction cells and the resistance caused upon flowing of exhaust gas through the second exhaust gas introduction cells, thereby enabling affective suppression of the pressure loss.

If the cross sectional area of the first exhaust gas introduction cells is less than 20% the size of the cross sectional area of the second exhaust gas introduction cells, the cross sectional area of the first exhaust gas introduction cells is too small. Consequently, high flow-through resistance occurs upon flowing of exhaust gas through the first exhaust gas introduction cells so that the pressure loss tends to be high. If the cross sectional area of the first exhaust gas introduction cells is more than 50% the size of the cross sectional area of the second exhaust gas introduction cells, the difference in flow-through resistance between the first exhaust, gas introduction cells and the second exhaust gas introduction cells is small. Thus, the pressure loss is hardly reduced.

In the honeycomb filter according to the embodiments of the present invention, in the direction perpendicular to the longitudinal direction of the cells, preferably, the exhaust gas emission cells have a square cross section, the first exhaust gas introduction cells have a square cross section, and the second, exhaust gas introduction cells have a square cross section, the cross sectional shape of each second exhaust gas introduction cell is congruent with the cross sectional shape of each exhaust gas emission cell, the exhaust gas emission cells, the first exhaust gas introduction cells, and the second exhaust gas introduction cells are arranged in the following manner:

the exhaust gas emission cells are each surrounded by alternately arranged four pieces of the first exhaust gas introduction cells and four pieces of the second exhaust gas introduction cells across the porous cell walls;

provided that hypothetical segments connecting geometric centers of gravity of the square cross sections of the four second exhaust gas introduction cells surrounding the exhaust gas emission cell are given, an intersection of the two segments crossing a shape region including the cross sectional shape of the exhaust gas emission cell is identical with a geometric center of gravity of the square cross section of the exhaust gas emission cell; and the four segments not crossing the shape region including the cross sectional shape of the exhaust gas emission cell form a square, and midpoints of the sides of the square are identical with geometric centers of gravity of the square cross sections of the four first exhaust gas introduction cells surrounding the exhaust gas emission cell, and a side facing the first exhaust gas introduction cell across a cell wall among the sides forming the cross sectional shape of the exhaust gas emission cell is parallel to a side facing the exhaust gas emission cell across the cell wall among the sides forming the cross sectional shape of the first exhaust gas introduction cell, a side facing the second exhaust gas introduction cell across a cell wall among the sides forming the cross sectional shape of the first exhaust gas introduction cell is parallel to a side facing the first exhaust gas introduction cell across the cell wall among the sides forming the cross sectional shape of the second exhaust gas introduction cell, and distances between the parallel sides are the same.

In the honeycomb filter of the embodiments of the present invention, in the cross section perpendicular to the longitudinal direction of the aforementioned cells, preferably the vertex portions of the polygonal cells are formed by curved lines.

The honeycomb filter having cells with vertex portions formed by carved lines according to the above structure are not susceptible to concentration of stress derived from heat or the like in the corner portions of the cells. Thus, cracks hardly occur.

In the honeycomb filter according to the embodiments of the present invention, in the direction perpendicular to the longitudinal direction of the cells, the exhaust gas emission cells, the first exhaust, gas introduction cells, and the second exhaust gas introduction cells are preferably point-symmetrical polygons each having not move than eight sides.

The cells each having a point-symmetrical polygonal shape with not more than eight sides can reduce the resistance caused upon flowing of exhaust gas through the cells, and thus can further reduce the pressure loss.

In the honeycomb filter according to the embodiments of the present invention, preferably, the exhaust gas introduction cells include first exhaust gas introduction cells and second exhaust gas introduction cells each having a larger cross sectional area than each first exhaust gas introduction cell in a direction perpendicular to the longitudinal direction of the cells;

each exhaust gas emission cell has an equal or larger cross sectional area than each second exhaust gas introduction cell in a direction perpendicular to the longitudinal direction of the cells;

the exhaust gas emission cells and the exhaust gas introduction cells are each in a shape formed by curved lines in the direction perpendicular to the longitudinal direction of the cells; and the thickness of the cell walls separating the first exhaust gas introduction cells and the respective exhaust gas emission cells is smaller than the thickness of the cell walls separating the second exhaust gas introduction cells and the respective exhaust gas emission cells.

In the honeycomb filter according to the embodiments of the present invention, in a case where the thickness of the cell walls separating the first exhaust gas introduction cells and the respective exhaust gas emission cells is smaller than the thickness of the cell walls separating the second exhaust gas introduction cells and the respective exhaust gas emission cells, exhaust gas easily passes through the cell walls separating the first exhaust gas introduction cells and the respective exhaust gas emission cells at an early stage. After accumulation of a certain amount of PMs, exhaust gas is likely to pass through the cell walls separating the second exhaust gas introduction cells and the respective exhaust gas emission cells. The second exhaust gas introduction cells have a larger cross sectional area than the first exhaust gas introduction cells, and the exhaust gas emission cells have an equal or larger cross sectional area than the respective second exhaust gas introduction cells. For this reason, the above effects of the embodiments of the present invention are exerted.

In the honeycomb filter according to the embodiments of the present invention, in the direction perpendicular to the longitudinal direction of the cells, preferably the exhaust gas introduction cells and the exhaust gas emission cells are each in a shape formed by curved lines, and the thickness of the cell walls separating the first exhaust gas introduction cells and the respective exhaust gas emission cells is 40 to 75% the thickness of the cell walls separating the second exhaust gas introduction cells and the exhaust gas emission cells.

In the honeycomb filter of the embodiments or the present invention, if the thickness of the cell walls separating the first exhaust gas introduction cells and the exhaust gas emission cells is 40 to 75% the thickness of the cell walls separating the second exhaust gas introduction cells and the exhaust gas emission cells, exhaust gas easily passes through the cell walls separating the first exhaust gas introduction cells and the exhaust gas emission cells at an initial stage. Then, after accumulation of a certain amount of PMs, exhaust gas passes through the cell walls separating the second exhaust gas introduction cells and the exhaust gas emission cells. Moreover, the second exhaust gas introduction cells each have a larger cross sectional area than each first exhaust gas introduction cell, and each exhaust gas emission cell has an equal or larger cross sectional area than each second exhaust gas introduction cell. Thus, the aforementioned effects of the embodiments of the present invention can be exerted.

If the thickness of the cell walls separating the first exhaust gas introduction cells and the exhaust gas emission cells is less than 40% the thickness of the cell walls separating the second exhaust gas introduction cells and the exhaust gas emission cells, the cell walls separating the first exhaust gas introduction cells and the exhaust gas emission cells need to be extremely thin. Consequently, the honeycomb filter has low mechanical strength. If the thickness of the cell walls separating the first exhaust gas introduction cells and the exhaust gas emission cells is more than 75% the thickness of the cell walls separating the second exhaust gas introduction cells and the exhaust gas emission cells, the former cells and latter cells do not have a big difference in the thickness. Consequently, the aforementioned pressure loss reduction effect may not be obtained.

In the honeycomb filter according to the embodiments of the present invention, in the direction perpendicular to the longitudinal direction of the cells, the exhaust gas emission cells, the first exhaust gas introduction cells, and the second exhaust gas introduction cells are preferably round.

In the honeycomb filter having the above structure, if the cross sectional shapes of the exhaust gas emission cells, first exhaust gas introduction cells, and the second exhaust gas introduction cells are all round, the effects of the embodiments of the present invention can be exerted.

In the honeycomb filter according to the embodiments of the present invention, in the direction perpendicular to the longitudinal direction of the cells, the exhaust gas emission cells and the second exhaust gas introduction cells each preferably have a convex square cross section formed by four outwardly curved lines, whereas the first exhaust gas introduction cells each preferably have a concave square cross section formed by four inwardly curved lines.

The term "convex square" herein refers to a shape formed by four outwardly curved lines in the same length. The shape seems to be a square having sides expanding outwardly from the geometrical center of gravity. The term "concave square" herein refers to a shape formed by four inwardly curved lines in the same length. The shape seems to be a square having sides bending toward the geometrical center of gravity.

The exhaust gas emission cells, the first exhaust gas introduction cells, and the second exhaust gas introduction cells in this honeycomb filter having this structure have the aforementioned structures. Thus, the exhaust gas emission cells each have a larger cross sectional area than each first exhaust gas introduction cells, and thereby providing a honeycomb filter having the relations concerning the sizes of the exhaust gas emission cells, first exhaust gas introduction cells, and second exhaust gas introduction cells according to the embodiments of the present invention. Consequently, the effects of the embodiments of the present invention can be exerted.

In the honeycomb filter according to the embodiments of the present invention, in the direction perpendicular to the longitudinal direction, of the cells, the cross sectional area of each second exhaust gas introduction cell is preferably equal in size to the cross sectional area of each exhaust gas emission cell, and the cross sectional area of each first exhaust gas introduction cell is preferably 20 to 50% the size of the cross sectional area of each second exhaust gas introduction cell.

The honeycomb filter having the above structure can provide difference between the resistances caused upon flowing of exhaust gas through the first exhaust gas introduction cells and the resistance caused upon flowing of exhaust gas through the second exhaust gas introduction cells, thereby enabling effective suppression of the pressure loss.

If the cross sectional area of the first exhaust gas introduction cells is less than 20% the size of the cross sectional area of the second exhaust gas introduction cells, the cross sectional area of the first exhaust gas introduction cells is too small. Consequently, high flow-through resistance occurs upon flowing of exhaust gas through the first exhaust gas introduction cells so that the pressure loss tends to be high. If the cross sectional area of the first exhaust gas introduction cells is more than 50% the size of the cross sectional area of the second exhaust gas introduction cells, the difference between the flow-through resistance of the first exhaust gas introduction cells and the flow-through resistance of the second exhaust gas introduction cells is small. Thus, the pressure loss is hardly reduced.

In the honeycomb filter of the embodiments of the present invention, the exhaust gas introduction cells preferably consist only of the first exhaust gas introduction cells and the second exhaust gas introduction cells each having a larger cross sectional area than each first exhaust gas introduction cell in a direction perpendicular too the longitudinal direction of the cells.

This is because a smaller number of first exhaust gas introduction cells each having a smaller cross sectional area than each second exhaust gas introduction cell provides a larger effective introduction cell area, thereby allowing PMs to be thinly and widely accumulated.

The honeycomb filter of the embodiments of the present invention preferably includes a plurality of honeycomb fired bodies combined with one another by adhesive layers residing therebetween, the honeycomb fired bodies each having the exhaust gas emission cells, the first exhaust gas introduction cells, and the second exhaust gas introduction cells, and each having an outer wall on the periphery thereof.

With regard to the structure formed by combining a plurality of honeycomb fired bodies to one another with adhesive layers residing therebetween, since the cells forming one honeycomb fired body have the structures according to the embodiments of the present invention, an aggregate of the honeycomb fired bodies can exert the effects of the embodiments of the present invention.

Moreover, the honeycomb fired bodies each having a smaller volume enables to reduce the thermal stress that is generated upon production and usage thereof, preventing damage such as cracks.

Figure 13A:
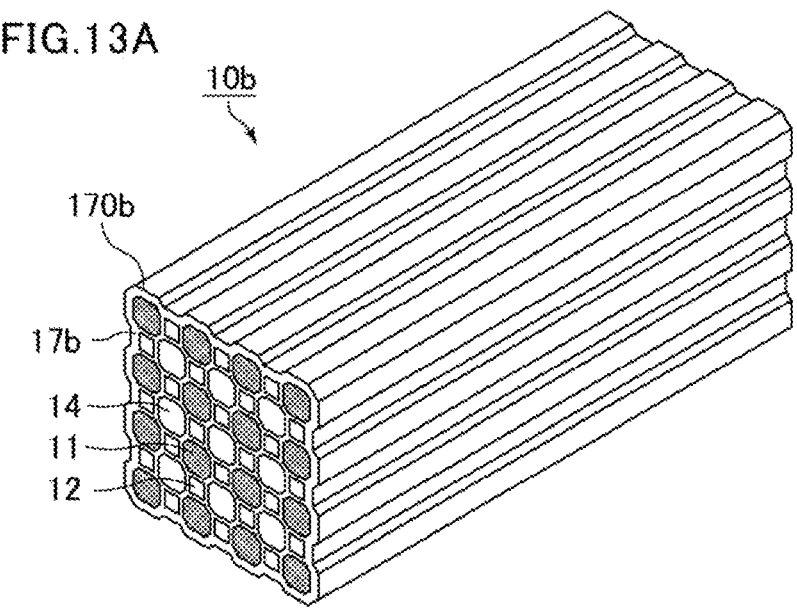
FIG. 13A is a perspective view schematically illustrating one modified example of the honeycomb fired body forming the honeycomb filter according to the third embodiment of the present invention.
Figure 13B:
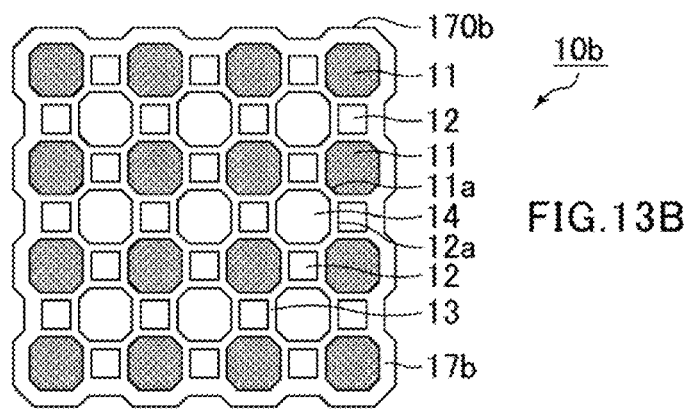
FIG. 13B is an end face view of the honeycomb fired body in FIG. 13A.

In the honeycomb filter of the embodiments of the present invention, the outer wall of the honeycomb fired body and the exhaust gas introduction cell adjacent to the outer wall have the following three patterns of shapes:

(1) as illustrated in FIGS. 12B and 14A, the thickness of the outer wall is not uniform, and the first exhaust gas introduction cell and the exhaust gas emission cell adjacent to the outer wall have the same shapes as the first exhaust gas introduction cell and the exhaust gas emission cell not adjacent to the outer wall, respectively;

(2) as illustrated in FIGS. 2A and 14B, the thickness of the outer wall is uniform, the first exhaust gas introduction cell adjacent to the outer wall has the same shape as the first exhaust gas introduction cell not adjacent to the outer wall, and the exhaust gas emission cell adjacent to the outer wall has a shape partially deformed, compared to the cross sectional shape of the exhaust gas emission cell not adjacent to the outer wall, in accordance with the line along the inner wall, which forms the outer wall, in the exhaust gas emission cell adjacent to the outer wall; and (3) as illustrated in FIGS. 13B and 14C, the thickness of the outer wall is uniform in accordance with the cross sectional shapes of the first exhaust gas introduction cell and the exhaust gas emission cell adjacent to the outer wall, and the first exhaust gas introduction cell and the exhaust gas emission cell adjacent to the outer wall have the same shapes as the first exhaust gas introduction cell and the exhaust gas emission cell not adjacent to the outer wall, respectively, which means that the outer wall is bending in accordance with the cross sectional shapes of the first exhaust gas introduction cell and the exhaust gas emission cell adjacent to the outer wall.

In the honeycomb filter of the embodiments of the present invention, preferably, the outer wall has corner portions and in the exhaust gas introduction cells and the exhaust gas emission cells adjacent to the outer wall, a side, which contacts the outer wall, is straight and parallel to a side corresponding to an outer periphery of the outer wall.

The pattern (2) in the above description of three patterns applies to the honeycomb filter of such an embodiment.

The aforementioned structure enables to enhance the strength of the honeycomb fired body by the outer wall but also suppress the partial variation of the volume ratio of the exhaust emission cells and the exhaust gas introduction cells in the honeycomb fired body. As a result, the flow of exhaust gas becomes more uniform, lowering the pressure loss.

According to she honeycomb filter of the embodiments of the present invention, the aforementioned honeycomb filter includes honeycomb fired bodies, and the honeycomb fired body preferably includes silicon carbide or silicon-containing silicon carbide.

The silicon carbide and silicon-containing silicon carbide are materials excellent in heat resistance. Thus, the honeycomb filter is better in heat resistance.

In the honeycomb filter of the embodiments of the present invention, the thickened of the cell wall of the honeycomb filter is preferably 0.10 to 0.46 mm.

The cell wall having such a thickness is enough thick to capture PMs in the gas and effectively suppresses an increase of the pressure loss. As a result, the honeycomb filter of the embodiments of the present invention can sufficiently exert the effects of the embodiments of the present invention.

If the thickness is less than 0.10 mm, the cell wall is too thin, so that the mechanical strength of the honeycomb filter is lowered. If the thickness is more than 0.46 mm, the cell wall is too thick, so that the pressure loss upon passage of exhaust gas through the cell wall becomes greater.

In the honeycomb filter of the embodiments of the present invention, the cell walls have pores having an average pore diameter of 8 to 25 μm. The pore diameter and the porosity are measured by a mercury injection method under conditions of the contact angle of 130 degrees and the surface tension of 485 mN/m.

If the cell walls have pores having an average pore diameter of less than 8 μm, the pressure loss increases after an oxidation catalyst is supported. If the cell walls have pores having an average pore diameter of more than 25 μm, the pore diameter is too large so that the effect of improving PM capturing efficiency decreases.

In the honeycomb filter of the embodiments of the present invention, the cell walls preferably have a porosity of 40 to 70%.

If the cell walls have a porosity of 40 to 70%, an increase in the pressure loss derived from supporting of the catalyst can be suppressed. Also, the cell walls can favorably capture PMs in exhaust gas. Moreover, an increase in the pressure loss derived from the cell walls can be suppressed. Thus, it is possible to provide a honeycomb filter which has a low initial pressure loss and tends not to suffer an increase in the pressure loss even after accumulation of PMs.

If the cell walls have a porosity of less than 40%, the porosity in the cell walls is too small. Thus, supporting of an oxidation catalyst tends to increase the pressure loss. If the cell walls have a porosity of more than 70%, the cell walls have low mechanical strength, and thus cracks tend to occur during regeneration or the like.

The honeycomb filter of the embodiments of the present invention preferably has a peripheral coat layer formed on the periphery thereof.

The periphery coat layer functions to protect cells inside thereof from mechanical damage. Thus, a honeycomb filter having excellent mechanical characteristics such as compression strength is obtained.

In the honeycomb filter of the embodiments of the present invention, in the cross section perpendicular to the longitudinal direction of the cells forming the honeycomb filter, preferably the first exhaust gas introduction cells, the second exhaust gas introduction cells, and the exhaust gas emission cells each have a uniform cross sectional shape except for the plugged portion in a direction perpendicular to the longitudinal direction of the cells thoroughly from the end at the exhaust gas introduction side to the end at the exhaust gas emission side, the cross sectional shape of the first exhaust gas introduction cells is different from the cross sectional shape of the second exhaust gas introduction cells, and the cross sectional shape of the exhaust gas emission cells is different from the cross sectional shape of the first exhaust gas introduction cells. Here, "different" means "not congruent," but encompasses "similar." In other words, if the cross sectional shapes are similar to each other, the cross sectional shapes are considered different from each other.

Each first exhaust gas introduction cell itself has a uniform cross sectional shape at any cross section thereof, each second exhaust gas introduction cell itself has a uniform cross sectional shape at any cross section thereof, and each exhaust gas emission cell has a uniform cross sectional shape at any cross section thereof. Each first exhaust gas introduction cell has a different cross sectional shape from each second exhaust gas introduction cell. Each exhaust gas emission cell has a different cross sectional shape from each first exhaust gas introduction cell.

The honeycomb filter of the embodiments of the present invention preferably has the following structure. In the cross section perpendicular to the longitudinal direction of the cells, a cell unit having a cell structure described below is two-dimensionally repeated, where the first exhaust gas introduction cells and the second exhaust gas introduction cells surrounding each exhaust gas emission cell in the unit are shared between adjacent cell units.

cell structure: each exhaust gas emission cell is adjacently surrounded fully by the exhaust gas introduction cells across the porous cell walls, the exhaust gas introduction cells including first exhaust gas introduction cells and second exhaust gas introduction cells each having a larger cross sectional area than each first exhaust gas introduction cell in a direction perpendicular to the longitudinal direction of the cells, and each exhaust gas emission cell has an equal or larger cross sectional area than each second exhaust gas introduction cell in a direction perpendicular to the longitudinal direction of the cells, and the exhaust gas introduction cells and the exhaust gas emission cells have the following feature A or B in the cross section perpendicular to the longitudinal direction of the cells:

A: the exhaust gas introduction cells and the exhaust gas emission cells are each polygonal, and a side forming the cross sectional shape of each first exhaust gas introduction cell faces one of the exhaust gas emission cellar a side forming the cross sectional shape of each second exhaust gas introduction cell faces one of the exhaust gas emission cells, and the side of the first exhaust gas introduction cell is longer than the side of the second exhaust gas introduction cell, or a side forming the cross sectional shape of each first exhaust gas introduction cell faces one of the exhaust gas emission cells, and none of the sides forming the cross sectional shape of each second exhaust gas introduction cell faces the exhaust gas emission cells;

B: the exhaust gas introduction cells and the exhaust gas emission cells are each in a shape formed by a curved line, and the thickness of the cell walls separating the first exhaust gas introduction, cells and the exhaust gas emission cells is smaller than the thickness of the cell walls separating the second exhaust gas introduction cells and the exhaust gas emission cells.

Such a honeycomb filter is preferable because the two-dimensional repetition of the cell unit forms a filter having a large capacity. The filter has an outer wall, and the cell units naturally do not spread outside the outer wall. The cell units are cut out properly to be fit into the shape of the outer wall.

The embodiments will now be described with reference to the accompanying drawings, wherein like reference numerals designate corresponding or identical elements throughout the various drawings.

The present invention is not limited to those embodiments, and may be modified within a scope not changing the gist of the present invention.

First Embodiment

The following will discuss a honeycomb filter according to the first embodiment of the present invention.

The honeycomb filter according to the first embodiment of the present invention includes a plurality of honeycomb fired bodies. Each honeycomb fired body includes exhaust gas emission cells each having an open end at an exhaust gas emission side and a plugged end at an exhaust gas introduction side, and exhaust gas introduction cells each having an open end at the exhaust gas introduction side and a plugged end at the exhaust gas emission side, the exhaust gas introduction cells including first exhaust gas introduction cells and second exhaust gas introduction cells, and has an outer wall on the periphery thereof. The honeycomb fired bodies are combined with one another by adhesive layers residing therebetween. An oxidation catalyst is supported inside the cell walls.

In terms of the cells other than the cells adjacent to the outer wall, the exhaust gas emission cells are each adjacently surrounded fully by the first exhaust gas introduction cells and the second exhaust gas introduction cells across the porous cell walls.

In the cross section perpendicular to the longitudinal direction of the cells, each second exhaust gas introduction cell has a larger cross sectional area than each first exhaust gas introduction cell, and each exhaust gas emission cell has the same cross sectional area as each second exhaust gas introduction cell. In other words, the exhaust gas emission cells have a larger average cross sectional area than the exhaust gas introduction cells in a direction perpendicular to the longitudinal direction of the cells, and the total volume of the exhaust gas introduction cells is larger than the total volume of the exhaust gas emission cells.

In the cross section perpendicular to the longitudinal direction of the cells, the exhaust gas emission cells and the exhaust gas introduction cells are each polygonal, and a side facing one exhaust gas emission cell among the sides forming the cross sectional shape of the first exhaust gas introduction cell is longer than a side facing one exhaust gas emission cell among the sides forming the cross sectional shape of the second exhaust gas introduction cell.

The cells adjacent to the outer wall include the first exhaust gas introduction cells and the exhaust gas emission cells arranged alternately with the first exhaust gas introduction cells. Each exhaust gas emission cell has a larger cross sectional area than each first exhaust gas introduction cell in a direction perpendicular to the longitudinal direction of the cells.

Specifically, the arrangement of two first exhaust gas introduction cells, one second exhaust gas introduction cell, and one exhaust gas emission cell is two-dimensionally repeated. Here, since the cross sectional areas thereof have the above relationships, the exhaust gas emission cells have a larger average cross sectional area than the exhaust gas introduction cells, and the total volume of the exhaust gas introduction cells is larger than the total volume of the exhaust gas emission cells.

The outer wall has corner portions. In the exhaust gas introduction cells and the exhaust gas emission cells adjacent to the outer wall, a side, which contacts the outer wall, is straight and parallel to a side corresponding to an outer periphery of the outer wall, and the exhaust gas emission cells adjacent to the outer wall each have a shape partially deformed.

The exhaust gas introduction cells and the exhaust gas emission cells each have a uniform cross sectional shape except for the plugged portion, in a direction perpendicular to the longitudinal direction of the cells thoroughly from the end at the exhaust gas introduction side to the end at the exhaust gas emission side.

Gamma alumina and platinum (Pt) are supported as an oxidation catalyst inside the cell walls of the honeycomb filter according to the first embodiment of the present invention. The oxidation catalyst is not limited to a combination of gamma alumina and platinum (Pt).

The total amount of the oxidation catalyst, i.e., gamma alumina and platinum, supported inside the cell walls of the honeycomb filter according to the first embodiment of the present invention, is 5 to 60 g/L, and preferably 10 to 30 g/L. Herein, the amount of zeolite supported inside the cell walls as an oxidation catalyst means the weight of an oxidation catalyst per liter of an apparent volume of the honeycomb filter.

The apparent volume of the honeycomb filter includes the volume of the adhesive layer and coat layer.

FIG. 1 is a perspective view schematically illustrating one example of the honeycomb filter according to the first embodiment of the present invention.

FIG. 2A is a perspective view schematically illustrating one example of the honeycomb fired body forming the honeycomb filter shown in FIG. 1. FIG. 2B is an A-A line cross sectional view of the honeycomb fired body shown in FIG. 2A.

The honeycomb filter 20 shown in FIG. 1 includes a ceramic block 18 formed of a plurality of honeycomb fired bodies 10 combined with an adhesive layer 15 residing therebetween, and has a periphery coat layer 16 for preventing leakage of emission gas on the periphery of the ceramic block 18. The periphery coat layer 16 may be optionally formed.

Such a honeycomb filter including combined honeycomb fired bodies is also referred to as an aggregated honeycomb filter.

The honeycomb fired body 10 has a rectangular pillar shape, and is roundly cornered at the corner portions in end faces thereof as shown in FIG. 2A. This prevents thermal stress concentration at the corner portions to thereby prevent occurrence of damages such as cracks. The corner portions each may be chamfered in a manner to have a shape formed by straight lines.

In the honeycomb filter 20 according to the first embodiment, the exhaust gas emission cells each have an open end at the exhaust gas emission side and a plugged end at the exhaust gas introduction side, and the exhaust gas introduction cells each have an open end at the exhaust gas introduction side and a plugged end at the exhaust gas emission side. The plug is preferably made of the same material as the material of the honeycomb fired body.

In the honeycomb fired body 10 shown in FIG. 2A and FIG. 2B, the exhaust gas emission cells 11 having an octagonal cross section are each adjacently surrounded fully by the first exhaust gas introduction cells 12 each having a square cross section and the second exhaust gas introduction cells 14 each having an octagonal cross section across porous cell walls therebetween. The first exhaust gas introduction cells 12 and the second exhaust gas introduction cells 14 are alternately arranged around each exhaust gee emission cell 11. Each second exhaust gas introduction cell 14 has a larger cross sectional area than each first exhaust gas introduction cell 12, and each exhaust gas emission cell 11 has the same cross sectional area as each second exhaust gas introduction cell 14. An outer wall 17 is formed on the periphery of the honeycomb fired body 10. Cells adjacent to the outer wall 17 include exhaust gas emission cells 11A and 11B and first exhaust gas introduction cells 12A.

Each second exhaust gas introduction cell 14 and exhaust gas emission cell 11 name octagonal cross sections, and the cross sections are congruent with each other.

In the exhaust gas emission cells 11A and 11B and the exhaust gas introduction cells 12A adjacent to the outer wall 17 in the honeycomb filter 20 according to the present embodiment, a side, which contacts the outer wall 17, is straight and parallel to a side corresponding to an outer periphery of the outer wall 17 in a manner that the thickness of the outer wall 17 is uniform except for the corner portions in the cross section perpendicular to the longitudinal direction of the cells.

The cross sessions of the exhaust gas emission cells 11A adjacent to the outer wall 17 are partially cut so that the cross sectional shapes are changed from octagons to hexagons. The cross sectional shape of the first exhaust gas introduction cells 12A may be in a partially cut shape but is preferably congruent with the cross sectional shape of the first exhaust gas introduction cells 12.

The cross sections of second exhaust gas introduction cells 11B at the corner portions of the honeycomb fired body 10 have been changed from octagon 110B formed by curved lines. The chamfered portions 110B of the exhaust gas emission cells 11B illustrated in FIG. 2A are chamfered to be curved but may be linearly chamfered.

The aforementioned structure enables to not only enhance the strength of the honeycomb fired body by the outer wall but also further reduce the partial variation in the volume ratio between the exhaust gas emission cells and the exhaust gas introduction cells in the honeycomb fired body. Consequently, the uniform flow of exhaust gas is improved. In the vicinity of the outer wall, exhaust gas smoothly flows into the first exhaust gas introduction cells 12 and the cell wall and outer wall effectively function as a filter, so rear the pressure loss is reduced.

In the honeycomb fired body 10, the exhaust gas emission cells 11A and 11B and the exhaust gas introduction cells 2A are alternately arranged along the outer wall 17, and the exhaust gas emission cells 11 is orderly arranged, inside the cells along the outer wall 17 with the first exhaust gas introduction cells 12 and the second exhaust gas introduction cells residing therebetween. As above, the exhaust gas emission cells 11, the first exhaust gas introduction cells 12, and the second exhaust gas introduction cells 14 are arranged in a significantly ordered manner.

Each exhaust gas emission cell 11 and each second exhaust gas introduction cell 14 have the same octagonal shape. The octagon is point-symmetry with respect to the center of gravity. In the octagon, all hypotenuse sides (14a in FIGS. 6A to 6C) have the same length, and all vertical or horizontal sides (14b in FIGS. 6A to 6C) have the same length. Moreover, four first sides (the hypotenuse sides) and four second sides (the vertical or horizontal sides) are alternately arranged. The first sides and the second sides form an angle of 135°.

The term "hypotenuse side" generally refers to the longest side that is opposite to the right angle in a right-angled triangle. However, for convenience for explanation, a "hypotenuse side" herein refers to a side such as the side 14a and the side 11b that has a certain angle, except for 90° and 0°, to below-mentioned four hypothetical segments. For differentiation from this term, the term "vertical or horizontal side" herein refers to a side such as the side 14b and the side 11a that is parallel to or vertical to the below-mentioned four hypothetical segments.

The hypothetical segments mentioned in the explanation of the terms "hypotenuse side" and "vertical or horizontal sides" refer to four hypothetical segments (the four segments form a square) that do not cross the cross sectional figure of the exhaust gas emission cell 11, among hypothetical segments that connect geometric centers of gravity of the respective cross sectional figures of the four second exhaust gas introduction cells arranged around the exhaust gas emission cell 11.

Each first exhaust gas introduction cell 12 has a square cross section.

In the cross section of the three kinds of cells which are adjacent to each other, namely, the exhaust gas emission cell 11, the second exhaust gas introduction cell 14, and the first exhaust gas introduction cell 12, the side 11a facing the first exhaust gas introduction cell 12 across the cell wall 13 among the sides of the octagonal exhaust gas emission cell 11 is parallel to the side 12a facing the exhaust gas emission cell 11 across the cell wall 13 among the sides of the square first exhaust gas introduction cell 12.

Also, the side 11b facing the octagonal second exhaust gas introduction cell 14 across the cell wall 13 among the sides of the octagonal exhaust gas emission cells 11 is parallel to the side 14a facing the exhaust gas emission cell 11 across the cell wall 13 among the sides of the octagonal second exhaust gas introduction cell 14. Moreover, the side 12b facing the second exhaust gas introduction cell 14 across the cell wall 13 among the sides of the first exhaust gas introduction cell 12 is parallel to the side 14b facing the first exhaust gas introduction cell 12 across the cell wall 13 among the sides of the second exhaust gas introduction cell 14. Furthermore, the distances between the parallel sides of all the above pairs are the same (see FIGS. 6A to 6C). That is, the distance between the parallel sides 11a and 12a, the distance between the parallel sides 11b and 14a, and the distance between the parallel sides 12b and 14b are the same.

Additionally, the exhaust gas emission cells 11, the first exhaust gas introduction cells 12, and the second exhaust gas introduction cells 14 are arranged in a manner satisfying the conditions below.

Among the hypothetical segments connecting the geometric centers of gravity of the octagonal shapes of the four second exhaust gas introduction cells 14 surrounding the exhaust gas emission cell 11, an intersection of the two segments crossing the octagonal shape region of the exhaust gas emission cell 11 is identical with the geometric center of gravity of the octagonal cross section of the exhaust gas emission cell 11.

Moreover, among the hypothetical segments connecting the geometric centers of gravity of the octagonal shapes of the four second exhaust gas introduction cells 14, the four segments not crossing the octagonal shape region of the exhaust gas emission cell 11 forms a square, and midpoints of the respective sides of the square are identical with the geometric centers of gravity of the respective square shapes of the four first exhaust gas introduction cells 12 surrounding the exhaust gas emission cell 11.

As described above, the octagonal exhaust gas emission cell 11 is adjacently surrounded by alternately arranged four pieces of the first square exhaust gas introduction cells 12 and four pieces of the second octagonal exhaust gas introduction cells 14 across the cell walls 13 to form a single unit. The unit is two-dimensionally repeated, where the first exhaust gas introduction cells 12 and the second exhaust gas introduction cells 14 in the unit are shared between adjacent cell units, to form a honeycomb filter. Since the units share the first exhaust gas introduction cells 12 and the second exhaust gas introduction cells 14, the first exhaust gas introduction cell 12 and the second exhaust gas introduction cell 14, that adjoin the exhaust gas emission cell 11 across the cell walls 13, also adjoin the exhaust gas emission cell 11 in the adjacent unit across the cell wall 13.

Figure 7:
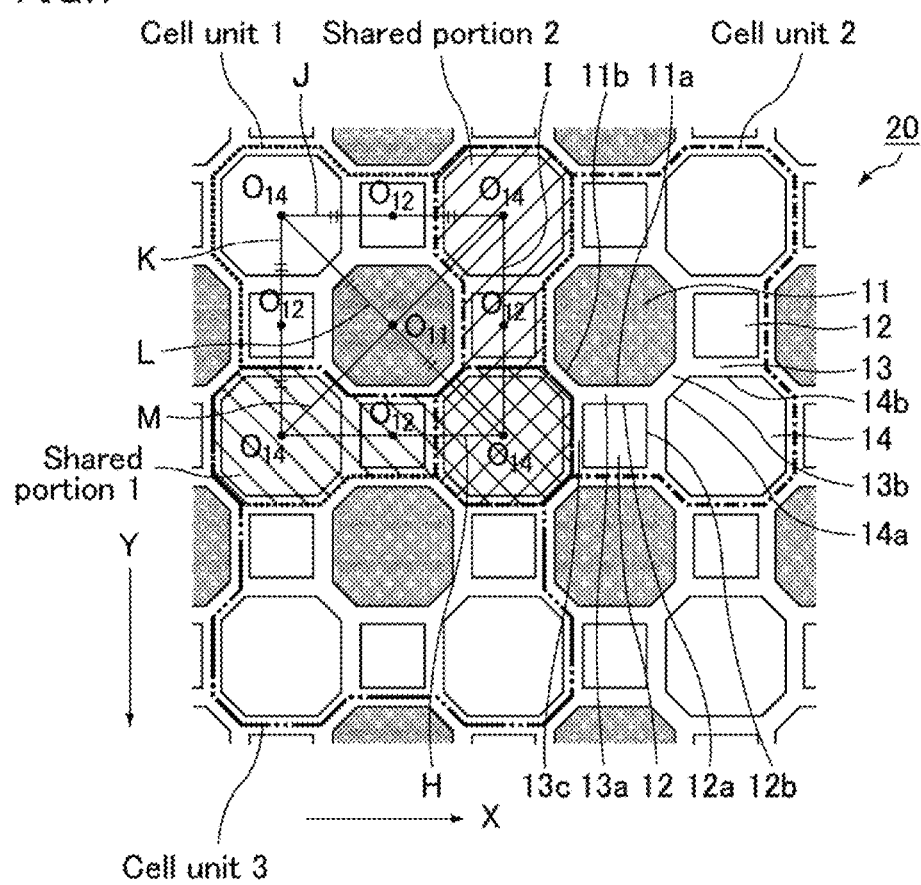
FIG. 7 is an enlarged cross sectional view perpendicular to the longitudinal direction of the honeycomb filter.

FIG. 7 is an enlarged cross sectional view perpendicular to the longitudinal direction of the honeycomb filter. FIG. 7 illustrates how each cell unit (cell structure) is two-dimensionally, i.e. in X and Y directions shown in FIG. 7, repeated in the case where the second exhaust gas introduction cells 14 and the exhaust gas emission cells 11 are octagonal, the first exhaust gas introduction cells 12 are square in the cross section of the cells, and the aforementioned conditions are satisfied, and also illustrates how the first exhaust gas introduction cells 12 and the second exhaust gas introduction cells 14 are shared between the cell units (cell structure).

A cell unit 1, a cell unit 2, and a cell unit 3 each have a structure in which the exhaust gas emission cell 11 is fully surrounded by alternately arranged four pieces of the first exhaust gas introduction cells 12 and four pieces of the second exhaust gas introduction cells 14 across the cell wells 13 in a manner satisfying the aforementioned conditions. The cell unit 2 has the same structure as that of the cell unit 1. The cell unit 2 is adjacent to the cell unit 1 in the X direction while sharing one piece of the first exhaust gas introduction cell 12 and two pieces of the second exhaust gas introduction cells 14 with the cell unit 1. The cells shared between the cell unit 1 and the cell unit 2 are depicted as "shared portion 2" in FIG. 7. The cell unit 3 has the same structure as that of the cell unit 1. The cell unit 3 is adjacent to the cell unit 1 in the Y direction while sharing one piece of the first exhaust gas introduction cell 12 and two pieces of the second exhaust gas introduction cells 12 with the cell unit 1. The cells shared between the cell unit 1 and the cell unit 3 are depicted as "shared portion 1" in FIG. 7.

Meanwhile, FIG. 7 shows four segments H, I, J, and K that do not cross the octagonal shape region of the exhaust gas emission cell 11, and hypothetical two segments L and M that cross the octagonal shape region of the exhaust gas emission cell 11, among hypothetical segments connecting the geometric centers of gravity of the respective octagonal shapes of the four pieces of the second exhaust gas introduction cells 14. The "shared portion 2" is depicted by cross-hatching with segments in the same direction as that of the segment M, and the "shared portion 1" is depicted by cross-hatching with segments in the same direction as that of the segment L.

As shown in FIG. 7, an intersection of the two segments L and M is identical with the geometric center of gravity of the exhaust gas emission cell 11.

With regard to the cell shapes in the honeycomb filter 20 shown in FIGS. 1, 2A, 2B, and 6A to 6C, the exhaust gas emission cells 11 and the second exhaust gas introduction cells 14, except for the exhaust gas emission cells 11A and 11B adjacent to the outer wall 17, each have an octagonal cross section, and the first exhaust gas introduction cells 12 and 12A each have a square cross section. However, the cross sectional shapes of the exhaust gas emission cells and the exhaust gas introduction cells of the embodiment of the present invention are not limited to the above shapes, and may be all square as mentioned below, or may be combinations of other polygons.

Moreover, the exhaust gas emission cells 11, the first exhaust gas introduction cells 12, and the second exhaust gas introduction cells 14, which are polygons in the cross section thereof, may be roundly cornered so that the vertex portions are formed by curved lines in the cross section.

Example of the curved lines include curved lines obtained by dividing a circle into quarters, and carved lines obtained by dividing an ellipse into four equal parts linearly along the long axis and the axis perpendicular to the long axis. In particular, the vertex portions of the cells having a rectangular cross section are preferably formed by curved lines in the cross section. This prevents stress concentration at the corner portions, thereby preventing cracks in the cell walls.

Furthermore, the honeycomb filter 20 may partially include cells formed by curved lines such as a cell having a circle cross section.

The following description is not applicable to the exhaust gas emission cells 11A and 11B adjacent to the outer wall 17.

The cross sectional area of each first exhaust gas introduction cell 12 is preferably 20 to 50%, and more preferably 22 to 45% the size of the cross sectional area of each second exhaust gas introduction cell 14.

In the honeycomb filter 20 shown in FIGS. 1, 2A, 2B, and 6A to 6C, the cross sectional area of each exhaust gas emission cell 11 is equal to the cross sectional area of each second exhaust gas introduction cell 14; however, the cross sectional area of each exhaust gas emission cell 11 may be larger than the cross sectional area of each second exhaust gas introduction cell 14.

The cross sectional area of each exhaust gas emission cell 11 is preferably 1.05 to 1.5 times the size of the cross sectional area of each second exhaust gas introduction cell 14.

Moreover, the side 13a facing the exhaust gas emission, cell 11 among the sides forming the cross sectional shape of the first exhaust gas introduction cell 12 is longer than the side 14a facing the exhaust gas emission cell 11 among the sides forming the cross sectional shape of the second exhaust gas introduction cell 14. The sides 12a and 14a are sides facing the exhaust gas emission cell 11 according to the aforementioned definition of the embodiments of the present invention.

The ratio of the length of the side 14a of the second exhaust gas introduction cell 14 to the length of the side 12a of the first exhaust gas introduction cell 12 (length of the side 14a/length of the side 12a) is not particularly limited, and is preferably not more than 0.8, more preferably not more than 0.7, and still more preferably not more than 0.5.

As shown in FIG. 2B, exhaust gas $G_1$ (exhaust gas is represented by an arrow $G_1$ which shows the flow of exhaust gas in FIG. 2B) having flowed into the first exhaust gas introduction cells 12 or the second exhaust gas introduction cells 14 inevitably passes through the cell walls 13 which separates the exhaust gas emission cells 11 and the respective first exhaust gas introduction cells 12 or the respective second exhaust gas introduction cells 14, and then flows out of the exhaust gas emission cells 11. Upon passage of exhaust gas $G_1$ through the cell walls 13, PMs and the like in the exhaust gas are captured so that the cell walls 13 function as filters.

The exhaust gas emission cells 11, the first exhaust gas introduction cells 12, and the second exhaust gas introduction cells 14 allow flow of gas such as exhaust gas as described above. For flow of exhaust gas in the direction shown in FIG. 2B, an end at a first end face 10f of the honeycomb fired body 10 (the end on the side at which the exhaust gas emission cells 11 are plugged) is referred to as an exhaust gas introduction side end, an end at a second end face 10r of the honeycomb fired body 10 (the end on the side at which the first exhaust gas introduction cells 12, and the second exhaust gas introduction cells 14 are plugged) is referred to as an exhaust gas emission side end.

The honeycomb filter 20 having the aforementioned structure highly purifies CO and HC and can reduce the initial pressure loss as compared with conventional honeycomb filters. Also, the honeycomb filter 20 can reduce the rate of increase in the pressure loss even after accumulation of a considerable amount of PMs on the cell walls as explained in the effects of the honeycomb filter according to the embodiment of the present invention. The honeycomb filter 20 can significantly reduce the pressure loss throughout the use from the initial stage to after accumulation of PMs in close to the limit amount.

In the honeycomb filter 20 having the structure illustrated in FIGS. 2A and 2B, since the thickness of the outer wall 17 is uniform ever the whole length, the strength of the honeycomb fired body is enhanced by the outer wall and the partial variation in the volume ratio is further reduced between the exhaust gas emission cells and the exhaust gas introduction cells in the honeycomb fired body. Consequently, the uniform flow of exhaust gas is improved so that the pressure loss can be reduced.

In terms of the cells adjacent to the outer wall 17, since the exhaust gas emission cells 11A and 11B are each adjacent to the exhaust gas introduction cell 12A, exhaust ear can pass through the inside of the outer wall 17, which means chat part of the outer wall 17 can be used as a filter. As a result, the pressure loss is further reduced.

Moreover, since the outer wall 17 is chamfered, stress is prevented from concentrating on the corner portions of the honeycomb fired body 10, so that cracks hardly occur in the corner portions of the honeycomb fired body 10. When the cross sectional shape or the exhaust gas emission cell 11B positioned at the corner portion is a pentagon formed by straight lines, not having the chambered portion 110B formed by curved lines, the exhaust gas emission cell 11B positioned close to the corner portion of the honeycomb fired body 10 is likely to have a stress concentrated thereon to easily have cracks. In the honeycomb filter 20, however, since the exhaust gas emission cells 11B each have the chamfered portion 110B, cracks hardly occurs therein.

The honeycomb filter 20 according to the first embodiment includes a plurality of honeycomb fired bodies 10. Examples of the material for the honeycomb fired bodies 10 include carbide ceramics such as silicon carbide, titanium carbide, tantalum carbide, and tungsten carbide; nitride ceramics such as aluminum nitride, silicon nitride, boron nitride, and titanium nitride; oxide ceramics such as alumina, zirconia, cordierite, mullite, and aluminum titanate; and silicon-containing silicon, carbide, and the like. Silicon carbide or silicon-containing silicon carbide is preferable among the examples as they are excellent in heat resistance, mechanical strength, thermal conductivity and the like.

Meanwhile, the silicon-containing silicon carbide is a mixture of silicon carbide and silicon metal, and is preferably silicon-containing silicon carbide including 60 wt % or more of silicon carbide.

The thickness of the cell walls separating the cells is preferably uniform at any part in the honeycomb fired body 10 forming the honeycomb filter 20 according to the first embodiment. The thickness of the cell walls is preferably 0.10 to 0.46 mm, and more preferably 0.12 to 0.35 mm. The thickness of the outer wall 17 is preferably 0.10 to 0.50 mm. Meanwhile, the thickness of the cell wall is a value measured as the thickness D shown in FIG. 3B based on the aforementioned definition.

The thickness of the plugged portion is preferably 1.0 to 5.0 mm.

The average pore diameter of pores in the cell walls is preferably 8 to 25 μm in the honeycomb fired body 10 forming the honeycomb filter 20 according to the first embodiment.

The number of the cells per unit area is preferably 31 to 62 pcs/cm$^2$ (200 to 400 pcs/inch$^2$) in the cross section of the honeycomb fired body 10.

The honeycomb filter 20 according to the embodiment of the present invention is formed by combining, with an adhesive layer residing therebetween, a plurality of the honeycomb fired bodies each having an outer wall on the periphery thereof. An adhesive layer that combines the honeycomb fired bodies is prepared by applying an adhesive paste that contains an inorganic binder and inorganic particles, and drying the adhesive paste. The adhesive layer may further contain at least one of an inorganic fiber and a whisker.

The adhesive layer preferably has a thickness of 0.5 to 2.0 mm.

The honeycomb filter according to the first embodiment of the present invention, may have a periphery coat layer on the periphery thereof. The material of the periphery coat layer is preferably the same as the materials of the adhesive layer.

The periphery coat layer preferably has a thickness of 0.1 to 3.0 mm.

The following will discuss a method of manufacturing the honeycomb filter according to the first embodiment of the present invention.

The method described below uses a silicon carbide as ceramic powder.

(1) A molding process for manufacturing a honeycomb molded body is performed by extrusion molding a wet mixture containing ceramic powder and a binder.

Specifically, silicon carbide powders having different average particle sizes serving as ceramic powder, an organic binder, a pore-forming agent, a liquid plasticizer, a lubricant, and water are mixed to prepare a wet mixture for manufacturing a honeycomb molded body.

Examples of the pore-forming agent include balloons that are fine hollow spheres including oxide-based ceramics, spherical acrylic particles, graphite, and starch.

The balloons are not particularly limited, and examples thereof include alumina balloon, glass micro balloon, shirasu balloon, fly ash balloon (FA balloon), and mullite balloon. Alumina balloon is preferable among these.

The average particle diameter of the pore-forming agent is preferably 30 to 50 μm, more preferably 35 to 45 μm, and still more preferably 1.5 to 2.5 times the target average pore diameter of the honeycomb filter. The pore-forming agent preferably includes a pore-forming particle having a particle diameter of not more than 20 μm and a pore-forming particle having a particle diameter of not less than 60 μm, each in an amount of not more than 10% and preferably each in an amount of not more than 5%, relative to all the pore-forming particles. The pore-forming agent content is preferably 10 to 25 wt % and more preferably 15 to 20 wt % relative to the silicon carbide powders serving as ceramic powder.

Then, the wet mixture is charged into an extrusion molding machine and extrusion-molded to manufacture honeycomb molded bodies in predetermined shapes.

Here, a honeycomb molded body is manufactured with a die that can make a cross sectional shape having the cell structure (shapes and arrangement of the cells) shown in FIGS. 2A and 2B.

(2) The honeycomb molded bodies are cut at a predetermined length and dried with use of a drying apparatus such as a microwave drying apparatus, a hot-air drying apparatus, a dielectric drying apparatus, a reduced-pressure drying apparatus, a vacuum drying apparatus, or a freeze crying apparatus. Then, predetermined cells are plugged by filling the cells with a plug material paste to be a plug (plugging process).

Here, the wet mixture may be used as the plug material paste.

(3) Then, the honeycomb molded body is heated at 300° C. to 650° C. in a decreasing furnace to remove organic matters in the honeycomb molded body (degreasing process). The decreased honeycomb molded body is transferred to a firing furnace and fired at 2000° C. to 2200° C. (firing process). In this manner, the honeycomb fired body having the configuration as shown in FIGS. 2A and 2B is manufactured.

The plug material paste filled into the end of the cells is fired by heating to be a plug.

Conditions for cutting, drying, plugging, degreasing, and firing may be conditions conventionally used for manufacturing honeycomb fired bodies.

(4) A plurality of the honeycomb fired bodies are stacked in series with the adhesive paste residing therebetween on a support table to combine the honeycomb fired bodies (combining process) so that a honeycomb aggregate body including the plurality of stacked honeycomb fired bodies is manufactured.

The adhesive paste contains, for example, an inorganic binder, an organic binder, and inorganic particles. The adhesive paste may further contain inorganic fibers and/or whisker.

Examples of the inorganic particles in the adhesive paste include carbide particles, nitride particles, and the like. Specific examples thereof include inorganic particles made from silicon carbide, silicon nitride, boron nitride, and the like. Each of these may be used alone, or two or more of these may be used in combination. Among the inorganic particles, silicon carbide particles are preferable due to their superior thermal conductivity.

Examples of the inorganic fibers and/or whisker in the adhesive paste include inorganic fibers and/or whisker made from silica-alumina, mullite, alumina, and silica. Each of these may be used alone or two or more of these may be used in combination. Alumina fibers are preferable, among the inorganic fibers. The inorganic fibers may be biosoluble fibers.

Furthermore, balloons that are fine hollow spheres including oxide-based ceramics, spherical acrylic particles, graphite, or the like may be added to the adhesive paste, if necessary. The balloons are not particularly limited, and examples thereof include alumina balloon, glass micro balloon, shirasu balloon, fly ash balloon (FA balloon), mullite balloon, and the like.

(5) The honeycomb aggregate body is then heated to solidify the adhesive paste, whereby a rectangular pillar-shaped ceramic block is manufactured.

The heating and solidifying of the adhesive paste may be performed under conditions that have been conventionally employed for manufacturing honeycomb filters.

(6) The ceramic block is subjected to cutting (cutting process).

Specifically, the periphery of the ceramic block is cut with a diamond cutter, whereby a ceramic block whose periphery is cut into a substantially round pillar shape is manufactured.

(7) A peripheral coating material paste is applied to the peripheral face of the substantially round pillar-shaped ceramic block, and is dried and solidified to form a periphery coat layer (periphery coat layer forming process).

The adhesive paste may be used as the peripheral coating material paste. Alternatively, the peripheral coating material paste may be a paste having a composition different from that of the adhesive paste.

The periphery coat layer is not necessarily formed and may be formed, if necessary.

The peripheral shape of the ceramic block is adjusted by the periphery coat layer, and thereby a round pillar-shaped honeycomb filter is obtained.

The honeycomb filter including the honeycomb fired bodies can be manufactured through the aforementioned processes.

Although the honeycomb filter having a predetermined shape is manufactured by cutting, the honeycomb filter may also be allowed to have a predetermined shape such as round-pillar shape as follows: honeycomb fired bodies of a plurality of shapes, each having an octet wall on the periphery thereof, are manufactured in the honeycomb fired body manufacturing process, and then the honeycomb fired bodies of a plurality of shapes are combined with one another with the adhesive layer residing therebetween. In this case, the cutting process can be omitted.

(8) The honeycomb filter is allowed to support an oxidation catalyst (catalyst coating process).

Gamma alumina that supports platinum described above may be used as an oxidation catalyst. The oxidation catalyst is mixed with a solvent to form slurry. The honeycomb filter is immersed in the slurry so that the oxidation catalyst is supported in the honeycomb filter. The amount of the oxidation catalyst supported can be controlled by repetition of a series of immersion in the slurry, air blow, and drying.

The oxidation catalyst can be supported inside the cell walls by the following method: gamma alumina which already supports platinum and is controlled to have an average secondary particle diameter of 0.5 to 3 μm is made into slurry; and a honeycomb fired body is immersed in the slurry. The gamma alumina which supports platinum can be prepared by immersing gamma aluminum particles in a solution of a metal compound containing platinum. The amount of the oxidation catalyst to be supported on the surface of the cell walls can be reduced by controlling the viscosity of the slurry and controlling the force of the air blow or suction.

Hereinafter, the effects of the honeycomb filter according to the first embodiment of the present invention are listed.

(1) In the honeycomb filter according to the present embodiment, an oxidation catalyst is supported inside the cell walls in an amount of 5 to 60 g/L; the exhaust gas emission cells have a larger average cross sectional area perpendicular to the longitudinal direction than the exhaust gas introduction cells in a direction perpendicular to the longitudinal direction; and the total volume of the exhaust gas introduction cells is greater than the total volume of the exhaust gas emission cells. Thus, flow-in exhaust gas easily contacts with the oxidation catalyst supported on the cell walls, thereby achieving a high gas purification performance.

(2) The honeycomb filter according to the embodiment can not only reduce the initial pressure loss as compared with conventional honeycomb filters but also reduce the rate of increase in the pressure loss even after accumulation of a considerable amount of PMs on the cell walls. The honeycomb filter can significantly reduce the pressure loss throughout the use from the initial stage to after accumulation of PMs in close to the limit amount.

(3) In the honeycomb filter according to the present embodiment, the cross sectional area of each first exhaust gas introduction cell may be 20 to 50% the size of the cross sectional area of each second exhaust gas introduction cell.

This setting of the cross sectional area ratio of the first exhaust gas introduction cell and the second exhaust gas introduction cell can provide difference between the resistance caused upon flowing of exhaust gas through the first exhaust gas introduction cells and the resistance caused upon flowing of exhaust gas through the second exhaust gas introduction cells, thereby enabling effective reduction of the pressure loss.

(4) In the honeycomb filter according to the present embodiment, the ratio of the length of the side of the second exhaust gas introduction cell facing the exhaust gas emission cell to the length of the side of the first exhaust gas introduction cell facing the exhaust gas emission cell may be not more than 0.8.

The aforementioned ratio of the length of the side of the first exhaust gas introduction cell to the length of the side of the second exhaust gas introduction cell enables exhaust gas to easily pass through the cell walls separating the exhaust gas emission cells and the first exhaust gas introduction cells, effective suppression of the initial pressure loss, and prevention of an increase in the rate of increase or the pressure loss after accumulation of PMs.

(5) In the honeycomb filter according to the present embodiment, the material of the honeycomb fared bodies may include silicon carbide or silicon-containing silicon carbide. Such a material enables to provide a honeycomb filter having excellent heat resistance.

(6) In the honeycomb filter according to the present embodiment, the thickness of the cell walls separating the cells may be uniform at any part.

This setting for the entire thickness of the cell walls enables to provide a honeycomb filter having the same effects at any part thereof.

(7) In the honeycomb filter according to the present embodiment, the thickness of the cell walls may be 0.10 to 0.46 mm.

The cell walls having the aforementioned thickness are sufficient for capturing PMs in exhaust gas, and also enable efficient suppression of increase in the pressure loss.

(8) In the honeycomb filter according to the present embodiment, the average pore diameter of pores in the cell walls may be 8 to 25 µm in the honeycomb fired body forming the honeycomb filter.

The above average pore diameter of pores in the cell walls enables to capture PMs at a high capturing efficiency while suppressing an increase in the pressure loss.

(9) In the honeycomb filter according to the present embodiment, the exhaust gas introduction cells and the exhaust gas emission cells each have a uniform cross sectional shape except for the plugged portion in a direction perpendicular to the longitudinal direction of the cells thoroughly from the end at the exhaust gas introduction side to the end at the exhaust gas emission side.

Thus, the entire honeycomb filter can exert the same or similar effects so that disadvantages caused by local shape variations in the honeycomb filter can be prevented.

(10) In the honeycomb flitter according to the present embodiment, cracks tend not to be caused by thermal shock that occurs upon burn-removal (regeneration) of accumulated PMs in the honeycomb filter.

In the honeycomb filter according to the present embodiment, the plugged portions provided at the end at the exhaust gas emission side, namely the plugged portions in the first exhaust gas introduction cells and the second exhaust gas introduction cells are present in vertical and horizontal rows. Each plugged portion has a width equal to or larger than the length of one side of the first exhaust gas introduction cell. In ordinary regeneration of honeycomb filters, heat burns firstly PMs accumulated at the exhaust gas introduction side of a honeycomb filter. Then, burning of PMs is transferred by exhaust gas flow to the emission side of the honeycomb filter so that all the PMs are burned. For this reason, positions closer to the emission side of the honeycomb filter are exposed to higher temperatures, and easily have temperature difference along the diameter direction of the honeycomb filter. Thus, cracks occur due to the thermal stress. Such cracks are prominent in the case where the cross sectional areas are different among the cells, and also in the case where the cross sections of the exhaust gas introduction cells where PMs accumulate have square cross section(s). In contrast, in the honeycomb filter according to the embodiment of the present invention, the plugged portions aligned in vertical and horizontal rows at the exhaust gas emission side function as thermally conductive layers and as layers for dissipating heat to outside. Thus, the temperature difference is small along the diameter direction at the and of the exhaust gas emission side of the honeycomb filter. This reduces the thermal stress to prevent occurrence of cracks. Moreover, in the honeycomb filter according to the embodiment of the present invention, the amount of the plug in the second exhaust gas introduction cells, in which a larger amount of PMs accumulate compared with the first exhaust gas introduction cells, is large due to the size of the cross sectional area, and thereby the thermal capacity of the plugged portions increase. Such plugged portions can prevent an increase in the temperature of the second exhaust gas introduction cells, where the heat of burning PMs is higher, even in consideration of each cell. This reduces the temperature difference in the diameter direction of the honeycomb filter, thereby presumably reducing the thermal stress to be caused.

Thus, the honeycomb filter according to the present embodiment can prevent cracks during the regeneration even though it includes exhaust gas introduction cells having square cross sections.

(11) In the honeycomb filter according to the embodiment, the aforementioned structure enables to not only enhance the strength of the honeycomb fired body by the outer wall but also further reduce the partial variation in the volume ratio between the exhaust gas emission cells and the exhaust gas introduction cells in the honeycomb fired body. Consequently, the uniform flow of exhaust gas is improved so that the pressure loss can be reduced.

Hereinafter, examples are given for more specifically describing the first embodiment of the present invention. However, the present invention is not limited only to the examples.

Example 1

A mixture was obtained by mixing 56.3% by weight of a silicon carbide coarse powder having an average particle size of 22 μm and 24.1% by weight of a silicon carbide fine powder having an average particle size of 0.5 μm. To the mixture were added 4.4% by weight of an organic binder (methylcellulose), 0.8% by weight of a lubricant (UNILUB, manufactured by NOF Corporation), 0.8% by weight of glycerin, 2.2% by weight of oleic acid, and 11.3% by weight of water and then kneaded to prepare a wet mixture. Thereafter, the wet mixture was extrusion-molded (molding process).

This process provided a raw honeycomb molded body which had the same shape as that of the honeycomb fired body 10 shown in FIG. 2A and in which the cells were not plugged.

Next, the raw honeycomb molded body was dried using a microwave drying apparatus to obtain dried honeycomb molded bodies. Then, predetermined cells of the dried honeycomb molded body were plugged by filling the cells with a plug material paste.

Specifically, the cells are plugged in a manner that the end at the exhaust gas introduction side and the end at the exhaust gas emission side are plugged at the positions shown in FIG. 6A.

The wet mixture was used as the plug material paste. Thereafter, the dried honeycomb molded body, which has predetermined cells filled with the ping material paste, was dried with a drying apparatus again.

Subsequently, the dried honeycomb molded bodies after plugging of cells were decreased at 400° C. (decrease treatment) and then fired at 2200° C. (firing treatment) under normal pressure argon atmosphere for three hours.

In this manner, a rectangular pillar-shaped honeycomb fired body was manufactured.

The measurement mentioned below of the length of sides and the cross sectional area can be performed by the aforementioned image analysis of an electron microscope photograph and by use of the aforementioned grain site distribution measurement software (Mac-View (version 3.5), produced by Mountech Co. Ltd.).

The manufactured honeycomb fired body was the honeycomb fired body 10 shown in FIGS. 2A and 2B formed of a silicon carbide sintered body having a porosity of 42%, an average pore diameter of 11 μm, a size of 34.3 mm×34.3 mm×177.8 mm, the number of cells (cell density) of 310 pcs/inch$^2$, a thickness of cell walls of 0.18 mm, and a thickness of each plugged portion of 3 mm.

The exhaust gas emission cell 11 was adjacently surrounded fully by the first exhaust gas introduction cells 12 and 12A and the second exhaust gas introduction cells 14 in the cross section perpendicular to the longitudinal direction of the manufactured honeycomb fired body 10. The first exhaust gas introduction cells 12 and 12A had square cross sections, and the length of sides forming the cross sections of the first exhaust gas introduction cells 12 and 12A was 1.02 mm.

The second exhaust gas introduction cells 14 had octagonal cross sections. The length of the hypotenuse side of the second exhaust gas introduction cells facing the exhaust gas emission cell 11 was 0.32 mm, and the vertical or horizontal sides not facing the exhaust gas emission cell 11 were 1.13 mm.

In other words, the length of the side facing the exhaust gas emission cell 11 among the sides forming the cross sectional shape of the second exhaust gas introduction cell 14 was 0.28 times as long as than the side facing the exhaust gas emission cell 11 among the sides forming the first exhaust gas introduction cell 12.

In the exhaust gas emission cells 11B at the four corners, the length of sides adjacent to the outer wall 17 was 1.30 mm, the length of the vertical or horizontal sides was 1.08 mm, the length of the hypotenuse sides was 0.32 mm, and the cross sectional area was 1.67 mm$^2$.

In the exhaust gas emission cells 11A, the length of the side adjacent to the outer wall 17 was 1.58 mm, the length of the vertical side parallel to the side adjacent to the outer wall 17 was 1.13 mm, the length of the horizontal side connected at a right angle to the side adjacent to the outer wall 17 was 1.08 mm, the length of the hypotenuse side was 0.32 mm, and the cross sectional area was 2.00 mm$^2$.

The exhaust gas emission cell 11 had an octagonal cross section, and the shape of the cross section was the same as that of the second exhaust gas introduction cell 14. The length of the hypotenuse side facing the second exhaust gas introduction cell 14 was 0.32 mm, and the vertical or horizontal sides facing the first exhaust gas introduction cells 12 was 1.13 mm.

The thickness of the outer wall 17 was 0.35 mm.

The cross sectional area of the first exhaust gas introduction cell 12 was 1.05 mm$^2$, and the cross sectional areas of the second exhaust gas introduction cell 14 and the exhaust gas emission cell 11 were both 2.39 mm$^2$. In other words, the cross sectional area of the first exhaust gas introduction cell 12 was 44% the sere of the cross sectional area of the second exhaust gas introduction cell 14.

Moreover, the cross sectional area of the exhaust gas emission cell 11 was equal in size to the cross sectional area of the second exhaust gas introduction cell 14, and was larger than the cross sectional area of the first exhaust gas introduction cell 12.

The honeycomb fired body was in a rectangular pillar shape that was roundly cornered at the corner portions in end faces thereof.

Next, a plurality of the honeycomb fired bodies were combined using an adhesive paste containing 30% by weight of alumina fibers having an average fiber length of 20 μm, 21% by weight of silicon carbide particles having an average particle size of 0.6 μm, 15% by weight of silica sol, 5.6% by weight of carboxymethyl cellulose, and 28.4% by weight of water. Subsequently, the adhesive layer was dried and solidified at 120° C. to form an adhesive layer, and thereby a pillar-shaped ceramic block was manufactured.

The periphery of the pillar-shaped ceramic block was cut out using a diamond cutter to manufacture a substantially round pillar-shaped ceramic block.

Subsequently, a sealing material paste having the same composition as that of the adhesive paste was applied to the peripheral face of the ceramic block. The sealing material paste was dried and solidified at 120° C. to form a periphery coat layer. In this manner a round pillar-shaped honeycomb filter was manufactured.

The diameter of the honeycomb filter was 266.7 mm, and the length in the longitudinal direction was 177.8 mm.

Subsequently, the honeycomb filter is immersed in slurry containing dispersed gamma alumina which has an average particle diameter of 2 μm and supports platinum, as an oxidation catalyst. Then, the honeycomb filter is dried at 120° C. and heated at 450° C., and thereby the honeycomb filter supports 219 g (22 g/L in total of 20 g/L of gamma alumina and 2 g/L of platinum) of the oxidation catalyst inside the cell walls.

Comparative Example 1

A raw honeycomb molded body was obtained in the same molding process as in Example 1. Subsequently the raw honeycomb molded body was dried using a microwave drying apparatus to manufacture a dried honeycomb molded body. Then, predetermined cells of the dried honeycomb molded body were plugged by filling the cells with a plug material paste.

The positions of the cells to be plugged were changed from those in Example 1 as follows. The octagonal cells were all plugged in the end face corresponding to the end at the exhaust gas emission side, and the square cells were all plugged in the end face corresponding to the end at the exhaust gas introduction side so that the cells were alternately plugged in both of the end faces.

Consequently, a honeycomb molded body was obtained in which the end at the exhaust gas introduction side and the end at the exhaust gas emission side were plugged at the positions shown in FIG. 21B.

Honeycomb fired bodies 130 and a honeycomb filter 120 shown in FIGS. 21A and 21B were manufactured through the same processes as in Example 1. The same oxidation catalyst in the same amount as in Example 1 was supported in the honeycomb filter 120.

In the cross section of the manufactured honeycomb fired body 130 in the direction perpendicular to the longitudinal direction of the cells, all the exhaust gas introduction cells 132 had an octagonal cross section except for the exhaust gas introduction cells 132A and 132B which were adjacent to the outer wall 137.

The sides facing the exhaust gas emission cell 131 were vertical or horizontal sides having a length of 1.13 mm.

The sides facing other exhaust gas introduction cells 132, 132A, and 132B were hypotenuse sides having a length of 0.32 mm.

All the exhaust gas emission cells 131 and 131A had a square cross section. The length of the sides forming the cross sections of the exhaust gas emission cells 131 and 131A was 1.02 mm.

In the exhaust gas introduction cells 132B at the four corners, the length of sides adjacent to the outer wall 137 was 1.30 mm, the length of the vertical or horizontal sides was 1.08 mm, the length of the hypotenuse sides was 0.32 mm, and the cross sectional area was 1.67 mm$^2$.

In the exhaust gas introduction cells 132A, the length of the side adjacent to the outer wall 137 was 1.58 mm, the length of the vertical side parallel to the side adjacent to the outer wall 17 was 1.13 mm, the length of the horizontal line connected at a right angle to the side adjacent to the outer wall 17 was 1.08 mm, the length of the hypotenuse side was 0.32 mm, and the cross sectional area was 2.00 mm$^2$.

The thickness of the cell walls 133 was 0.18 mm, and the thickness of the outer walls was 0.35 mm.

The cross sectional area of the exhaust gas introduction cell 132 was 2.39 mm$^2$, and the cross sectional, area of the exhaust gas emission cell 131 was 1.05 mm$^2$. In other words, the cross sectional area of the exhaust gas introduction cell 132 was larger than the cross sectional area of the exhaust gas emission cell 131.

(Measurement of Initial Pressure Loss)

FIG. 8 is an explanatory diagram schematically illustrating a method for measuring the initial pressure loss.

An initial pressure loss measuring apparatus 210 includes a blower 211, an exhaust gas pipe 212 connected to the blower 211, a metal casing 213 in which the honeycomb filter 20 is fixed, and a pressure gauge 214 in which pipes are arranged so that the pressure in front and back of the honeycomb filter 20 can be measured. Specifically, in the initial pressure loss measuring apparatus 210, the pressure loss is measured by flowing gas through the honeycomb filter 20 and measuring the pressure in front and back of the honeycomb filter.

The blower 211 is operated three times to flow gas at a rate of 600 m$^3$/h, 800 m$^3$/h, and 1200 m$^3$/h. In each operation, the pressure loss in five minutes from the start is measured.

Figure 10A:
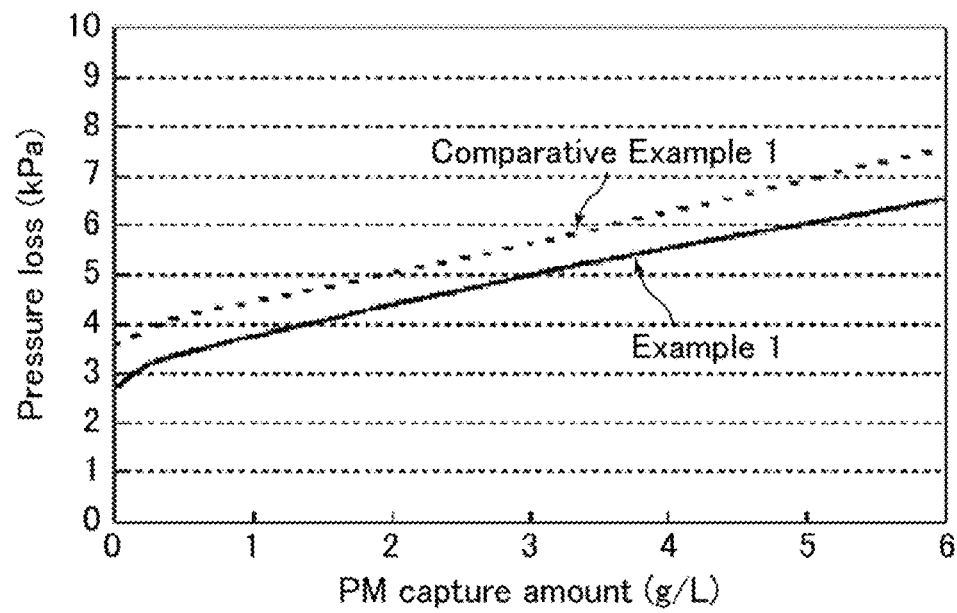
FIG. 10A is a graph showing a relation between PM capture amount and the pressure loss that are measured in Example 1 and Comparative Example 1.
Figure 10B:
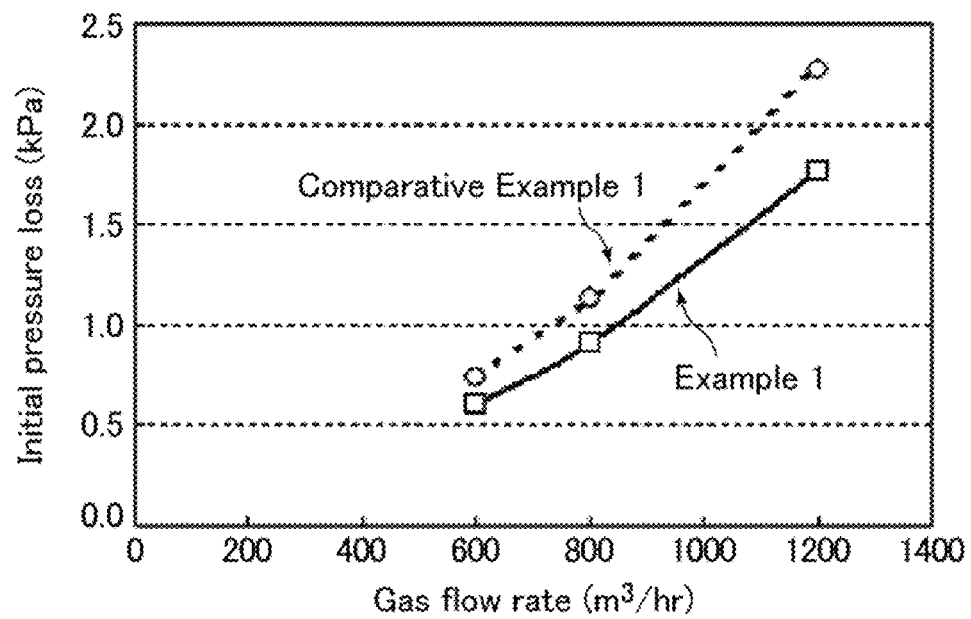
FIG. 10B is a graph showing a relation between the gas flow rate and the initial pressure loss.

FIG. 10B is a graph showing the relations between the gas flow rates and the initial pressure losses of the honeycomb filters manufactured in Example 1 and Comparative Example 1.

The graph in FIG. 10B clearly shows that, in the honeycomb filter of Comparative Example 1, the initial pressure loss was 0.73 Pa, 1.13 Pa, and 2.27 Pa for the gas flow rate of 600 m$^3$/h, 800 m$^3$/h, and 1200 m$^3$/h, respectively. In the honeycomb filter of Example 1, the initial pressure loss was 0.60 Pa, 0.91 Pa, and 1.77 Pa for the gas flow rate of 600 m$^3$/h, 800 m$^3$/h, and 1200 m$^3$/h, respectively, which was lower than that in Comparative Example 1. In particular, as the flow rate increases, the difference from Comparative Example 1 becomes more significant.

(Measurement of Pressure Loss)

FIG. 9 is an explanatory diagram schematically illustrating a method for measuring the pressure loss.

The pressure loss measuring apparatus 310 has the following structure: a honeycomb filter 20 fixed inside a metal casing 313 is disposed in an exhaust gas tube 312 of a 12.8-liter diesel engine 311, and a pressure gauge 314 is attached in a manner such that it can detect the pressure in front and back of the honeycomb filter 20. The honeycomb filter 20 is disposed such that the end at the exhaust gas introduction side is closer to the exhaust gas tube 312 of the diesel engine 311. Namely, the honeycomb filter 20 is disposed to allow exhaust gas to flow in the cells which are open at the exhaust gas introduction side end.

The diesel engine 311 is operated with the number of rotation of 1800 rpm and a torque of 2000 Nm to allow exhaust gas to flow into the honeycomb filter 20 so that PMs are captured by the honeycomb filter.

Then, a relation is determined between the amount (g/L) of captured PMs per liter of an apparent volume of the honeycomb filter and the pressure loss (kPa).

FIG. 10A is a graph showing the relations between the PM capture amounts and the pressure losses of the honeycomb filters manufactured in Example 1 and Comparative Example 1.

The graph in FIG. 10A clearly shows that the initial pressure loss, i.e. the pressure loss when the PM capture amount is 0 g/L, is as low as 2.7 kPa, and that the pressure loss is as low as 6.6 kPa even when the PM capture amount is 6 g/L in the honeycomb filter of Example 1. Thus, the honeycomb filter of Example 1 has a significant effect of achieving a lower pressure loss, in addition to a lower initial pressure loss, as compared to the honeycomb filter of Comparative Example 1 at any time when the PM capture amount was 0 g/L to 6 g/L. In the honeycomb filter of Comparative Example 1, the initial pressure loss, i.e. the pressure loss when the PM capture amount was 0 g/L, is 3.6 kPa, and the pressure loss is 7.6 kPa when the PM capture amount was 6 g/L.

Second Embodiment

The following will discuss a honeycomb filter according to the second embodiment of the present invention.

The honeycomb filter according to the second embodiment of the present invention includes a single honeycomb fired body having an outer wall on the periphery thereof. The honeycomb fired body includes exhaust gas emission cells each having an open end at an exhaust gas emission side and a plugged end at an exhaust gas introduction side, and exhaust gas introduction cells each having an open end at the exhaust gas introduction side and a plugged end at the exhaust gas emission side, the exhaust gas introduction cells including first exhaust gas introduction cells and second exhaust gas introduction cells. In the honeycomb filter, an oxidation catalyst is supported inside the cell walls in an amount of 5 to 60 g/L.

The exhaust gas emission cells are each adjacently surrounded fully by the first exhaust gas introduction cells and the second exhaust gas introduction cells across the porous cell walls.

In the cross section perpendicular to the longitudinal direction of the cells, each second exhaust gas introduction cell has a larger cross sectional area than each first exhaust gas introduction cell, and each exhaust gas emission cell has the same cross sectional area as each second exhaust gas introduction cell.

In the cross section perpendicular to the longitudinal direction of the cells, the exhaust gas emission cells and the exhaust gas introduction cells are each polygonal, and a side facing one exhaust gas emission cell among the sides forming the cross sectional shape of the first exhaust gas introduction cell is longer than a side facing one exhaust gas emission cell among the sides forming the cross sectional shape of the second exhaust gas introduction cell.

The exhaust gas introduction cells and the exhaust gas emission cells each have a uniform cross sectional shape except for the plugged portion, in a direction perpendicular to the longitudinal direction of the cells thoroughly from the end at the exhaust gas introduction side to the end at the exhaust gas emission side.

Namely, the honeycomb filter according to the second embodiment has the same structure as that of the honeycomb filter according to the first embodiment except that the honeycomb filter according to the second embodiment is formed of a single honeycomb fired body having an outer wall on the periphery thereof. Such a honeycomb filter formed of a single honeycomb fired body is referred to also as an integrated honeycomb filter.

Figure 11A:
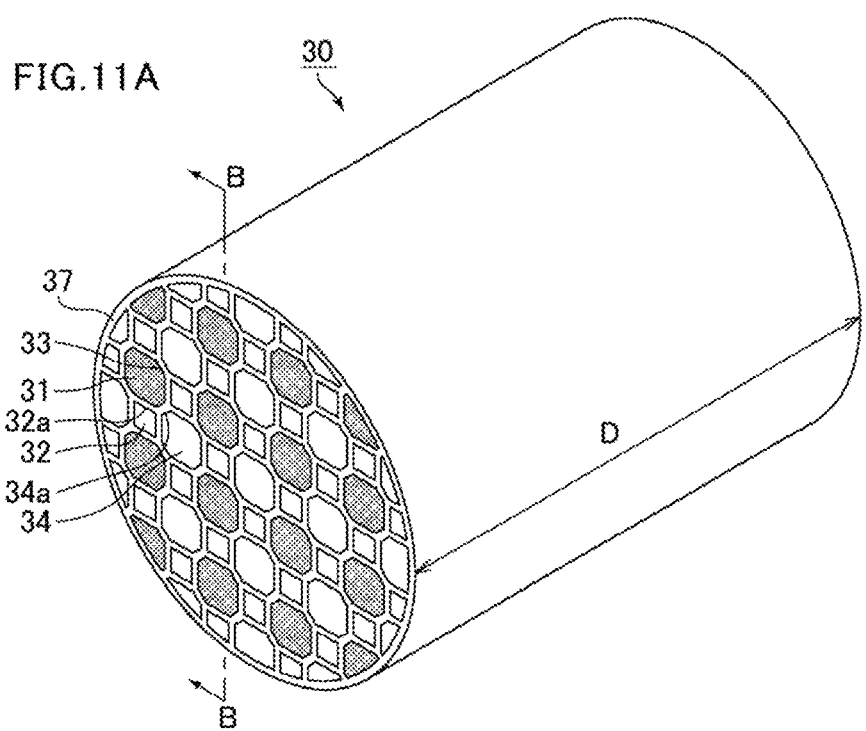
FIG. 11A is a perspective view schematically illustrating one example of a honeycomb filter according to a second embodiment of the present invention.
Figure 11B:
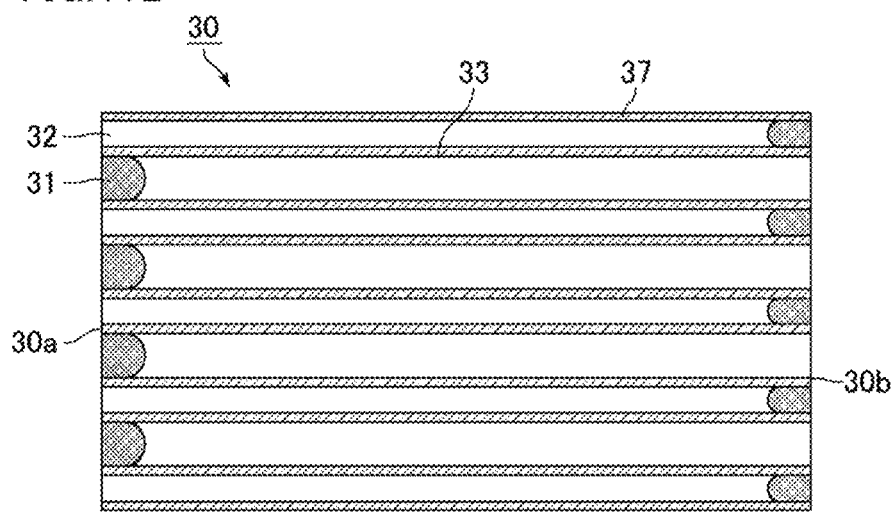
FIG. 11B is a B-B line cross sectional view of the honeycomb filter in FIG. 11A.

FIG. 11A is a perspective view schematically illustrating one example of the integrated honeycomb filter according to the second embodiment of the present invention. FIG. 11B is a B-B line cross sectional view of the integrated honeycomb filter.

In the honeycomb filter 30 shown in FIG. 11A and FIG. 11B, exhaust gas emission cells 31 having an octagonal cross section are each adjacently surrounded fully by first exhaust gas introduction cells 32 each having a square cross section and second exhaust gas introduction cells 33 each having an octagonal cross section across porous cell walls therebetween. The first exhaust gas introduction cells 32 and the second exhaust gas introduction cells 34 are alternately arranged around each exhaust gas emission cell 31. Each second exhaust gas introduction cell 34 has a larger cross section than each first exhaust gas introduction cell 32, and each exhaust gas emission cell 31 has the same cross sectional area as each second exhaust gas introduction cell 34.

The length of a side 32a facing the exhaust gas emission cell 31 among the sides forming the cross sectional shape of the first exhaust gas introduction cell 32 is longer than a side 34a facing the exhaust gas emission cell 11 among the sides forming the cross sectional shape of the second exhaust gas introduction cell 34.

The honeycomb filter 30 according to the present embodiment is formed of a single honeycomb fired body, and has an outer wall 37 on the periphery of the honeycomb fired body. Preferable examples of the material forming the honeycomb filter 30 according to the present embodiment include cordierite and aluminum titanate. These materials have a low coefficient of thermal expansion. Thus, cracks or the like caused by thermal stress during regeneration or the like rarely occur even in a large scale honeycomb filter.

The features of the embodiment other than those mentioned above are the same as the features described in relation to the first embodiment, and thus the explanation thereof is omitted.

The honeycomb filter 30 according to the present embodiment can be manufactured by using the honeycomb fired body manufactured in the first embodiment as it is, or can be manufactured in the same manner as in the first embodiment of the present invention, except that a periphery coat layer is formed on the periphery thereof. This embodiment does not require the processes (4), (5), and (6) in the method for manufacturing the honeycomb filter according to the first embodiment of the present invention. Furthermore, the process (7) is not necessary in the case of not forming the periphery coat layer.

The honeycomb filter 30 according to the present embodiment is substantially the same as the honeycomb filter 20 according to the first embodiment concerning the manners of basic arrangement of cells, shapes, clogging, and the like. Thus, the honeycomb filter 30 according to the present embodiment can exert the same effects as the effects (1) to (10) described, in relation to the first embodiment.

Third Embodiment

The following will discuss a honeycomb filter according to the third embodiment of the present invention.

The honeycomb filter according to the third embodiment of the present invention includes a plurality of honeycomb fired bodies having an outer wall on the periphery thereof, the honeycomb fired bodies combined with one another by adhesive layers residing therebetween. Each honeycomb fired body includes exhaust gas emission cells each having an open end at an exhaust gas emission side and a plugged end at an exhaust gas introduction side, and exhaust gas introduction cells each having an open end at the exhaust gas introduction side and a plugged end at the exhaust gas emission side, the exhaust gas introduction cells including first exhaust gas introduction cells and second exhaust gar introduction cells. In the honeycomb filter, an oxidation catalyst is supported inside the cell walls in an amount of 0 to 60 g/L.

The exhaust gas emission cells are each adjacently surrounded fully by the first exhaust gas introduction cells and the second exhaust gas introduction cells across the porous cell walls.

In the cross section perpendicular to the longitudinal direction of the cells, each second exhaust gas introduction cell has a larger cross sectional area than each first exhaust gas introduction cell, and each exhaust gas emission cell has the same cross sectional area as each second exhaust gas introduction cell.

In the cross section perpendicular to the longitudinal direction of the cells, the exhaust gas emission cells and the exhaust gas introduction cells are each polygonal, and a side facing one exhaust gas emission cell among the sides forming the cross sectional shape of the first exhaust gas introduction cell is longer than a side facing one exhaust gas emission cell among the sides forming the cross sectional shape of the second exhaust gas introduction cell.

In relation to the cells adjacent to the outer wall, the exhaust gas emission cells and the first exhaust gas introduction cells are alternately arranged.

The exhaust gas introduction cells and the exhaust gas emission cells each have a uniform cross sectional shape except for the plugged portions, in a direction perpendicular to the longitudinal direction of the cells thoroughly from the end at the exhaust gas introduction side to the end at the exhaust gas emission side.

Namely, the honeycomb filter according to the third embodiment has the same structure as that of the honeycomb filter according to the first embodiment. They are the same in terms of the basic shape end arrangement of the cells but different in that, in the honeycomb filter according to the third embodiment, the cross sectional shape of the cells adjacent to the outer wall is the same as the cross sectional shape of the cells other than the cells adjacent to the outer wall.

FIG. 12A is a perspective view schematically illustrating one example of a honeycomb filter according to a third embodiment of the present invention. FIG. 12B is a perspective view illustrating a honeycomb fired body forming the honeycomb filter.

The cross sectional shape and arrangement of the cell walls in a honeycomb fired body 10*a* included in a honeycomb filter 30 shown in FIGS. 12A and 12B are basically the same as those of the cell walls in the honeycomb fired body 10 included in the honeycomb filter 20 shown in FIG. 1. Exhaust gas emission cells 11 having an octagonal cross sectional shape are each adjacently surrounded fully by first exhaust gas introduction cells 12 having a square cross sectional shape and second exhaust gas introduction cells 14 having an octagonal cross sectional shape across porous cell walls. The first exhaust gas introduction cells 12 and the second exhaust gas introduction cells 14 are alternately arranged around the exhaust gas emission cells 11. Each second exhaust gas introduction cell 14 has a larger cross sectional area than each first exhaust gas introduction cell 12. Each exhaust gas emission cell 11 has the same cross sectional area as each second exhaust gas introduction cell 14. The honeycomb fired body 10 has an outer wall 17*a* on the periphery thereof. The cells adjacent to the outer wall 17*a* include the first exhaust gas introduction cells 12 and the exhaust gas emission cells 11.

A side 12*a* facing one exhaust gas emission cell 11 among the sides forming the cross sectional shape of the first exhaust gas introduction cell 12 is longer than a side 14*a* facing one exhaust gas emission cell 11 among the sides forming the cross sectional shape of the second exhaust gas introduction cell 14.

The honeycomb fired body 10*a* is different from the honeycomb fired body 10 included in the honeycomb filter 20 shown in FIG. 1 in that, as shown in FIG. 12B, the exhaust gas emission cells 11 and the first exhaust gas introduction cells 12 adjacent to the outer wall respectively have the same cross sectional shapes as the exhaust gas emission cells 11 and the first exhaust gas introduction cells 12 other than the cells adjacent to the outer wall.

The following will disease a modified example of the honeycomb filter according to the third embodiment of the present invention.

FIG. 13A is a perspective view schematically illustrating one modified example of a honeycomb fired body forming the honeycomb filter according to the third embodiment of the present invention. FIG. 13B is an end face view or a honeycomb fired body forming the honeycomb filter in FIG. 13A.

In a honeycomb fired body 10*b* in FIGS. 13A and 13B forming the honeycomb filter shown, all the first exhaust gas introduction cells 12 have the same shape and all the second exhaust gas introduction cells 14 have the same shape. A side 170*b* corresponding to an outer periphery of an outer wall 17*b* changes in accordance with the shapes of the first exhaust gas introduction cells 12 and the exhaust gas emission cells 11 adjacent to the outer wall 17*b*. The thickness of the outer wall 17*b* is uniform.

In other words, to make the thickness of the outer wall 17*b* uniform, the side 170*b* corresponding to the outer periphery of the outer wall 17*b* becomes rugged along with the shapes of the first exhaust gas introduction cells 12 and the exhaust gas emission cells 11 adjacent to the outer wall 17*b*.

Figure 13C:
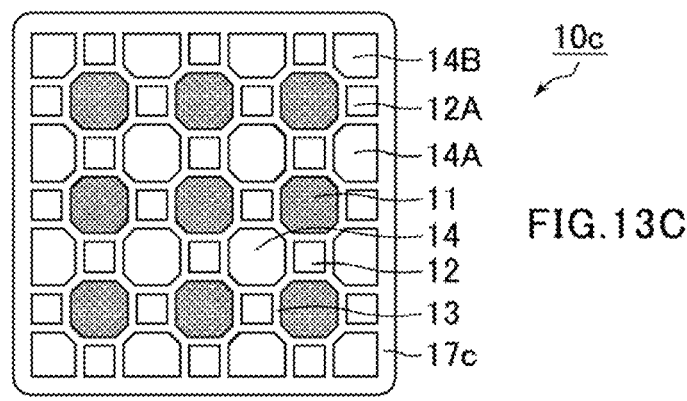
FIG. 13C is an end face view illustrating another modified example of the honeycomb fired body forming the honeycomb filter according to the third embodiment of the present invention.

FIG. 13C is an end face view illustrating another modified example of a honeycomb fired body forming the honeycomb filter according to the third embodiment of the present invention.

In a honeycomb fired body 10*c* shown in FIG. 13C, all the cells adjacent to an outer wall 17*c* are exhaust gas introduction cells. The shape of a second exhaust gas introduction cell 14A is, compared to the shape of an exhaust gas introduction cell not adjacent to the outer wall 17*c*, partially deformed to be hexagonal in accordance with the line along the inner wall forming the outer wall 17*c* of first exhaust gas introduction cells 12A adjacent to the outer wall 17*c*. Similarly, an exhaust gas emission cell 14B at the corner portion is partially deformed to be pentagonal.

As above, all the cells adjacent to the outer wall may be exhaust gas introduction cells with an aim of enhancing the aperture ratio of the exhaust gas introduction cells.

The features of the embodiment other than those mentioned above are the same as the features described in relation to the first embodiment, and thus the explanation thereof is omitted.

The honeycomb filter according to the present embodiment can be manufactured by the same method as described in the first embodiment of the present invention, except that the shape of the mold used in the extrusion molding is changed.

Being similar to the honeycomb filter 20 of the first embodiment in the basic arrangement and shapes of the cells and the state of plugs, the honeycomb filter according to the present embodiment can exert the same effects as the effects (1) to (11) mentioned in the first embodiment.

Fourth Embodiment

The following will discuss a honeycomb filter according to the fourth embodiment of the present invention. Features not described below are substantially the same as these in the honeycomb filter according to the first embodiment.

The honeycomb filter according to the fourth embodiment of the present invention includes a plurality of honeycomb fired bodies each having an outer cell on the periphery thereof. Each honeycomb fired body includes exhaust gas emission cells each having an open end at an exhaust gas emission side and a plugged end at an exhaust gas introduction side, and exhaust gas introduction cells each having an open end at the exhaust gas introduction side and a plugged end at the exhaust gas emission side, the exhaust gas introduction cells including first exhaust gas introduction cells and second exhaust gas introduction cells. The honeycomb fired bodies are combined with one another by adhesive layers residing therebetween. In the honeycomb filter, an oxidation catalyst is supported inside the cell walls in an amount of 5 to 60 g/L.

The exhaust gas emission cells are each adjacently surrounded fully by the first exhaust gas introduction cells and the second exhaust gas introduction cells across the porous cell walls.

In the cross section perpendicular to the longitudinal direction of the cells, each second exhaust gas introduction cell has a larger cross sectional area than each first exhaust gas introduction cell, and each exhaust gas emission cell has the same cross sectional area as each second exhaust gas introduction cell.

In the cross section perpendicular to the longitudinal direction or the cells, the exhaust gas emission cells, the first exhaust gas introduction cells, and the second exhaust gas introduction cells are each square, and one of the sides forming the cross sectional shape of the first exhaust gas introduction cell faces one exhaust gas emission cell, and none of the sides forming the cross sectional shape of the second exhaust gas introduction cell faces the sides forming the exhaust gas emission cell.

The cells adjacent to the outer wall include the first exhaust gas introduction cells and the exhaust gas emission cells.

The exhaust gas introduction cells and the exhaust gas emission cells each have a uniform cross sectional shape except for the plugged portion in a direction perpendicular to the longitudinal direction of the cells thoroughly from the end at the exhaust gas introduction side to the end at the exhaust gas emission side.

In other words, the honeycomb filter according to the fourth embodiment has substantially the same structure as the honeycomb filter according to the first embodiment, except that all the exhaust gas emission cells, the first exhaust gas introduction cells, and the second exhaust gas introduction cells each have a square cross section, and also except for the features mentioned below.

FIG. 14A is an end face view schematically illustrating one example of the cell arrangement in an end face of the honeycomb fired body forming the honeycomb filter according to the fourth embodiment of the present invention.

In a honeycomb fired body 40 shown in FIG. 14A included in the honeycomb filter, exhaust gas emission cells 41 having a square cross section are each adjacently surrounded fully by first exhaust gas introduction cells 42 each having a square cross section and second exhaust gas introduction cells 44 each having a square cross section across porous cell walls therebetween. The first exhaust gas introduction cells 42 and the second exhaust gas introduction cells 44 are alternately arranged around each exhaust gas emission cell 41. Each second exhaust gas introduction cell 44 has a larger cross sectional area than each first exhaust gas introduction cell 42, and each exhaust gas emission cell 41 has the same cross sectional area as each second exhaust gas introduction cell 44.

In the cross section of the three kinds of adjacent cells, namely, the exhaust gas emission cell 41, the second exhaust gas introduction cell 44, and the first exhaust gas introduction cells 42, a side 41a facing the first exhaust gas introduction cell 42 across a cell wall 43 among the sides of the square exhaust gas emission cell 41 is parallel to a side 42a facing the exhaust gas emission cell 41 across the cell wall 43 among the sides of the square first exhaust gas introduction cell 42.

Moreover, a side 42b facing the second exhaust gas introduction cell 44 across the cell wall 43 among the sides of the first exhaust gas introduction cell 42 is parallel to a side 44b facing the first exhaust gas introduction cell 42 across the cell wall 43 among the sides of the second exhaust gas introduction cell 44. Furthermore, the distances between, the parallel sides of all the above pairs are the same. That is, the distance between the parallel sides 41a and 42a, and the distance between the parallel sides 42b and 44b, are the same.

The square exhaust gas emission cell 41 is adjacently surrounded by alternately arranged four pieces of the first square exhaust gas introduction cells 42 and four pieces of the second square exhaust gas introduction cells 44 across the cell walls 43. The cross sectional area of the second exhaust gas introduction cell 44 is larger than the cross sectional area of the first exhaust gas introduction cell 42.

Furthermore, the exhaust gas emission cells 41, the first exhaust gas introduction cells 42, and the second exhaust gas introduction cells 44 are each arranged in a manner satisfying the conditions below.

Namely, among hypothetical segments connecting geometric centers of gravity of the square shapes of the four second exhaust gas introduction cells 44 surrounding the exhaust gas emission cell 41, an intersection of the two segments crossing the square shape region of the exhaust gas emission cell 41 is identical with the geometric center of gravity of the square cross section of the exhaust gas emission cell 41.

Moreover, among the hypothetical segments connecting the geometric centers of gravity of the square shapes of the four second exhaust gas introduction cells 44, the four segments not crossing the square shape region of the exhaust gas emission cell 41 forms a square, and midpoints of the respective sides of the square are identical with the geometric centers of gravity of the respective square shapes of the four first exhaust gas introduction cells 42 surrounding the exhaust gas emission cell 41.

As described above, the square exhaust gas emission cell 41 is adjacently surrounded by alternately arranged four pieces of the first square exhaust gas introduction cells 42 and four pieces of the second square exhaust gas introduction cells 44 across the cell walls 43 to form a single unit. The unit is two-dimensionally repeated, where the first exhaust gas introduction cells 42 and the second exhaust gas introduction cells 44 in the unit are shared between adjacent cell units, to form a honeycomb filter. The units share the first exhaust gas introduction cells 42 and the second exhaust gas introduction cells 44. Thus, the first exhaust gas introduction cell 42 and the second exhaust gas introduction cell 44, which face the exhaust gas emission cell 41 across the cell walls 43, face the exhaust gas emission cell 41 in the adjacent unit across the cell wall 43.

Figure 15:
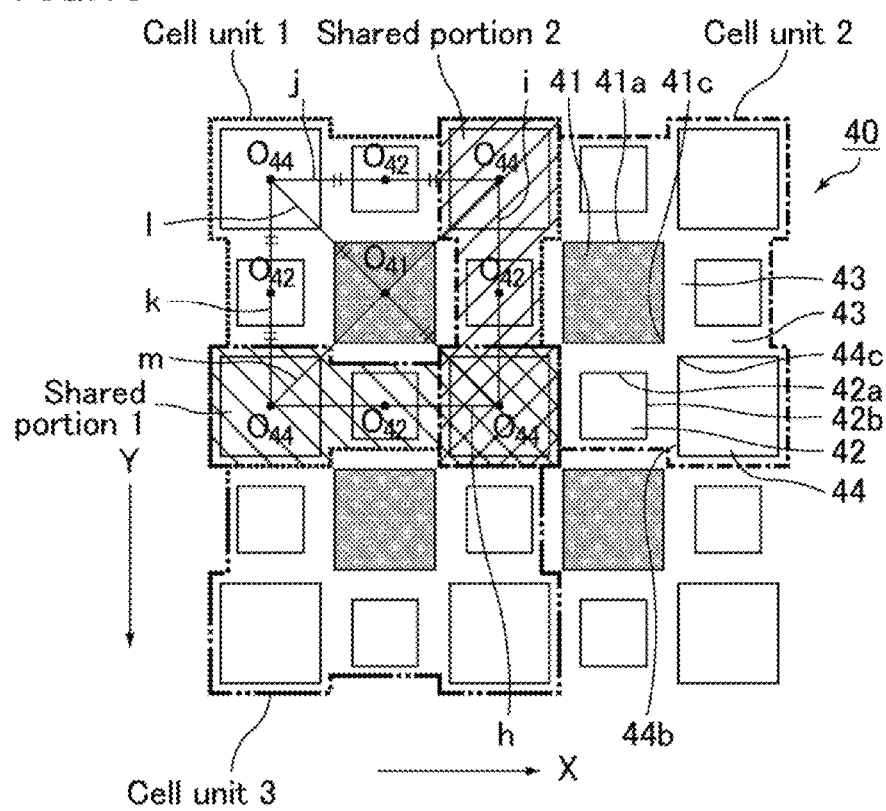
FIG. 15 is an enlarged cross sectional view perpendicular to the longitudinal direction of the honeycomb filter.

FIG. 15 is an enlarged cross sectional view perpendicular to the longitudinal direction of the honeycomb filter. FIG. 15 illustrates how each cell unit (cell structure) is two-dimensionally, i.e. in X and Y directions shown in FIG. 15, repeated in the case where the first exhaust gas introduction cells 42, the second exhaust gas introduction cells 44, and the exhaust gas emission cells 41 are square and the aforementioned conditions are satisfied, and also illustrates how the first exhaust gas introduction cells 42 and the second exhaust gas introduction cells 44 in the unit are shared between the cell units (cell structure). A cell unit 1, a cell unit 2, and a cell unit 3 each have a structure in which the exhaust gas emission cell 41 is fully surrounded by alternately arranged four pieces of the first exhaust gas introduction cells 42 and four pieces of the second exhaust gas introduction cells 44 across the cell walls 43 in a manner satisfying the aforementioned conditions.

The cell unit 2 has the same structure as that of the cell unit 1. The cell unit 2 is adjacent to the cell unit 1 in the X direction while sharing one piece of the first exhaust gas introduction cell 42 and two pieces of the second exhaust gas introduction cells 44 with the cell unit 1. The cells shared between the cell unit 1 and the cell unit 2 are depicted as "shared portion 2" in FIG. 15. The cell unit 3 has the same structure as that of the cell unit 1. The cell unit 3 is adjacent to the cell unit 1 in the Y direction while sharing one piece of the first exhaust gas introduction cell 42 and two pieces of the second exhaust gas introduction cells 42 with the cell unit 1. The cells shared between the cell unit 1 and the cell unit 3 are depicted as "shared portion 1" in FIG. 15.

Meanwhile, FIG. 15 shows four segments h, i, j, and k that do not cross the square shape region of the exhaust gas emission cell 41, and hypothetical two segments l and m that cross the square shape region of the exhaust gas emission cell 41, among hypothetical segments correction the geometric centers of gravity of the square shapes of the four pieces of the second exhaust gas introduction cells 44. The "shared portion 2" is depicted by cross-hatching with segments in the same direction as that of the segment m, and the "shared portion 1" is depicted by cross-hatching with segments in the same direction as that of the segment 1.

As shown in FIG. 15, an intersection of the two segments l and m is identical with the geometric center of gravity of the exhaust gas emission cell 41.

In the cross section of the cells, one of sides forming the cross sectional shape of the first exhaust gas introduction cell 42 faces one exhaust gas emission cell 41. Also, the record exhaust gas introduction cell 44 and the exhaust gas emission cell 41 are arranged so that they face each other at their corner portions. Thus, none of the sides forming the cross sectional shape of the second exhaust gas introduction cell 44 faces the sides forming the exhaust gas emission cell 41. The cells adjacent to an cuter wall 47 include the first exhaust gas introduction cells 42 and the exhaust gas emission cells 41.

None of the sides forming the cross section of the second exhaust gas introduction cell faces exhaust gas emission cells in the present embodiment, and thus exhaust gas more easily flows into the first exhaust gas introduction cells at an initial stage as compared to the first embodiment. For this reason, PMs accumulate earlier on the inner cell walls of the first exhaust gas introduction cells corresponding to the cell walls separating the first exhaust gas introduction cells and the exhaust gas emission cells. Consequently, the aforementioned switching of the main channel occurs further earlier. Therefore, PMs tend to uniformly accumulate on the inner cell walls of the first exhaust gas introduction cells and the inner cell walls of the second exhaust gas introduction cells so that the pressure loss can be further reduced after accumulation of a certain amount of PMs. In the honeycomb filter according to the present embodiment, cracks tend not to be caused by thermal shock that occurs upon burn-removal (regeneration) of PMs accumulated on the honeycomb filter.

In the honeycomb filter according to the present embodiment, the plugged portions provided at the end at the exhaust gas emission side, namely the plugged portions in the first exhaust gas introduction cells and the second exhaust gas introduction cells are present in vertical and horizontal rows. Each plugged portion has a width equal to or larger than the length of one side of the first exhaust gas introduction cell. In ordinary regeneration of honeycomb filters, heat burns firstly PMs accumulated at the exhaust gas introduction side of a honeycomb filter. Then, burning of PMs is transferred by exhaust gas flow to the emission side of the honeycomb filter so that all the PMs ere burned. For this reason, positions closer to the emission side of the honeycomb filter are exposed to higher temperatures, and easily have temperature difference along the diameter direction of the honeycomb filter. Thus, cracks occur due to the thermal stress. Such cracks are prominent in the case where the cross sectional, areas are different among the cells, and also in the case where the cross sections of the exhaust gas introduction cells where PMs accumulate have square cross section(s). In contrast, in the honeycomb filter according to the embodiment of the present invention, the plugged portions aligned in vertical and horizontal rows at the exhaust gas emission side function as thermally conductive layers and as layers for dissipating heat to outside. Thus, the temperature difference is small along the diameter direction of the honeycomb filter. This reduces the thermal stress to be caused to prevent occurrence of cracks. Moreover, in the honeycomb filter according to the embodiment of the present invention, the amount of the plug in the second exhaust gas introduction cells, in which a larger amount of PMs accumulate compared with the first exhaust gas introduction cells, is large due to the size of the cross sectional area, and thereby the thermal capacity of the plugged portions increase. Such plugged portions can prevent an increase in the temperature of the second exhaust gas introduction cells, where the heat of burning PMs is higher, even in consideration of each cell. This reduces the temperature difference in the diameter direction of the honeycomb filter, thereby reducing the thermal stress to be caused.

Thus, the honeycomb filter according to the present embodiment can prevent cracks during the regeneration even though it includes exhaust gas introduction cells having square cross sections.

The cross sectional area of each first exhaust gas introduction cell 42 is preferably 20 to 50% the size, and more preferably 22 to 45% the size of the cross sectional area of each second exhaust gas introduction cell 44.

In a honeycomb fired body shown in FIG. 14A, the cross sectional area of each exhaust gas emission cell 41 is equal to the cross sectional area of each second exhaust gas introduction cell 44; however, the cross sectional area of each exhaust gas emission cell 41 may be larger than the cross sectional area of each second exhaust gas introduction cell 44.

The cross sectional area of each exhaust gas emission cell 41 is preferably 1.05 to 1.5 times the size of the cross sectional area of each second exhaust gas introduction cell 44.

The following describes the thickness of the cell walls in the cross section of the honeycomb fired body 40 included in the honeycomb filter according to the fourth embodiment based on the aforementioned definition of the cell walls. Supposing that a straight line $Z_{42}$ connecting the center of gravity $O_{41}$ of the exhaust gas emission cell 41 and the center of gravity $O_{42}$ of the first exhaust gas introduction cell 42 is given, the thickness of the cell wall 43 at a part overlapped with the straight line $Z_{42}$ (the thickness between the side 42a and the side 41a) is determined as thickness $X_1$. Supposing that a straight line $Z_{44}$ connecting the center of gravity $O_{44}$ of the second exhaust gas introduction cell 44 and the center of gravity $O_{41}$ of the exhaust gas emission cell 41 is given, the thickness of the cell wall 43, which separates the second exhaust gas introduction cell 44 and the exhaust gas emission cell 41, at a part overlapped with the straight line $Z_{44}$ (the length between a corner portion 44c of the second exhaust gas introduction cell 44 and a corner portion 41c of the exhaust gas emission cell 41) is determined as thickness $Y_1$.

The thickness of the cell walls of the honeycomb filter varies depending on the parts as shown in FIG. 14A; however, the thicknesses, including the thickness $X_1$ and the thickness $Y_1$, may be set to be within a range of 0.10 to 0.46 mm.

The following will discuss a modified example of the honeycomb filter according to the fourth embodiment of the present invention.

FIG. 14B is an end face view illustrating one modified example of the honeycomb fired body forming the honeycomb filter according to the fourth embodiment of the present invention.

In a honeycomb fired body 40a shown in FIG. 14B included in the honeycomb filter, the shape of an exhaust gas emission cell 41A adjacent to an outer wall 47a is, compared to the shape of an exhaust gas emission cell 41 not adjacent to the outer wall 47a, partially deformed to be rectangle in accordance with the line along the inner wall, which forms the outer wall, in the first exhaust gas introduction cells 42A adjacent to the outer wall 47a. An exhaust gas emission cell 41B at the corner portion has a square shape with a smaller cross sectional area compared to the exhaust gas emission cell 41 not adjacent to the outer wall 47a.

With such shapes of the cells, the boundary between the outer wall 47a and the exhaust gas emission cells 41A and 41B and the first exhaust gas introduction cells 42A adjacent to the outer wall 47a is formed linearly, and the thickness of the outer wall 47a is uniform.

The following will discuss another modified example of the honeycomb filter according to the fourth embodiment of the present invention.

FIG. 14C is an end face view illustrating another modified example of the honeycomb fired body forming the honeycomb filter according to the fourth embodiment of the present invention.

In a honeycomb fired body 40b shown in FIG. 14C included in the honeycomb filter, all the first exhaust gas introduction cells have the same shape, and all the exhaust gas emission cells 41 have the same shape. A side 470b corresponding to an outer periphery of an outer wall 47b changes in accordance with the shapes of the first exhaust gas introduction cells 42 and the exhaust gas emission cells 41 adjacent to the outer wall 47b. The thickness of the outer wall 47b is uniform.

In other words, to make the thickness of the outer wall 47b uniform, the side 470b corresponding to the outer periphery of the outer wall 47b becomes rugged along with the shapes of the first exhaust gas introduction cells 42 and the exhaust gas emission cells 41 adjacent to the outer wall 47b.

The features of the embodiment other than those mentioned above are the same as the features described in relation to the first embodiment, and thus the explanation thereof is omitted.

The honeycomb filter according to the present embodiment can be manufactured in the same manner as in the first embodiment of the present invention, except that a die having a different shape is used in the extrusion molding process.

In the honeycomb filter according to the present embodiment, unlike the first embodiment, the exhaust gas emission cells 41 and the second exhaust gas introduction cells 44 have square cross sections, and all the sides forming the cross sectional shape of the second exhaust gas introduction cells 44 do not face the exhaust gas emission cells 41. Among the sides forming the cross sectional shape of the first exhaust gas introduction cells 42, a side 42a faces one of the exhaust gas emission cells 41. Thus, like the honeycomb filter according to the first embodiment, it is considered that exhaust gas easily flows into the first exhaust gas introduction cells 42 at an initial stage. After accumulation of a certain amount of PMs, exhaust gas tends to flows into the second exhaust gas introduction cells 44.

The honeycomb filter according to the present embodiment is substantially the same as the honeycomb filter 20 according to the first embodiment concerning basic arrangement of cells, manner of plugging, size difference among the cross sectional areas of the cells, or the like. Thus, the honeycomb filter according to the present embodiment can exert the same effects as the effects (1) to (3), (5) and (7) to (10) described in relation to the first embodiment.

Fifth Embodiment

The following will discuss a honeycomb filter according to the fifth embodiment of the present invention. Features not described below are substantially the same as those in the honeycomb filter according to the first embodiment.

The honeycomb filter according to the fourth embodiment of the present invention includes a plurality of honeycomb fired bodies each having an outer wall on the periphery thereof. Each honeycomb fired body includes exhaust gas emission cells each having an open end at an exhaust gas emission side and a plugged end at an exhaust gas introduction side, and exhaust gas introduction cells each having an open end at the exhaust gas introduction side and a plugged end at the exhaust gas emission side, the exhaust gas introduction cells including first exhaust gas introduction cells and second exhaust gas introduction cells each having a larger cross sectional area than each first exhaust gas introduction cell in a direction perpendicular to the longitudinal direction of the cells. The honeycomb fired bodies are combined with one another by adhesive layers residing therebetween. In the honeycomb filter, an oxidation catalyst is supported inside the cell walls in an amount of 5 to 60 g/L.

In the honeycomb filter according to the fifth embodiment of the present invention, in the cross section perpendicular to the longitudinal direction of the cells, the cross sectional area of each exhaust gas emission cell is equal in size to the cross sectional area of each second exhaust gas introduction cell. The exhaust gas emission cells and the exhaust gas introduction cells are each in a shape formed by a curved line in the cross section perpendicular to the longitudinal direction of the cells, and all the exhaust gas emission cells, the first exhaust gas introduction cells, and the second exhaust gas introduction cells have round cross sectional shapes.

The cells adjacent to the outer wall include the first exhaust gas introduction cells and the exhaust gas emission cells.

The honeycomb filter according ho the fifth embodiment of the present invention has substantially the same features as the features of the honeycomb filter according to the first embodiment of the present invention, except that the cross sectional shapes of the exhaust gas emission cells, the second exhaust gas introduction cells, and the first exhaust gas introduction cells are different in the direction perpendicular to the longitudinal direction of the cells.

FIG. 16 is an end face view schematically illustrating one example of the cell arrangement in an end face of a honeycomb fired body forming the honeycomb filter according to a fifth embodiment of the present invention.

A honeycomb fired body 50 in a honeycomb filter according to the fifth embodiment of the present invention includes exhaust gas emission cells 51, first exhaust gas introduction cells 52, cell walls 53, and second exhaust gas introduction cells 54.

The exhaust gas emission cells 51 are each adjacently surrounded fully by the first exhaust gas introduction cells 52 and the second exhaust gas introduction cells 54 across porous cell walls 53 residing therebetween. The cells adjacent to the outer wall include the exhaust gas emission cells 51 and the first exhaust gas introduction cells 52.

In the honeycomb fired body shown in FIG. 16, in the cross section perpendicular to the longitudinal direction of the cells, the cross sectional area of each second exhaust gas introduction cell 54 is equal in size to the cross sectional area of each exhaust gas emission cell 51, and the cross sectional area of each first exhaust gas introduction cells 52 is smaller than the cross sectional area of each second exhaust gas introduction cell 54. The cross sectional area of each first exhaust gas introduction cell 52 is preferably 20 to 50% the size of the cross sectional area of each second exhaust gas introduction cell 54.

All the exhaust gas emission cells 51, the first exhaust gas introduction cells 52, and the second exhaust gas introduction cells 54 have round cross sectional shapes.

The following describes the thickness of the cell walls in the cross section of the honeycomb fired body 50 shown in FIG. 16 included in the honeycomb filter according to the fifth embodiment based on the aforementioned definition of the cell walls. Supposing that a straight line $Z_{52}$ connecting the center of gravity $O_{51}$ of the exhaust gas emission cell 51 and the center of gravity $O_{52}$ of the first exhaust gas introduction cell 52 is given, the thickness of the cell wall 53 at a part overlapped with the straight line is determined as thickness $X_2$. Supposing that a straight line $Z_{54}$ connecting the center of gravity $O_{54}$ of the second exhaust gas introduction cell 54 and the center of gravity $O_{51}$ of the exhaust gas emission cell 51 is given, the thickness of the cell wall 53, which separates the second exhaust gas introduction cell 54 and the exhaust gas emission cell 51, at a part overlapped with the straight line $Z_{54}$ determined as thickness $Y_2$.

In the honeycomb fired body 50 according to the present embodiment, the thickness $X_2$ of the cell wall 53 separating the first exhaust gas introduction cell 52 and the exhaust gas emission cell 51 is smaller than the thickness $Y_2$ of the cell wall 53 separating second exhaust gas introduction cell 54 and the exhaust gas emission cell 51.

This embodiment provides a shape that can have a larger difference between the thickness of the cell walls separating the first exhaust gas introduction cells and the exhaust gas emission cells and the thickness of the cell walls separating the second exhaust gas introduction cells and the exhaust gas emission cells. For this reason, the exhaust gas more easily flows into the first exhaust gas introduction cells at an initial stage as compared to the first embodiment. Thus, PMs accumulate earlier on the inner cell walls of the first exhaust gas introduction cells corresponding to the cell walls separating the first exhaust gas introduction cells and the exhaust gas emission cells. Consequently, the aforementioned switching of the main channel occurs further earlier. Therefore, PMs tend to uniformly accumulate on the inner cell walls of the first exhaust gas introduction cells and the inner cell walls of the second exhaust gas introduction cells so that the pressure loss can be further reduced after accumulation of a certain amount of PMs.

The thickness $X_2$ of the cell wall 53 separating the first exhaust gas introduction cell 52 and the exhaust gas emission cell 51 is preferably 40 to 75% the thickness $Y_2$ of the cell wall 53 separating the second exhaust gas introduction cell 54 and the exhaust gas emission cell 51.

In the honeycomb fired body 50 according to the present embodiment, the thickness of the cell wall 53 separating the first exhaust gas introduction cell 52 and the second exhaust gas introduction cell 54 may be determined in the same manner as the thickness of the cell wall 53 separating the first exhaust gas introduction cell 52 and the exhaust gas emission cell 51.

In the honeycomb fired body 50 shown in FIG. 16, the thickness of the cell wall 53 separating the first exhaust gas introduction cell 52 and the second exhaust gas introduction cell 54 is smaller than the thickness of the cell wall 53 separating the first exhaust gas introduction cell 52 and the exhaust gas emission cell 51.

In the honeycomb filter according to the fifth embodiment of the present invention, as shown in FIG. 16, the shape of each first exhaust gas introduction cell adjacent to the outer wall may be the same as that of each first exhaust gas introduction cell not adjacent to the outer wall, and the shape of each exhaust gas emission cell adjacent to the outer wall may be the same as that of each exhaust gas emission cell not adjacent to the outer wall. Alternatively, the exhaust gas emission cell may have a side partially deformed in accordance with the line connecting the outermost points on the inner walls of the first exhaust gas introduction cells adjacent to the outer walls so that the thickness of the outer wall except for the corner portions is substantially uniform.

In the honeycomb filter according to the fifth embodiment of the present invention, the thickness of the outer wall may be uniform in accordance with the shapes of the first exhaust gas introduction cells and the exhaust gas emission cells adjacent to the outer wall, and the shapes of the first exhaust gas introduction cells and the exhaust gas emission cells adjacent to the outer wall may be the same as the exhaust gas emission cells not adjacent to the outer wall, respectively. In other words, the outer wall is bending in accordance with the shapes of the first exhaust gas introduction cells and the exhaust gas emission cells to maintain the uniform thickness in this case.

The features of the embodiment other than those mentioned above are the same as the features described in relation to the first embodiment, and thus the explanation thereof is omitted.

The honeycomb filter according to the present embodiment can be manufactured in the same manner as in the first embodiment of the present invention, except that a die having a different shape is used in the extrusion molding process.

Hereinafter, the effects of the honeycomb filter according to the fifth embodiment of the present invention are listed.

The honeycomb filter described in the first embodiment of the present invention has a feature that the side 12a facing the exhaust gas emission cell 11 among the sides forming the cross sectional shape of the first exhaust gas introduction cell 12 is longer than the side 14a facing the exhaust gas emission cell 11 among the sides forming the cross sectional shape of the second exhaust gas introduction cell 14. Meanwhile, the honeycomb filter according to the fourth embodiment has a feature that all the exhaust gas emission cells, the first exhaust gas introduction cells, and the second exhaust gas introduction cells have round cross sectional shapes, and the thickness of the cell walls separating the first exhaust gas introduction cells and the exhaust gas emission cells is smaller than the thickness of the cell walls separating the second exhaust gas introduction cells and the exhaust gas emission cells. The fifth embodiment is different on the above points from the first embodiment. Other features are substantially the same.

A smaller thickness of the cell walls may lead to easier passage of exhaust gas through the cell walls so that the pressure loss is reduced even in the case where all the exhaust gas emission cells, the first exhaust gas introduction cells, and the second exhaust gas introduction cells have round cross sectional shapes. Thus, the length of sides forming cross sections of the cells may be considered to correspond to the thickness of the cell walls separating the cells. Hence, the honeycomb filter according to the fourth embodiment of the present invention can exert the same effects as the effects (1) to (3), (5) and (7) to (10) described in relation to the first embodiment.

Sixth Embodiment

The following will discuss a honeycomb filter according to the sixth embodiment of the present invention. Features not described below are substantially the same as those in the honeycomb filter according to the first embodiment.

The honeycomb filter according to the sixth embodiment of the present invention includes a plurality of honeycomb fired bodies each having an outer wall on the periphery thereof. Each honeycomb fired body includes exhaust gas emission cells each having an open end at an exhaust gas emission side and a plugged end at an exhaust gas introduction side, and exhaust gas introduction cells each having an open end at the exhaust gas introduction side and a plugged end at the exhaust gas emission side, the exhaust gas introduction cells including first exhaust gas introduction cells and second exhaust gas introduction cells each having a larger cross sectional area than each first exhaust gas introduction cell in a direction perpendicular to the longitudinal direction of the cells. The honeycomb fired bodies are combined with one another by adhesive layers residing therebetween. In the honeycomb filter, an oxidation catalyst is supported inside the cell walls in an amount of 5 to 60 g/L.

In the honeycomb filter according to the sixth embodiment of the present invention, in the cross section perpendicular to the longitudinal direction of the cells, the cross sectional area of the exhaust gas emission cells is equal in size to the cross sectional area of the second exhaust gas introduction cells. In the cross section perpendicular to the longitudinal direction of the cells, the exhaust gas emission cells and the exhaust gas introduction cells are each in a shape formed by carved lines; and the exhaust gas emission cells and the second exhaust gas introduction cells each have a convex square cross section formed by four outwardly curved lines, whereas the first exhaust gas introduction cells each have a concave square cross section formed by four inwardly curved lines. The cells adjacent to the outer wall include the exhaust gas emission cells and the first exhaust gas introduction cells.

The honeycomb filter according to the sixth embodiment of the present invention has substantially the same features as the features of the honeycomb filter according to the first embodiment of the present invention, except that the cross sectional shapes of the exhaust gas emission cells, the second exhaust gas introduction cells, and the first exhaust gas introduction cells are different in the direction perpendicular to the longitudinal direction of the cells.

FIG. 17 is an end face view schematically illustrating one example of the cell arrangement in an end face of a honeycomb fired body forming the honeycomb filter according to the sixth embodiment of the present invention.

A honeycomb fired body 60 included in a honeycomb filter according to the sixth embodiment of the present invention includes exhaust gas emission cells 61, first exhaust gas introduction cells 62, cell walls 63, and second exhaust gas introduction cells 64. The exhaust gas emission cells 61 are each adjacently surrounded fully by the first exhaust gas introduction cells 62 and the second exhaust gas introduction cells 64 across porous cell walls 63 residing therebetween.

In the honeycomb fired body shown in FIG. 17, in the cross section perpendicular to the longitudinal direction of the cells, the cross sectional area of each second exhaust gas introduction cell 64 is equal in site to the cross sectional area of each exhaust gas emission cell 61, and the cross sectional area of each first exhaust gas introduction cell 62 is smaller than the cross sectional area of each second exhaust gas introduction cell 64. The cross sectional area of each first exhaust gas introduction cell 62 is preferably 20 to 50% the size of the cross sectional area of each second exhaust gas introduction cell 64.

The exhaust gas emission cells 61 and the second exhaust gas introduction cells 64 each have a convex square cross section formed by four outwardly curved lines.

Figure 18A:
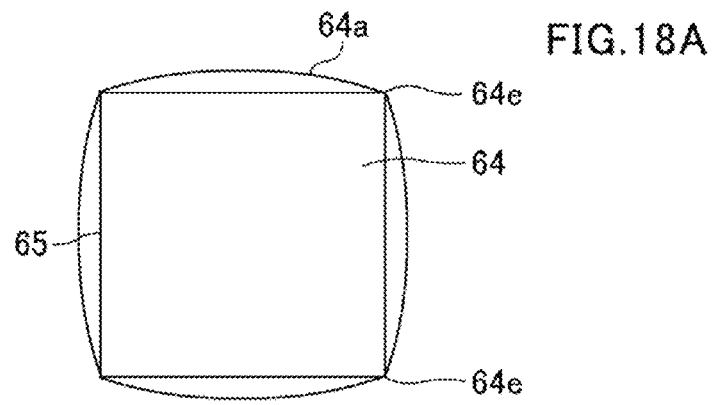
FIG. 18A is an explanatory diagram schematically illustrating one example of a convex square cell shape.
Figure 18B:
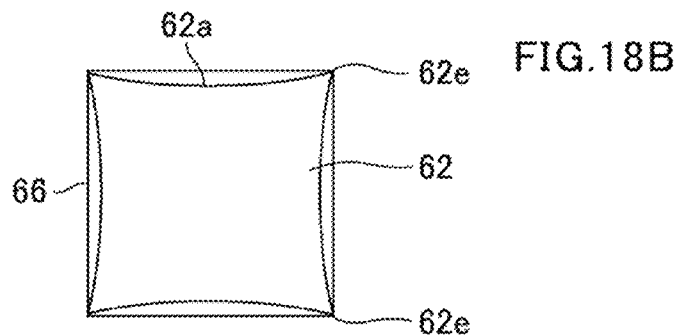
FIG. 18B is an explanatory diagram schematically illustrating one example of a concave square cell shape.
Figure 18C:
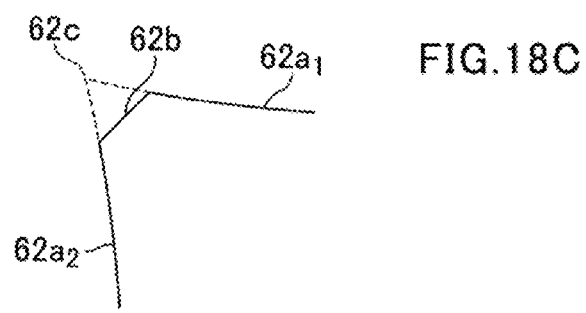
FIG. 18C is an explanatory diagram schematically illustrating one example of the concave square shape in which a vertex portion is chamfered.
Figure 18D:
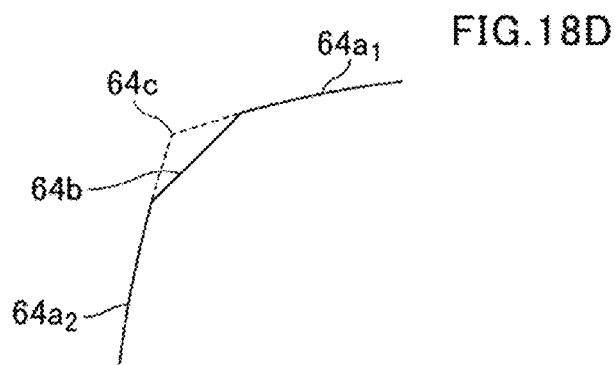
FIG. 18D is an explanatory diagram schematically illustrating one example of the convex square shape in which a vertex portion is chamfered.

FIG. 18A is an explanatory diagram schematically illustrating one example of the convex square cell shape. FIG. 18B is an explanatory diagram schematically illustrating one example of the concave square cell shape. FIG. 18C is an explanatory diagram schematically illustrating one example of the concave square shape in which a vertex portion is chamfered. FIG. 18D is an explanatory diagram schematically illustrating one example of the convex square shape in which a vertex portion is chamfered.

FIG. 18A shows a second exhaust gas introduction cell 64 having a convex square cross section, and a square 65 reread by connecting four vertices 64e of the second exhaust gas introduction cell 64.

In the explanation of the embodiments of the present invention, the convex square refers to a figure that is substantially square having four carved sides. The sides are curved outwardly from the square formed by connecting the four vertices of the substantially square figure.

FIG. 18A shows that the sides 64a forming the cross section of the second exhaust gas introduction cell 64 are curved (convex) outwardly from the geometric center of gravity of the convex square toward outside the square 65.

Although FIG. 18A illustrates the cross section of the second exhaust gas introduction cell 64 as an example of the convex square cell shape, the cross section of the exhaust gas emission cell 61 is substantially the same as the cross section of the second exhaust gas introduction cell 64.

The first exhaust gas introduction cells 62 each have a concave square cross section formed by four inwardly curved lines.

FIG. 18B shows a first exhaust gas introduction cell 62 having a concave square cross section, and a square 66 formed by connecting four vertices 62e of the first exhaust gas introduction cell 62.

In the explanation of the embodiments of the present invention, the concave square refers to a figure that is substantially square having four curved sides. The sides are curved (concaved) inwardly from the square formed by connecting the four vertices of the substantially square figure toward the geometric cancer of gravity of the concave square.

FIG. 18B shows that the sides 62a forming the cross section of the first exhaust gas introduction cell 62 are curved (concaved) from the square 66 towards the geometric center of gravity of the concave square.

According to the present embodiment, the first exhaust gas introduction cells each have an acute angle portion that causes resistance by inhibiting gas flow, whereas the second exhaust gas introduction cells each have obtuse angles that allow easy gas flow. Thus, in comparison to the first embodiment, after only a small amount of PMs are accumulated on the inner cell walls separating the second exhaust gas introduction cells and the exhaust gas emission cells, exhaust gas easily flows into the first exhaust gas introduction cells. Therefore, PMs tend to uniformly accumulate on the inner walls of the first exhaust gas introduction cells and the inner walls of the second exhaust gas introduction cells so that the pressure loss after accumulation of a certain amount of PMs can be further reduced.

In the explanation of the embodiments of the present invention, the convex square and the concave square include shapes that are chamfered in the vicinity of the vertex portions thereof.

FIG. 18C shows a shape in which a side 62a1 and a side 62a2, which are curved lines forming the concave square, are not directly connected, and the side 62a1 is connected to the side 62a2 via a chamfered portion 62b that is chamfered with a straight line.

In the case where the curved sides forming the concave square are connected via the chamfered portion, an intersection 62c of hypothetical curved lines extended respectively from the side 62a1 and the side 62a2 as shown by a dotted line in FIG. 18C is defined as a vertex.

FIG. 18D shows a shape in which a side 64a1 and a side 64a2, which are curved lines forming the convex square, are not directly connected each other, and the side 62a1 is connected to the side 62a2 via a chamfered portion 64b that is chamfered by a straight line.

In the case where the curved sides forming the convex square are connected each other via the chamfered portion, an intersection 64c of hypothetical curved lines extended respectively from the side 64a1 and the side 64a2 as shown by a dotted line in FIG. 18D is defined as a vertex.

Whether the cross section formed by curved lines is a convex square or a concave square can be determined by hypothetically depicting a square by connecting the vertices intersections 62c or intersections 64c).

The chamfered portion is not limited to the one chamfered with a straight line, but may be one chamfered with a curved line.

In the honeycomb filter of the present embodiment, the thickness of the cell walls 63 between the first exhaust gas introduction cells 62 and the exhaust gas emission cells 61 is smaller than the thickness of the cell walls 63 between the second exhaust gas introduction cells 64 and the exhaust gas emission cells 61.

The following describes the thickness of the cell walls in the cross section of the honeycomb fired body 60 according to the sixth embodiment shown in FIG. 17 based on the aforementioned definition of the cell walls. Supposing that a straight line $Z_{62}$ connecting the center of gravity $O_{61}$ of the exhaust gas emission cell 61 and the center of gravity $O_{62}$ of the first exhaust gas introduction cell 62 is given, the thickness of the cell wall 63 at a part overlapped with the straight line (thickness between the side 62a and the side 61a) is determined as thickness $X_3$. Supposing that a straight line $Z_{64}$ connecting the center of gravity $O_{64}$ of the second exhaust gas introduction cell 64 and the center of gravity $O_{61}$ of the exhaust gas emission cell 61 is given, a thickness of the cell wall 63, which separates the second exhaust gas introduction cell 64 and the exhaust gas emission cell 61, at a part overlapped with the straight line $Z_{64}$ (distance between a vertex 64e of the second exhaust gas introduction cell 64 and a vertex 61e of the exhaust gas emission cell 61) is determined as thickness $Y_3$.

In the honeycomb fired body 60 according to the present embodiment, the thickness $X_3$ of the cell wall 63 separating the first exhaust gas introduction cell 62 and the exhaust gas emission cell 61 is smaller than the thickness $Y_3$ of the cell wall 63 separating the second exhaust gas introduction cell 64 and the exhaust gas emission cell 61.

In the honeycomb fired body 60 according to the present embodiment, the thickness of the cell wall separating the first exhaust gas introduction cell 62 and the second exhaust gas introduction cell 64 may be determined in the same manner as the thickness of the cell wall separating the first exhaust gas introduction cell 62 and the exhaust gas emission cell 61.

In the honeycomb fired body 60 shown in FIG. 17, the thickness of the cell wall 63 separating the first exhaust gas introduction cell 62 and the second exhaust gas introduction cell 64 is uniform, and is equal to the thickness of the cell wall 63 separating the first exhaust gas introduction cell 62 and the exhaust gas emission cell 61.

In the honeycomb filter according to the sixth embodiment of the present invention, the thickness of the outer wall may be uniform, the shape of the first exhaust gas introduction cells adjacent to the outer wall may have the same shape as the first exhaust gas introduction cells not adjacent to the outer wall, and the exhaust gas emission cell adjacent to the outer wall may have the same shape as the exhaust gas emission cell not adjacent to the outer wall. With an aim of making the thickness of the outer wall substantially uniform, except for the corner portions, a side adjacent to the outer wall of the exhaust gas emission cell may be partially deformed along with the line connecting the outermost points on the inner walls of the first exhaust gas introduction cells adjacent to the outer wall.

In the honeycomb filter according to the sixth embodiment of the present invention, the thickness of the outer wall may be uniform along with the shape of the exhaust gas introduction cells adjacent to the outer wall, and the shapes of the first exhaust gas introduction cells and the exhaust gas emission cells adjacent to the outer wall may be tire same as those of the first exhaust gas introduction cells and the exhaust gas emission cells not adjacent to the outer wall, respectively. In other words, the outer wall is bending in accordance with the shapes of the first exhaust gas introduction cells and the exhaust gas emission cells to maintain the uniform thickness in this case.

The honeycomb filter according to the present embodiment can be manufactured in the same manner as in the first embodiment of the present invention, except that a die having a different shape is used in the extrusion molding process.

Hereinafter, the effects of the honeycomb filter according to the sixth embodiment of the present invention are listed.

The honeycomb filter described in the first embodiment of the present invention has a feature that the side 12a facing the exhaust gas emission cell 11 among the sides forming the cross sectional shape of the first exhaust gas introduction cell 12 is larger than the side 14a facing the exhaust gas emission cell 11 among the sides forming the cross sectional shape of the second exhaust gas introduction cell 14. Meanwhile, the honeycomb filter according to the sixth embodiment has a feature that the thickness of the cell walls separating the first exhaust gas introduction cells and the exhaust gas emission cells is smaller than the thickness of the cell walls separating the second exhaust gas introduction cells and the exhaust gas emission cells. The sixth embodiment is different on the above points from the first embodiment. Other features are substantially the same.

A smaller thickness of the cell walls may lead to easier passage of exhaust gas through the cell walls so that the pressure loss may be reduced. Thus, the length of the sides forming the cross sections of the cells may correspond to the thickness of the cell walls separating the cells. Hence, the honeycomb filter according to the sixth embodiment of the present invention can exert the same effects as the effects (1) to (3), (5), and (7) to (10) described in relation to the first embodiment.

Obviously, numerous modifications and variations of the present invention are possible in light of the above teachings. It is therefore to be understood that within the scope of the appended claims, the invention may be practiced otherwise than as specifically described herein.

The invention claimed is:

1. A honeycomb filter comprising:
a plurality of cells through which exhaust gas is to flow and which include exhaust gas introduction cells and exhaust gas emission cells, the exhaust gas introduction cells each having an open end at an exhaust gas introduction side and a plugged end at an exhaust gas emission side, the exhaust gas emission cells each having an open end at the exhaust gas emission side and a plugged end at the exhaust gas introduction side;
porous cell walls defining rims of the plurality of cells;
an oxidation catalyst supported inside the porous cell walls in an amount of 5 to 60 g/L;
the exhaust gas introduction cells and the exhaust gas emission cells each having a uniform cross sectional shape except for a plugged portion in a cross section perpendicular to a longitudinal direction of the plurality of cells thoroughly from the exhaust gas introduction side to the exhaust gas emission side;
the exhaust gas emission cells having an average cross sectional area larger than an average cross sectional area of the exhaust gas introduction cells in the cross section perpendicular to the longitudinal direction; and
a total volume of the exhaust gas introduction cells being larger than a total volume of the exhaust gas emission cells,
wherein each of the exhaust gas emission cells is adjacently surrounded fully by the exhaust gas introduction cells across the porous cell walls,
wherein the exhaust gas introduction cells include first exhaust gas introduction cells and second exhaust gas introduction cells,
wherein each of the second exhaust gas introduction cells has a cross sectional area larger than a cross sectional area of each of the first exhaust gas introduction cells in the cross section perpendicular to the longitudinal direction of the plurality of cells,
wherein each of the exhaust gas emission cells has a cross sectional area equal to or larger than the cross sectional area of each of the second exhaust gas introduction cells in the cross section perpendicular to the longitudinal direction of the plurality of cells,
wherein, in the cross section perpendicular to the longitudinal direction of the plurality of cells, the exhaust gas introduction cells and the exhaust gas emission cells each have a polygonal shape, and
wherein, in the cross section perpendicular to the longitudinal direction of the plurality of cells,
a side forming a cross sectional shape of each of the first exhaust gas introduction cells faces one of the exhaust gas emission cells, a side forming a cross sectional shape of each of the second exhaust gas introduction cells faces one of the exhaust gas emission cells, and the side of each of the first exhaust gas introduction cells is longer than the side of each of the second exhaust gas introduction cells, or
a side forming a cross sectional shape of each of the first exhaust gas introduction cells faces one of the exhaust gas emission cells, and none of sides forming a cross sectional shape of each of the second exhaust gas introduction cells faces the exhaust gas emission cells.

2. The honeycomb filter according to claim 1,
wherein, in the cross section perpendicular to the longitudinal direction of the plurality of cells, length of the side forming the cross sectional shape of each of the second exhaust gas introduction cells is not more than 0.8 times length of the side forming the cross sectional shape of each of the first exhaust gas introduction cells.

3. The honeycomb filter according to claim 1,
wherein, in the cross section perpendicular to the longitudinal direction of the plurality of cells, the exhaust gas emission cells are each octagonal, the first exhaust gas introduction cells are each square, and the second exhaust gas introduction cells are each octagonal.

4. The honeycomb filter according to claim 3,
wherein the porous cell walls separating the plurality of cells have a uniform thickness in any part of the honeycomb filter.

5. The honeycomb filter according to claim 3,
wherein, in the cross section perpendicular to the longitudinal direction of the plurality of cells, the exhaust gas emission cells have octagonal cross sections, the first exhaust gas introduction cells have square cross sections, and the second exhaust gas introduction cells have octagonal cross sections, wherein, in the cross section perpendicular to the longitudinal direction of the plurality of cells, the cross sectional shape of each of the second exhaust gas introduction cells is congruent with a cross sectional shape of each of the exhaust gas emission cells, and wherein, in the cross section perpendicular to the longitudinal direction of the plurality of cells, the exhaust gas emission cells, the first exhaust gas introduction cells, and the second exhaust gas introduction cells are arranged in a manner that the exhaust gas emission cells are each surrounded by alternately arranged four pieces of the first exhaust gas introduction cells and four pieces of the second exhaust gas introduction cells across the porous cell walls, provided that hypothetical segments connecting geometric centers of gravity of the octagonal cross sections of the four pieces of the second exhaust gas introduction cells surrounding a reference exhaust gas emission cell of the exhaust gas emission cells are given, an intersection of two segments crossing the reference exhaust gas emission cell is identical with a geometric center of gravity of an octagonal cross section of the reference exhaust gas emission cell, and four segments not crossing the reference exhaust gas emission cell form a square, and midpoints of respective sides of the square are identical with geometric centers of gravity of the square cross sections of the four pieces of the first exhaust gas introduction cells surrounding the reference exhaust gas emission cell, wherein, in the cross section perpendicular to the longitudinal direction of the plurality of cells, a side facing one of the first exhaust gas introduction cells across a first cell wall among sides forming the cross sectional shape of one of the exhaust gas emission cells is parallel to a side facing one of the exhaust gas emission cells across the first cell wall among sides forming the cross sectional shape of one of the first exhaust gas introduction cells, wherein, in the cross section perpendicular to the longitudinal direction of the plurality of cells, a side facing one of the second exhaust gas introduction cells across a second cell wall among sides forming the cross sectional shape of one of the exhaust gas emission cells is parallel to a side facing one of the exhaust gas emission cells across the second cell wall among sides forming the cross sectional shape of one of the second exhaust gas introduction cells, wherein, in the cross section perpendicular to the longitudinal direction of the plurality of cells, a side facing one of the second exhaust gas introduction cells across a cell wall among sides forming the cross sectional shape of one of the first exhaust gas introduction cells is parallel to a side facing one of the first exhaust gas introduction cells across the cell wall among sides forming the cross sectional shape of one of the second exhaust gas introduction cells, and wherein, in the cross section perpendicular to the longitudinal direction of the plurality of cells, distances between parallel sides are the same.

6. The honeycomb filter according to claim 1,
wherein, in the cross section perpendicular to the longitudinal direction of the plurality of cells, the cross sectional area of each of the second exhaust gas introduction cells is equal in size to the cross sectional area of each of the exhaust gas emission cells, and wherein the cross sectional area of each of the first exhaust gas introduction cells is 20 to 50% size of the cross sectional area of each of the second exhaust gas introduction cells.

7. The honeycomb filter according to claim 1,
wherein, in the cross section perpendicular to the longitudinal direction of the plurality of cells, the exhaust gas emission cells, the first exhaust gas introduction cells, and the second exhaust gas introduction cells are all square.

8. The honeycomb filter according to claim 7,
wherein, in the cross section perpendicular to the longitudinal direction of the plurality of cells, the cross sectional area of each of the second exhaust gas introduction cells is equal in size to the cross sectional area of each of the exhaust gas emission cells, and wherein, in the cross section perpendicular to the longitudinal direction of the plurality of cells, the cross sectional area of each of the first exhaust gas introduction cells is 20 to 50% size of the cross sectional area of each of the second exhaust gas introduction cells.

9. The honeycomb filter according to claim 7,
wherein, in the cross section perpendicular to the longitudinal direction of the plurality of cells, the exhaust gas emission cells have square cross sections, the first exhaust gas introduction cells have square cross sections, and the second exhaust gas introduction cells have square cross sections, wherein, in the cross section perpendicular to the longitudinal direction of the plurality of cells, the cross sectional shape of each of the second exhaust gas introduction cells is congruent with a cross sectional shape of each of the exhaust gas emission cells, wherein, in the cross section perpendicular to the longitudinal direction of the plurality of cells, the exhaust gas emission cells, the first exhaust gas introduction cells, and the second exhaust gas introduction cells are arranged in a manner that the exhaust gas emission cells are each surrounded by alternately arranged four pieces of the first exhaust gas introduction cells and four pieces of the second exhaust gas introduction cells across the porous cell walls, provided that hypothetical segments connecting geometric centers of gravity of the square cross sections of the four pieces of the second exhaust gas introduction cells surrounding a reference exhaust gas emission cell of the exhaust gas emission cells are given, an intersection of the two segments crossing the reference exhaust gas emission cell is identical with a geometric center of gravity of a square cross section of the reference exhaust gas emission cell, and four segments not crossing the reference exhaust gas emission cell form a square, and midpoints of respective sides of the square are identical with geometric centers of gravity of the square cross sections of the four pieces of the first exhaust gas introduction cells surrounding the reference exhaust gas emission cell, wherein, in the cross section perpendicular to the longitudinal direction of the plurality of cells, a side facing one of the first exhaust gas introduction cells across a first cell wall among sides forming the cross sectional shape of one of the exhaust gas emission cells is parallel to a side facing one of the exhaust gas emission cells across the first cell wall among sides forming the cross sectional shape of one of the first exhaust gas introduction cells, wherein, in the cross section perpendicular to the longitudinal direction of the plurality of cells, a side facing one of the second exhaust gas introduction cells across a cell wall among sides forming the cross sectional shape of one of the first exhaust gas introduction cells is parallel to a side facing one of the first exhaust gas introduction cells across the cell wall among sides forming the cross sectional shape of one of the second exhaust gas introduction cells, and wherein, in the cross section perpendicular to the longitudinal direction of the plurality of cells, distances between parallel sides are the same.

10. The honeycomb filter according to claim 1, wherein, in the cross section perpendicular to the longitudinal direction of the plurality of cells, vertex portions of the polygonal shape are formed by curved lines.

11. The honeycomb filter according to claim 1, wherein, in the cross section perpendicular to the longitudinal direction of the plurality of cells, the exhaust gas emission cells, the first exhaust gas introduction cells, and the second exhaust gas introduction cells are point-symmetrical polygons each having not more than eight sides.

12. The honeycomb filter according to claim 1, wherein the exhaust gas introduction cells consist only of the first exhaust gas introduction cells, and
the second exhaust gas introduction cells each having the cross sectional area larger than the cross sectional area of each of the first exhaust gas introduction cells in the cross section perpendicular to the longitudinal direction of the plurality of cells.

13. The honeycomb filter according to claim 1, wherein the honeycomb filter comprises a plurality of honeycomb fired bodies,
wherein each of the plurality of honeycomb fired bodies has the exhaust gas emission cells, the first exhaust gas introduction cells, and the second exhaust gas introduction cells,
wherein each of the plurality of honeycomb fired bodies has an outer wall on an outer periphery of each of the plurality of honeycomb fired bodies, and
wherein the plurality of honeycomb fired bodies are combined with one another by adhesive layers residing between the plurality of honeycomb fired bodies.

14. The honeycomb filter according to claim 13, wherein the outer wall has corner portions, and
wherein a side, which contacts the outer wall, of each of the exhaust gas introduction cells and the exhaust gas emission cells adjacent to the outer wall is straight and parallel to a side corresponding to an outer periphery of the outer wall in a manner that a thickness of the outer wall is uniform except for the corner portions in the cross section perpendicular to the longitudinal direction of the plurality of cells.

15. The honeycomb filter according to claim 1, wherein the honeycomb filter comprises honeycomb fired bodies, and
wherein the honeycomb fired bodies include one of silicon carbide and silicon-containing silicon carbide.

16. The honeycomb filter according to claim 1, wherein the porous cell walls have a thickness of 0.10 to 0.46 mm.

17. The honeycomb filter according to claim 1, wherein the porous cell walls have pores having an average pore diameter of 8 to 25 μm.

18. The honeycomb filter according to claim 1, wherein the porous cell walls have a porosity of 40 to 70%.

19. The honeycomb filter according to claim 1, further comprising:
a periphery coat layer provided on a periphery of the honeycomb filter.

20. The honeycomb filter according to claim 1, wherein, in the cross sectional shape perpendicular to the longitudinal direction of the plurality of cells, the first exhaust gas introduction cells, the second exhaust gas introduction cells, and the exhaust gas emission cells each have a uniform cross sectional shape except for the plugged portion in the cross section perpendicular to the longitudinal direction of the plurality of cells thoroughly from the exhaust gas introduction side to the exhaust gas emission side,
wherein, in the cross sectional shape perpendicular to the longitudinal direction of the plurality of cells, the cross sectional shape of each of the first exhaust gas introduction cells is different from the cross sectional shape of each of the second exhaust gas introduction cells, and
wherein, in the cross sectional shape perpendicular to the longitudinal direction of the plurality of cells, the cross sectional shape of each of the exhaust gas emission cells is different from the cross sectional shape of each of the first exhaust gas introduction cells.

21. The honeycomb filter according to claim 1, wherein, in the cross section perpendicular to the longitudinal direction of the plurality of cells, a cell unit is two-dimensionally repeated in a manner that the first exhaust gas introduction cells and the second exhaust gas introduction cells surrounding each of the exhaust gas emission cells in the cell unit are shared between adjacent cell units,
wherein the cell unit has a cell structure such that
each of the exhaust gas emission cells is adjacently surrounded fully by the exhaust gas introduction cells across the porous cell walls,
the exhaust gas introduction cells includes first exhaust gas introduction cells and second exhaust gas introduction cells,
each of the second exhaust gas introduction cells has the cross sectional area larger than the cross sectional area of each of the first exhaust gas introduction cells in the cross section perpendicular to the longitudinal direction of the plurality of cells, and
each of the exhaust gas emission cells has the cross sectional area equal to or larger than the cross sectional area of each of the second exhaust gas introduction cells in the cross section perpendicular to the longitudinal direction of the plurality of cells, and
wherein, in the cross section perpendicular to the longitudinal direction of the plurality of cells, the exhaust gas introduction cells and the exhaust gas emission cells have one of
a first structure such that
the exhaust gas introduction cells and the exhaust gas emission cells each have the polygonal shape, a side forming the cross sectional shape of each of the first exhaust gas introduction cells faces one of the exhaust gas emission cells, a side forming the cross sectional shape of each of the second exhaust gas introduction cells faces one of the exhaust gas emission cells, and the side of each of the first exhaust gas introduction cells is longer than the side of each of the second exhaust gas introduction cells, or the exhaust gas introduction cells and the exhaust gas emission cells each have the polygonal shape, a side forming the cross sectional shape of each of the first exhaust gas introduction cells faces one of the exhaust gas emission cells, and none of sides forming the cross sectional shape of each of the second exhaust gas introduction cells faces the exhaust gas emission cells, and a second structure such that the exhaust gas introduction cells and the exhaust gas emission cells are each in a shape formed by a curved line, the porous cell walls include first porous cell walls separating the first exhaust gas introduction cells and the exhaust gas emission cells, and second porous cell walls separating the second exhaust gas introduction cells and the exhaust gas emission cells, and a thickness of each of the first porous cell walls is smaller than a thickness of each of the second porous cell walls.

22. A honeycomb filter comprising:

a plurality of cells through which exhaust gas is to flow and which include exhaust gas introduction cells and exhaust gas emission cells, the exhaust gas introduction cells each having an open end at an exhaust gas introduction side and a plugged end at an exhaust gas emission side, the exhaust gas emission cells each having an open end at the exhaust gas emission side and a plugged end at the exhaust gas introduction side;

porous cell walls defining rims of the plurality of cells;

an oxidation catalyst supported inside the porous cell walls in an amount of 5 to 60 g/L;

the exhaust gas introduction cells and the exhaust gas emission cells each having a uniform cross sectional shape except for a plugged portion in a cross section perpendicular to a longitudinal direction of the plurality of cells thoroughly from the exhaust gas introduction side to the exhaust gas emission side;

the exhaust gas emission cells having an average cross sectional area larger than an average cross sectional area of the exhaust gas introduction cells in the cross section perpendicular to the longitudinal direction; and a total volume of the exhaust gas introduction cells being larger than a total volume of the exhaust gas emission cells, wherein the exhaust gas introduction cells include first exhaust gas introduction cells and second exhaust gas introduction cells, wherein each of the second exhaust gas introduction cells has a cross sectional area larger than a cross sectional area of each of the first exhaust gas introduction cells in the cross section perpendicular to the longitudinal direction of the plurality of cells, wherein each of the exhaust gas emission cells has a cross sectional area equal to or larger than the cross sectional area of each of the second exhaust gas introduction cells in the cross section perpendicular to the longitudinal direction of the plurality of cells, wherein, in the cross section perpendicular to the longitudinal direction of the plurality of cells, the exhaust gas introduction cells and the exhaust gas emission cells are each in a shape formed by a curved line, wherein the porous cell walls includes first porous cell walls separating the first exhaust gas introduction cells and the exhaust gas emission cells, and second porous cell walls separating the second exhaust gas introduction cells and the exhaust gas emission cells, and wherein a thickness of each of the first porous cell walls is smaller than a thickness of each of the second porous cell walls.

23. The honeycomb filter according to claim 22, wherein the thickness of each of the first porous cell walls is 40 to 75% the thickness of each of the second porous cell walls.

24. The honeycomb filter according to claim 22, wherein, in the cross section perpendicular to the longitudinal direction of the plurality of cells, the exhaust gas emission cells, the first exhaust gas introduction cells, and the second exhaust gas introduction cells are round.

25. The honeycomb filter according to claim 22, wherein, in the cross section perpendicular to the longitudinal direction of the plurality of cells, the exhaust gas emission cells and the second exhaust gas introduction cells each have a convex square cross section formed by four outwardly curved lines, and wherein, in the cross section perpendicular to the longitudinal direction of the plurality of cells, the first exhaust gas introduction cells each have a concave square cross section formed by four inwardly curved lines.

26. The honeycomb filter according to claim 22, wherein, in the cross section perpendicular to the longitudinal direction of the plurality of cells, the cross sectional area of each of the second exhaust gas introduction cells is equal in size to the cross sectional area of each of the exhaust gas emission cells, and wherein, in the cross section perpendicular to the longitudinal direction of the plurality of cells, the cross sectional area of each of the first exhaust gas introduction cells is 20 to 50% size of the cross sectional area of each of the second exhaust gas introduction cells.

27. The honeycomb filter according to claim 22, wherein the honeycomb filter comprises a plurality of honeycomb fired bodies, wherein each of the plurality of honeycomb fired bodies has the exhaust gas emission cells, the first exhaust gas introduction cells, and the second exhaust gas introduction cells, wherein each of the plurality of honeycomb fired bodies has an outer wall on an outer periphery of each of the plurality of honeycomb fired bodies, and wherein the plurality of honeycomb fired bodies are combined with one another by adhesive layers residing between the plurality of honeycomb fired bodies.

28. The honeycomb filter according to claim 27, wherein the outer wall has corner portions, and wherein a side, which contacts the outer wall, of each of the exhaust gas introduction cells and the exhaust gas emission cells adjacent to the outer wall is straight and parallel to a side corresponding to an outer periphery of the outer wall in a manner that a thickness of the outer wall is uniform except for the corner portions in the cross section perpendicular to the longitudinal direction of the plurality of cells.

29. The honeycomb filter according to claim 22,
wherein the honeycomb filter comprises honeycomb fired bodies, and
wherein the honeycomb fired bodies include one of silicon carbide and silicon-containing silicon carbide.

30. The honeycomb filter according to claim 22,
wherein the porous cell walls have a thickness of 0.10 to 0.46 mm.

31. The honeycomb filter according to claim 22,
wherein the porous cell walls have pores having an average pore diameter of 8 to 25 µm.

32. The honeycomb filter according to claim 22,
wherein the porous cell walls have a porosity of 40 to 70%.

33. The honeycomb filter according to claim 22, further comprising:
a periphery coat layer provided on a periphery of the honeycomb filter.

\* \* \* \* \*